United States Patent [19]

Church et al.

[11] 3,925,575

[45] *Dec. 9, 1975

[54] CERAMIC TREATING PROCESS AND PRODUCT PRODUCED THEREBY

[75] Inventors: Peter K. Church, Cascade; Oliver J. Knutson, Colorado Springs, both of Colo.

[73] Assignee: Kaman Sciences Corporation, Colorado Springs, Colo.

[ * ] Notice: The portion of the term of this patent subsequent to Jan. 29, 1991, has been disclaimed.

[22] Filed: Feb. 15, 1973

[21] Appl. No.: 332,745

Related U.S. Application Data

[60] Division of Ser. No. 694,303, Dec. 28, 1967, Pat. No. 3,789,096, which is a continuation-in-part of Ser. No. 642,704, June 1, 1967, abandoned.

[52] U.S. Cl.............................. 427/226; 427/243
[51] Int. Cl.............................................. B44d 1/14
[58] Field of Search............ 117/169, 123 A, 123 B, 117/124 A, 126 AF, 169 A, 69; 106/57

[56] References Cited
UNITED STATES PATENTS

| | | | |
|---|---|---|---|
| 1,884,665 | 10/1932 | Greiner | 117/123 B |
| 2,451,805 | 10/1948 | Callinan | 117/126 AF |
| 2,766,032 | 10/1956 | Meister | 117/123 B |
| 2,839,424 | 6/1958 | Labino | 117/69 |
| 3,038,817 | 6/1962 | Day et al. | 117/69 |
| 3,165,422 | 6/1965 | Stoughton et al. | 117/69 |
| 3,372,051 | 3/1968 | Stalego | 117/126 AF |
| 3,379,523 | 4/1968 | Chaklader | 106/57 |
| 3,385,915 | 5/1968 | Hamling | 106/57 |
| 3,436,203 | 4/1969 | Wu | 117/123 A |
| 3,481,780 | 12/1969 | Mitoff | 117/69 |
| 3,789,096 | 1/1974 | Church et al. | 264/60 |

*Primary Examiner*—Ralph Husack
*Assistant Examiner*—Stuart D. Frenkel
*Attorney, Agent, or Firm*—Max L. Wymore

[57] ABSTRACT

A new ceramic treatment process and product and, more particularly, a process for forming and treating and shaping and treating of porous skeletal bodies to produce hardened dimensionally stable end products at relatively low temperatures and the resulting materials produced thereby which comprises the steps of treating a porous skeletal body by impregnating the interstices of the porous body with a compound of a metal capable of being converted to an oxide in situ at relatively low temperatures, heating the body so impregnated at temperatures well below normal vitrification to a temperature of at least 600° F. and for a period of time sufficient to convert the compound impregnated therein to an oxide and repeating the impregnation and heating steps until the desired degree of hardness is obtained. The invention further contemplates the forming of the porous body from relatively finely divided materials which may be relatively pure powders, mixtures of powders or impure powders, including additives in the form of discrete particles, fibers, fillers and the like, which powders are molded and bound together or bound together and molded with a binder which may comprise the impregnating compound or other suitable binder prior to treatment.

55 Claims, 13 Drawing Figures

CERAMIC TREATING PROCESS AND PRODUCT PRODUCED THEREBY

This application is a division of Ser. No. 694,303, filed Dec. 28, 1967, for CERAMIC TREATING PROCESS AND PRODUCT PRODUCED THEREBY, now U.S. Pat. No. 3,789,096 issued Jan. 29, 1974 which is a continuation-in-part of Ser. No. 642704, June 1, 1967, abandoned.

In Applicants' previously filed application, Ser. No. 642,704 filed June 1, 1967, of which the present application is a continuation-in-part, Applicants disclosed the process of treating underfired porous partially vitrified relatively soft refractory ceramic which comprises the steps of shaping an underfired partially vitrified relatively soft refractory ceramic into a predetermined shape, impregnating the shaped ceramic with phosphoric acid and curing the impregnated ceramic at temperatures of at least 600°F., but below vitrification temperatures for a time sufficient to drive out the moisture and produce a hard ceramic. Also disclosed was a process of producing a chemically hardened ceramic body which comprised the steps of providing a structure of a porous underfired partially vitrified substantially pure machinable refractory ceramic oxide, impregnating the core with a metal compound capable of being converted to an oxide and curing the impregnated core at temperatures of 600°F. and above for a time sufficient to convert the impregnant to an oxide to harden the ceramic.

Ceramic materials normally undergo substantial dimensional changes during the usual firing or vitrification steps. Thus, it has heretofore been extremely difficult to produce precision parts or intricate shapes from ceramics. Precision parts had to be shaped slightly oversize before firing. After firing, the parts required further machining with diamond cutting wheels or by using lapping methods. Many intricate shapes were just not available since thin sections of parts would crack during firing.

In accordance with the invention, it has been found that underfired or so-called machinable grade refractory ceramics can be shaped while in the relatively soft state and then impregnated and heat treated to produce a ceramic having all the desirable characteristics of a vitrified ceramic without the usual change in dimensions. The process of the instant invention appears to be useful in the treatment of such refractory ceramic materials as the oxides of aluminum, beryllium, zirconium, titanium, magnesium and the like. These materials in the commercially available machinable grade are quite soft and easily broken. Also, in the soft state, they can be readily cut with carbide cutting tools, drilled, filed, sanded and otherwise formed to practically any desired shape. One such aluminum and beryllium oxide material is available from Coors Porcelain Company of Golden, Colorado. When the machinable ceramics are treated by the method of this invention, they become very hard, approximating highly vitrified ceramic and, in addition, will retain the original machined and pretreated dimensions. The treated material becomes so hard that the only practical method to do further machining is with diamond cutting wheels or by using lapping techniques.

The commercial value of the instant invention is readily seen when it is recognized that close tolerances on many intricate vitrified ceramic parts can only be obtained by machining with diamond cutting methods after firing. This is the case since there is considerable shrinkage which occurs during the firing. Also, there are many desired shapes which cannot be economically cast or molded using a high firing process. In addition, it is often not feasible to construct molding dies for small quantities of a particular part. The method of the present invention in contrast thereto permits easy machining of parts to exact tolerances and then hardening the part without change in original dimensions.

It has now been found that the hardening process may be equally applied to the hardening of non-sintered bodies. It has been found that the base refractory material can be prepared in a powdered form (such as ballmilled aluminum oxide) and simply pressed, molded, slip cast, extruded, or otherwise processed so that the base oxide particles are packed into close proximity to provide a porous body. The hardening of the non-sintered bodies is essentially the same method as applied to the porous, partially sintered materials. The hardening is accomplished by impregnating the porous body with a metal compound, which may be in solution, which compound is capable of being converted to the metal oxide in situ at a temperature below sintering temperature in the range of from about 600°F. to about 1500°F. and heating the body to convert the compound to its oxide. The impregnation and cure cycle must be repeated at least for two cycles to provide any usable hardening. It has further been found that other finely divided materials, such as a powdered metal, oxide mixtures and the like will serve as the base material which may also contain additives such as glass or metal fibers or abrasive grains to provide special characteristics in the finished product.

It is, therefore, the principal object of this invention to provide an improved low temperature process for the forming and treating and shaping and treating of relatively soft porous bodies which avoids one or more of the disadvantages of prior art methods of producing close tolerance hardened shaped parts.

A further object of the present invention is to provide an improved low temperature process of producing hardened articles of manufacture of predetermined shapes, of predetermined characteristics and of predetermined dimensions.

Another object is to provide an improved low temperature method of producing articles of manufacture in close tolerance shapes of selected hardness, porosity and surface characteristics.

A still further object of the invention is to provide an improved process for the production of ceramic bearings capable of use with or without lubricants under unfavorable conditions.

A further object of the invention is to provide an improved process for the application of a refractory oxide coating to a substrate and/or the hardening of the oxide coating applied thereto.

A further object of the invention is to provide an improved low temperature process for the production of improved abrasive or polishing stones and grinding wheels which may include abrasive grain additives.

A further object of the invention is to provide a process for the production of a refractory ceramic oxide material having a negative temperature coefficient of electrical and heat conduction.

For a better understanding of the present invention, together with other and further objects thereof, reference is had to the following description taken with the drawings, and its scope will be pointed out in the appended claims.

FIGS. 1, 2 and 3 constitute a series of photographs of a pressed body of alumina powder with an increasing number of impregnation-cure cycles according to the present invention;

Figure 1:
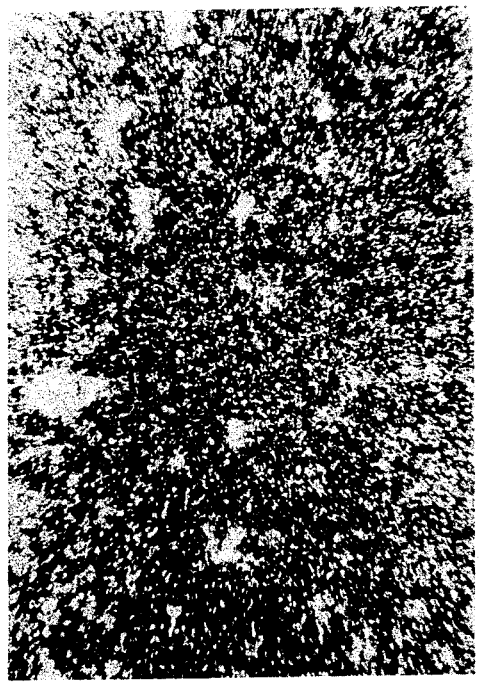

This invention is directed to a process and product involving new types of materials that are formed by multiple chemical impregnations of a relatively soft porous body of finely divided refractory oxide base materials, each followed by a low temperature cure to convert the impregnant to an oxide. The resulting ceramic structure formed in this manner has been shown to exhibit extreme hardness, a high compressive strength and a dimensionally stable material over a wide temperature range. In addition, a number of these new ceramic materials show an inherently small coefficient of friction coupled with a very low wear rate characteristic.

Parts can be economically fabricated of this new material in a wide variety of intricate shapes and sizes. This is most easily accomplished by providing the base refractory material in a powdered form and packing the powder particles into close proximity by suitable means to provide a porous body of predetermined shape. The shaped pieces are then repeatedly chemically treated and cured at a temperature substantially below that used for normal ceramic vitrification.

One of the unique features of this chemical treatment and hardening method is that virtually no change occurs in the original dimensions of the shaped part during the hardening process. Therefore, expensive diamond machining of the finished hardened part is eliminated.

Many of these new ceramic materials will withstand repeated water quenching from 1000°F. as well as prolonged exposure to temperature extremes of 2000° F. to −300°F. Mohs scale hardness is in excess of 9, normally being about equal to that of silicon carbide. Rockwell hardness can be as high as A-85 to A-90, with associated compressive strengths in excess of 125,000 psi.

In addition to their use for the manufacture of precision parts, many of these ceramics exhibit excellent characteristics for low friction and low wear rate bearing and seal applications; in particular, journal bearings, thrust bearings and sliding type bearings and seals. When used in this manner, lubrication may be by means of a wide variety of conventional and non-conventional lubricants. Among those successfully tested to date include: tap water, sea water, alcohol, kerosene, polyethylene glycol, trichlorethylene, lubricating oils, silicone fluids and liquid metals. Solid lubricants have been used with good results at temperatures up to about 2000°F. In addition, lightly loaded bearings have been operated for limited periods at high speed without lubrication.

Life tests of sleeve-type bearings have been and still are currently in progress. However, to date wear has been too low to obtain quantitative data, even after many months' time. Rub-shoe type wear rate tests have consequently been conducted and have shown exceptionally low wear rate characteristics. For example, a ceramic shoe of this invention riding on a ceramic wheel of the same material exhibited many times less wear than a bearing bronze shoe riding against a steel wheel using oil as the lubricating media. Also, unlike a conventional bronze-steel bearing combination, very heavy loads can be applied to many of the ceramic-to-ceramic material bearings without their showing any tendency toward galling, even when running with such poor lubricants as alcohol or water.

A special variation in treatment of this invention has also been found that will produce a honing or finishing material that appears to be superior in several respects to both natural and artifically produced grinding stones. For example, one such ceramic will remove metal far more rapidly than will an Arkansas stone, while at the same time producing a finer and more highly polished finish. Another ceramic material of this invention displays a wide variation in electrical and heat conduction with relatively small changes in temperature.

The basic method employed for producing the new ceramic materials consists of chemically impregnating a porous, refractory oxide structure followed by a low temperature cure. The porous refractory acts as the skeletal framework around which the final ceramic structure is formed.

The simplest chemical hardening method consists of impregnating the shaped porous body with a solution of chromic acid. The thoroughly impregnated material is then cured in an oven with the final temperature reaching at least 600°–1000°F. or higher. The impregnation and curing cycle is repeated at least once. With a suitable refractory base material, this simple acid treatment will produce a hard ceramic body having numerous uses.

The finely divided base material may be mixed with a binder, such as kaolin and the like, before shaping or the impregnant may serve as the binder after the first cure. This also may be accomplished by impregnation of the porous structure with a water solution of a soluble metal compound convertible to an oxide and subsequently converting same to the oxide by simply elevating the temperature to the required conversion point. The metal compound is selected so that the oxide conversion will normally take place at a temperature less than about 1500°F.

As mentioned previously, the ceramic material is built around a porous refractory base material that functions as the skeletal structure. The types of such materials that are suitable for use in the present invention include various grades of alumina, titania, beryllia, magnesia, magnesium silicate and stabilized zirconia. Some materials were obtained from the manufacturer in an "underfired" or "machinable" form. In this condition, these materials were normally found to be soft enough to allow machining by conventional means, and exhibited a relatively high effective porosity (10 to 50%) to allow for subsequent chemical treatment by the process of this invention. Table 1 lists the major type designation, manufactuer, and indicated hardness, porosity and fabrication method for each of the skeletal refractory materials tested.

The addresses of the manufacturers referred to in Table 1 are as follows: American Lava Corp., Chattanooga, Tennessee; Amersil, Inc., Hillside, New Jersey; Coors, Golden, Colorado; and, Du-Co Ceramics, Saxonburg, Pennsylvania.

TABLE I

UNDERFIRED, POROUS REFRACTORY BASE MATERIALS

| Base Material | Manufacturer's Type Designation | Manufacturer | Major Oxide | Other Oxides | Sintering Temp. | Effective Porosity | Mohs Hardness | Remarks |
|---|---|---|---|---|---|---|---|---|
| Alumina | AHP-99 | Coors | 99% $Al_2O_3$ | 0.5% $SiO_2$ 0.2% CaO 0.2% MgO | 2670°F. | 45.7% | 2–3 | Isostatic Pressed |
| Alumina | AP-99-L3 | Coors | 99% $Al_2O_3$ | | 2570°F. | 42.4% | 2–3 | Extruded |
| Alumina | AP-99-I1 | Coors | 99% $Al_2O_3$ | | 1700°F. | | 0–1 | Extruded |
| Alumina | AP-99-I2 | Coors | 99% $Al_2O_3$ | | 2130°F. | | 1 | Extruded |
| Alumina | AP-99-L1 | Coors | 99% $Al_2O_3$ | | 2642°F. | | | Extruded |
| Alumina | AP-99-L2 | Coors | 99% $Al_2O_3$ | | 2670°F. | | 5–6 | Extruded |
| Alumina | AP-99C-L1 | Coors | 99% $Al_2O_3$ | | 2642°F. | | 4–5 | Cast |
| Alumina | AP-99C-I2 | Coors | 99% $Al_2O_3$ | | 2130°F. | | | Cast |
| Alumina | AP-99C-L3 | Coors | 99% $Al_2O_3$ | | 2570°F. | | | Cast |
| Alumina | AlSiMag 614 (green) | Am. Lava Corp. | 96% $Al_2O_3$ | SiO MgO CaO | 2000°F. | | 1–2 | ordered green, fired for 20 min. at 2000°F. Extruded rod |
| Alumina | AlSiMag 393 | Am. Lava Corp. | 90% $Al_2O_3$ | | | | 4–5 | |
| Alumina | AlSiMag 548 | Am. Lava Corp. | 99.8% $Al_2O_3$ | | | | | |
| Beryllia | BP-96-i1 | Coors | 96% BeO | | 1700°F. | | 1–2 | Extruded |
| Magnesia | 187E4 | Du-Co Ceramics | 89% MgO | $SiO_2$ | 2000°F. | | 1–2 | |
| Magnesia | 187E77 | Du-Co Ceramics | 96% MgO | $SiO_2$ | 2000°F. | | 1–2 | |
| Magnesium Silicate | AlSiMag 222 | Am. Lava Corp. | $MgO.SiO_2$ | | | | 2–3 | |
| Silica | No. 3 Porosity | Amersil, Inc. | 99% $SiO_2$ | | | | 2–3 | Hot Pressed |
| Zirconia | 172H20 | Du-Co Ceramics | 95% $ZrO_2$ | 5% CaO | | | 1–2 | Made from ZCA Type F Coarse Grain Zirconia-(CaO stabilized) |
| Titania | AlSiMag 192 (Underfired) | Am. Lava Corp. | 98% $TiO_2$ | $SiO_2$ MgO CaO | 2000°F. | | 2–3 | Ordered Green fired 20 min. at 2000°F. |
| Alumina | AP-995-L3 | Coors | 99.5% $Al_2O_3$ | | 2570°F. | | | Extruded |
| Alumina | AP-997-L3 | Coors | 99.7% $Al_2O_3$ | | 2570°F. | | | Cast |
| Alumina | AP-94-i1 | Coors | 94% $Al_2O_3$ | 3.75% $SiO_2$ 0.9% CaO 0.75% MgO 0.5% $ZrO_2$ 0.1% $Fe_2O_3$ | 1700°F. | 33.1% | 2–3 | Extruded |
| Alumina | AP-94-I2 | Coors | 94% $Al_2O_3$ | 3.75% $SiO_2$ 0.9% CaO 0.75% MgO 0.5% $ZrO_2$ 0.1% $Fe_2O_3$ | 2130°F. | 33.0% | 2–3 | Extruded |
| Alumina | AP-94-I2 (Isostatic) | Coors | 94% $Al_2O_3$ | " | 2130°F. | 44.1% | 2–3 | Isostatic Pressed |
| Alumina | AP-85-i1 | Coors | 85% $Al_2O_3$ | 10% $SiO_2$ 2.75% MgO 1.25% CaO 0.75% BaO 0.25% $Fe_2O_3$ | 1700°F. | 33.4% | 2–3 | Extruded |
| Alumina | AlSiMag 614 (underfired) | Am. Lava Corp. | 96% $Al_2O_3$ | | >2000°F. | | 6–7 | Too hard for easy machining |

These materials are fabricated by one or more of several commercially used methods such as powder pressing, extrusion, isostatic forming or slip casting. The important factor, however, is that the formed or pressed oxide be only partially sintered since optimum sintering will result in a dense body with insufficient porosity to be usable in the chemical treatment method of this invention.

In addition to the alumina, beryllia, magnesia, titania and zirconia materials, it is anticipated that many of the other partially sintered refractory oxides would make applicable skeletal structures for the improved ceramic material. Among these would be the oxides of Barium, Calcium, Cerium, Chromium, Cobalt, Gallium, Hafnium, Lanthanum, Manganese, Nickel, Niobium, Tantalum, Thorium, Tin, Uranium, Vanadium, Yttrium and Zinc. Also, many of the complex-refractory oxides should be suitable base materials. Of the complex-refractories, only the magnesium silicate has been tested to date. Other complex-refractories that may be suitable if produced in a porous, partially sintered (underfired) form are Aluminum silicate, Aluminum titanate, Barium aluminate, Barium silicate, Barium zirconate, Beryllium aluminate, Beryllium silicate, Beryllium titanate, Beryllium zirconate, Calcium chromite, Calcium phosphate, Calcium silicate, Calcium titanate, Calcium zirconate, Cobalt aluminate, Magnesium aluminate, Magnesium chromite, Magnesium ferrite, Magnesium lanthanate, Magnesium silicate, Magnesium titanate, Magnesium zirconate, Magnesium zirconium silicate, Nickel aluminate, Potassium aluminum silicate, Strontium aluminate, Strontium phosphate, Strontium zirconate, Thorium zirconate, zinc aluminate, Zinc zirconium silicate and Zirconium silicate.

The novel process according to the invention is particularly adapted to the treating of porous, partially vitrified refractory ceramics such as the oxides of Aluminum, Barium, Beryllium, Calcium, Cerium, Chromium, Cobalt, Gallium, Hafnium, Lanthanum, Magnesium, Manganese, Nickel, Niobium, Tantalum, Thorium, Tin, Titanium, Uranium, Vanadium, Yttrium, Zinc and Zirconium and mixtures thereof. The oxides may be substantially pure or may contain or have amounts of impurities or additives, such as an oxide of a metal other than that of the body such as Cadmium, Chromium, Cobalt, Copper, Iron, Magnesium, Manganese, Nickel, Titanium and the like and/or other salts of such metals which ultimately will convert to oxides at least during the final curing step. The process of this invention also contemplates the addition of amounts of additives such as a salt of metal other than that of the body and convertible to an oxide such as the acetates, chlorides, nitrates and oxalates of Aluminum, Beryllium, Cadmium, Calcium, Cerium, Chromium, Cobalt, Copper, Iron, Lanthanum, Lithium, Magnesium, Molybdenum, Nickel, Strontium, Thorium, Tin, Tungsten, Zinc and Zirconium which are added to the ceramic during treatment.

The process of this invention may comprise the forming of a partially sintered treated ceramic into a predetermined shape or the forming thereof from a powder and a binder. It will be understood that, while precast machinable stock may be used, it is possible to precast to intricate shapes and prefire to an underfired condition before the ceramic is subjected to Applicants' process. The ceramic, either stock or formed, is usually quite porous. The simplest method of chemically hardening the porous refractory structure is with a phosphoric acid treatment; however, this precludes multiple treatments as the reaction seems to go to completion in one treatment. the ceramic is impregnated with a concentrated phosphoric acid solution, usually of 85% concentration. The ceramic can be evacuated in a vacuum before immersion in the acid to hasten the impregnation or, as has been found to be particularly effective, the ceramic can be heated to form about 300° to about 600°F. and then immersed in the phosphoric acid solution. The heating causes a vacuum to be produced within the voids of the ceramic and the phosphoric acid is drawn all through the ceramic upon immersion. While a considerably longer time is required, the ceramic also can be just immersed in the phosphoric acid solution for a length of time sufficient for complete impregnation. Greater uniformity is achieved by using the vacuum or heating impregnation techniques. When the part is thoroughly impregnated with phosphoric acid, it is removed from the solution, excess phosphoric acid on the surface is drained or wiped off.

Next, Applicants' novel process comprises the controlled heat curing of the phosphoric acid impregnated ceramic. The heating cycle is usually started around 150°F. and ends at about at least about 900°F. The ceramic pieces are preferably placed in powdered asbestos, and the like, to minimize shock during the heating and cooling cycle. The powdered asbestos also serves to absorb liquid driven out of the ceramic as the temperature is raised. The excess liquid, if not absorbed, would be likely to craze the surface of the ceramic.

As pointed out, one of the unique features of the method of the invention is that virtually no dimensional changes occur in the machined piece during the hardening process. Therefore, expensive diamond-type machining of a hardened part is eliminated.

The property of physical hardness has been used as the primary means of determining effects of varying the underfired base materials, chemical treatment and curing methods. Table 11 below sets forth the hardness measurements for various materials which have been given a simple phosphoric acid treatment.

TABLE II

| | | | HARDNESS MEASUREMENTS FOR SIMPLE ACID TREATMENT | | | | | |
|---|---|---|---|---|---|---|---|---|
| Sample No. | Base Material | Type Designation | Manufacturer | Major Oxide | $H_3PO_4$ Impregnation | Mohs Hardness | Rockwell Hardness | Remarks |
| 21E | Alumina | AP-85-11 | Coors | 85% $Al_2O_3$ | 85% | 8–9 | A-66.5 | |
| 22E | Alumina | AP-94-11 | Coors | 94% $Al_2O_3$ | 85% | 6–7 | A-69.5 | |
| 23E | Alumina | AP-94-12 | Coors | 94% $Al_2O_3$ | 85% | 6–7 | A-71.0 | |
| 24E | Alumina | AP-94-12 (isostatic) | Coors | 94% $Al_2O_3$ | 85% | 6–7 | A-57.5 | |
| 25E | Alumina | AP-99-L3 | Coors | 99% $Al_2O_3$ | 85% | 8–9 | A-70.5 | |
| 20E | Alumina | AHP-99 | Coors | 99% $Al_2O_3$ | 85% | 6–7 | A-52.5 | |
| A7 | Alumina | AlSiMag 614 (underfired) | Am. Lava Corp. | 96% $Al_2O_3$ | 85% | 8–9 | A-73.7 | |
| 30E | Alumina | AlSiMag 393 | Am. Lava Corp. | 90% $Al_2O_3$ | 85% | 8–9 | Fractured | |
| 29E | Alumina | AlSiMag 548 | Am. Lava Corp. | 99.8% $Al_2O_3$ | 85% | 6–7 | Fractured | |
| 26E | Beryllia | BP-96-11 | Coors | 96% BeO | 85% | 6–7 | Fractured | |
| a-1 | Magnesia | 187E4 | Du-Co Ceramics | 89% MgO | 85% | 4–5 | Fractured | |
| 6-1 | Magnesia | 187E77 | Du-Co Ceramics | 96% MgO | 85% | 4–5 | A-37.0 | |
| 28-E | Magnesium Silicate | AlSiMag 222 | Am. Lava Corp. | $MgO.SiO_2$ | 85% | | | |
| 27-E | Silica | No. 3 Porosity | Amersil, Inc. | 99% $SiO_2$ | 85% | | Fractured | |
| 56-T | Titania | AlSiMag 192 (underfired) | Am. Lava Corp. | $TiO_2$ | 85% | 4–5 | Fractured | |
| Z-1 | Zirconia | 172H20 | Du-Co Ceramics | 95% $ZrO_2$ | 85% | 8–9 | A-54.0 | |

TABLE II-continued

HARDNESS MEASUREMENTS FOR SIMPLE ACID TREATMENT

| Sample No. | Base Material | Type Designation | Manufacturer | Major Oxide | $H_3PO_4$ Impregnation | Mohs Hardness | Rockwell Hardness | Remarks |
|---|---|---|---|---|---|---|---|---|
| 44T | Alumina | AlSiMag (2000°F.) | Am. Lava Corp. | $MgO.SiO_2$ | 85% | 5–6 | A-65.5 | |
| C60 | Alumina | AP-99C-l2 | Coors | 99% $Al_2O_3$ | 85% | | | |
| 146 | Alumina | AP-99C-L1 | Coors | 99% $Al_2O_3$ | 85% | | A-66.4 | |

Several significant differences in the final product are achieved by the variation of portions of the treating process. While a pure or nearly pure ceramic material can be significantly hardened by a phosphoric acid treatment, prior multiple impregnations of the ceramic with a solution of a salt convertible to an oxide and cures converting same to the oxide will produce an increase in the hardness of the ceramic and the further phosphoric acid treatment which may be given if desired usually produces an even harder end product.

Where the ceramic material is impregnated with a high concentration of phosphoric acid and heat treated, a good bearing material is produced and two pieces of this same material will slide against one another with a low coefficient of friction. After such pieces are worn in for a short while, a shiny surface film is produced which remains shiny even at elevated temperatures. Where the more concentrated phosphoric acid is used, the resulting product is more dense with smaller unfilled pores. Where a relatively pure ceramic oxide is treated, the addition thereto of another oxide during treatment substantially increases the hardness of the finished product. While it is not completely known what occurs in the treating process, the pores of the underfired ceramic are believed to be filled or partially filled with a reaction product of the ceramic and the additive, if any, with the phosphoric acid, probably a complex metal phosphate.

Where the ceramic material such as aluminum oxide is impregnated with a high concentration of phosphoric acid having dissolved therein aluminum phosphate crystals until saturated at from 250°– 400°F. and is then heat treated, a material is produced which cannot be polished to more than a dull finish, is quite porous and makes an excellent polishing and sharpening stone. This characteristic is also produced where the treatment with phosphoric acid is carried out with dilute acid solutions. It is believed that less reaction product is available to fill the pores, providing a more open and abrasive surface. Here again, the addition of another oxide during treatment substantially increases the hardness of the final product. The starting porous aluminum oxide grades have ranged from about 25 to about 60% effective porosity and, when subjected to a starved or dilute phosphoric acid treatment, remain quite porous which may account for the excellent polishing and sharpening characteristics of the thus treated material.

The heat treating of the phosphoric acid impregnated ceramic should be initiated at about 150°F. to 350°F. for a short period of time to drive out excess moisutre and then the temperature is raised in steps for a series of time intervals until the final cure is accomplished at at least 500°– 600°F. and preferably at at least 850°– 900°F. The ceramic will become quite hard at 500°F. – 600°F., but good electrical resistivity is not achieved until the ceramic is subjected to a temperature of 850°F. or higher. Temperatures above 1000°F. and as high as 3000°F. have been used with good success. It is found that, once the heat treatment has been carried to above 850°F., the temperature may be increased to well above the normal vitrifying temperatures (e.g. 3000°F.) without producing any shrinkage or change in the original physical dimensions. Further, the high temperautures do not appear to affect the hardness of the material from that of the material heated to 850°F.

While the mechanism of Applicants' process is not completely understood, it is believed that aluminum phosphate may be formed and deposited in the crystal lattice structure of the aluminum oxide as well as within the voids of the porous ceramic. Further, the phosphates of the impurities and/or additives may be formed and possibly as part of the lattice structure.

As pointed out above, the ceramic materials which are chemically treated and hardened according to one embodiment of the present process display the unique characteristic of exhibiting a low coefficient of friction when sliding against themselves. The coefficient of friction between identical pieces of the material is considerably less than when used in contact with any dissimilar ceramic or metal tested to date.

Although these materials may be operated dry where they are lightly loaded for limited periods of time, the starting friction is considerably higher than when a lubricating material is present. Lubrication may be by a number of different liquids such as tap water, sea water, kerosene, trichlorethylene, lubricating oils, silicone fluids and liquid metals. Dry lubricants such as molybdenum di-sulfide, graphite, wax or the like are also suitable. It is possible also to form the lubricant in situ within the pore structure of the bearing.

The bearings can be easily and economically fabricated in a wide variety of shapes and sizes. The untreated ceramic material in the form of partially fired bars or plates is machined in size and shape using conventional high speed steel or carbide tooling. The machined pieces are then chemically treated and hardened at temperatures substantially below normal vitrification tempertures. The hardening occurs with substantially no change in dimensions, thus avoiding expensive diamond machining of the finished part.

The ceramic bearing being fairly porous may be used as the lubricant reservoir analogous to that of sintered bronze bearings. In other instances, the bearing can be operated partially or totally submerged in the lubricant or the non-rotating member can be connected to an external lubricant reservoir.

Typical bearings fabricated of ceramic according to the present invention can withstand repeated water quenching from at least 1000°F., as well as prolonged exposure to temperatures as high as 2000°F. and as low as –300°F. The compressive strength is on the order of about 125,000 psi or better, and the hardness on the Mohs scale is between 9–10 on the order of about A-80 – A-90 on the Rockwell scale.

The ceramic materials of Table 1 were subjected to several slightly different treatments according to this invention, which are: (1) impregnation in phosphoric acid alone; (2) one or more oxide impregnations followed by a single phosphoric acid treatment; or, (3) one or more oxide impregnations alone.

A typical phosphoric acid impregnation process according to the present invention comprises heating the ceramic piece to about 300° – 600°F. for about 20 minutes, the piece is then immersed in an 85% phosphoric acid solution while hot for about 40 minutes. The piece is then placed in an oven and progressively heated from 150°F. to about 1000°F. over a period of about 120 minutes. The piece is then cooled to room temperature.

A typical combination salt and phosphoric acid impregnation process comprises heating the ceramic piece to about 250° – 450°F. for about 20 minutes. The heated piece is then immersed in the salt solution for about 40 minutes. The piece is removed from the salt solution and cured progressively from 150° F. to about 1000°F. over a period of 120 minutes. The previous steps can be repeated if desired. The piece is then cooled to about 600°F. and immersed in an 85% phosphoric acid solution for about 40 minutes. The piece is then placed in an oven and cured over a temperature range of from 150° to about 1000° F. over a period of about 120 minutes and subsequently cooled to ambient temperature in about 15 minutes.

Fully hardened samples were prepared according to the above treatments from the materials of Table 1.

As previously stated, impurities existing in the base material appear to have an effect on the resultant hardness of the treated piece. Therefore, it was decided to artificially add refractory oxides to the porous base structure prior to treating with the phosphoric acid. This was accomplished by impregnating the refractory base material with a nitrate, chloride, acetate or other highly water soluble salt or an acid of the oxide desired, and then converting to the metal oxide by heating slowly to an elevated temperature. Following the oxide impregnation cycle (which may consist of one or more salt or acid treatments) and curing, the body was then treated with phosphoric acid.

Tables III, IV, V and VI show the effect of added oxides to Coors alumina products AP-94-11, AP-85-11, AP-99-L3 and AHP-99, respectively. In these tests, three impregnations of the unsaturated salt were used (to assure ample "loading" with the desired oxide), followed by the 85% phosphoric acid treatment.

It is interesting to note that these tables show a wide variation in hardness depending on the oxide treatment. In some cases, the hardness is considerably increased over that of the same base material treated with acid only, while in others, the increase is not so marked. The hardness that is obtained with the phosphoric acid treatment only (no oxide impregnation) is listed for comparison purposes.

The $Cr_2O_3$ treatment is of special interest in that, when used with the 99%, 94% and 85% $Al_2O_3$ base structures, the resulting ceramic is exceptionally high in hardness as compared to all other oxide impregnations tested. The $Cr_2O_3$ may be added as a solution of a soluble salt or preferably as a concentrated solution of chromic acid. These four tables also show that the AHP-99 material (99% $Al_2O_3$) is the poorest choice for the base structure of these four types. However, since the AP-99-L3 is also a 99% alumina composition, it must be assumed that the hardness is not a factor of the refractory purity alone, but that other factors such as difference in effective pore size is probably responsible for some or all of the noted differences.

Tables VII, VIII and IX show the same type of data using aluminum oxides secured from the American Lava Corporation as their types 614 (underfired), 393 and 548. These are 96%, 90% and 99.8% $Al_2O_3$ compositions, respectively.

Hardness measurements obtained with Coors 96% beryllium oxide for four different salt impregnations is shown in Table X. It is interesting that this base material produces results about equal to the best alumina material tested (Coors AP-99), indicating that refractory skeletal structures other than alumina are definite condidates for the ceramic fabrication method.

Tables XI and XII show hardness results for oxide impregnated magnesia material. While the hardness values are quite low as compared to the alumina or the beryllia, this is to be expected since magnesia, even in its fully fired state, is not a particularly hard material (Mohs 5-½).

Tables XIII and XIV cover "AlSiMag" No. 222 magnesium silicate and "Amersil" 99% silica, respectively. For reasons not fully understood, refractory base materials containing a high percentage of silica do not appear to respond well to the phosphoric acid hardening method. Even in these two tests, however, the chromic oxide impregnation provided noticeably better results than the other impregnations used.

Table XV lists results obtained with a partially sintered, zirconia refractory base material. This particular underfired zirconia was fabricated from a calcia stabilized but coarse grain material. It is anticipated that a fine grained zirconia, and possibly a magnesium oxide stabilized type, would provide better results. Nevertheless, the zirconia also reacts to the chemical hardening method in the same general manner as does the alumina, magnesia and beryllia and, to a lesser extent, the magnesia silicate and silica materials. Table XVA lists results obtained with aluminum oxide material and Table XVB lists results obtained with titanium dioxide material.

With regard to the effect of pore size, it would be noted that the AHP-99 Coors material has quite large pores, compared to the other Coors material, being on the order of less than one micron compared with 2 to 3 microns for the AHP-99 materials. It would appear that the pore size would preferably be less than 2 microns and substantially uniform in size.

TABLE III

HARDNESS MEASUREMENTS FOR VARIOUS OXIDE IMPREGNATIONS
USING COORS AP-94-11 ALUMINA REFRACTORY BASE MATERIAL
(Acid Treated Hardness Mohs 8–9, Rockwell 70.7)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 1 | $Al_2O_3$ | $Al(NO_3)_3$ | 3x | 85% | 9–10 | A-71.5 | None | |
| 7-1 | BeO | $BeCl_2$ | 3x | 85% | 9–10 | A-74.4 | None | |
| 5 | CaO | $Ca(NO_3)_2$ | 3x | 85% | 8–9 | A-55 | None | |

TABLE III-continued

HARDNESS MEASUREMENTS FOR VARIOUS OXIDE IMPREGNATIONS USING COORS AP-94-II ALUMINA REFRACTORY BASE MATERIAL
(Acid Treated Hardness Mohs 8–9, Rockwell 70.7)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 3 | CdO | $Cd(NO_3)_2$ | 3x | 85% | 8–9 | A-63 | None | |
| C-1 | $CeO_2$ | $Ce(NO_3)_2$ | 3x | 85% | 9–10 | A-71.1 | None | |
| 9 | CoO | $Co(NO_3)_2$ | 3x | 85% | 8–9 | A-74.8 | None | |
| L-4 | $Cr_2O_3$ | $CrO_3$ | 3x | 85% | 9–10 | A-81.5 | None | |
| 7-3 | CuO | $Cu(NO_3)_2$ | 3x | 85% | 9–10 | A-61.0 | None | |
| 7 | $Fe_2O_3$ | $FeCl_3$ | 3x | 85% | 8–9 | A-72.5 | None | |
| 7-5 | $La_2O_3$ | $La(NO_3)_2$ | 3x | 85% | 8–9 | A-53.5 | Yes | |
| 7-7 | $Li_2O$ | $LiC_2H_3O_2$ | 3x | 85% | 8–9 | A-48.2 | Yes | |
| 11 | MgO | $Mg(C_2H_3O_2)_2$ | 3x | 85% | 9–10 | Fractured | Yes | |
| D-5 | $MgCr_2O_4$ | $MgCrO_4$ | 3x | 85% | 9–10 | A-73.8 | None | |
| 13 | NiO | $Ni(NO_3)_2$ | 3x | 85% | 9–10 | A-75.6 | None | |
| D-1 | SnO | $SnCl_2$ | 3x | 85% | 9–10 | A-71.7 | None | |
| 15 | SrO | $Sr(NO_3)_2$ | 3x | 85% | 8–9 | Fractured | Yes | |
| 7-9 | $ThO_2$ | $Th(NO_3)_4$ | 3x | 85% | 9–10 | A-73.5 | None | |
| 17 | $TiO_2$ | $Ti_2(C_2O_4)_3$ | 3x | 85% | 9–10 | A-73.5 | None | |
| 9-X | $WO_3$ | $H_4SiW_{10}O_{40}$ | 3x | 85% | 9–10 | A-72.1 | None | |
| Zn94 | ZnO | $ZnCl_2$ | 3x | 85% | 8–9 | A-73.8 | None | |
| | $ZrO_2$ | $ZrOCl_2$ | 3x | 85% | 9–10 | A-76.1 | None | |
| D-3 I-A | $Fe_2O_3 \cdot Cr_2O_3$ | $(1)FeCl_3 + (1)CrO_3$ | 3x | 85% | 9–10 | A-77 | None | |

TABLE IV

HARDNESS MEASUREMENTS FOR VARIOUS OXIDE IMPREGNATIONS USING COORS AP-85-II ALUMINA REFRACTORY BASE MATERIAL
(Acid Treated Hardness Mohs 8–9, Rockwell A-65.9)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 8-4 | $Al_2O_3$ | $Al(NO_3)_2$ | 3x | 85 | 8–9 | A-71 | None | |
| 8-2 | $CeO_2$ | $Ce(NO_3)_2$ | 3x | 85% | 9–10 | A-74 | Yes | |
| 8-1 | $Cr_2O_3$ | $CrO_3$ | 3x | 85% | 9–10 | A-81 | None | |
| 8-5 | MgO | $Mg(C_2H_3O_2)_2$ | 3x | 85% | 8–9 | A-66 | Yes | Shattered During Rockwell Test |
| 8-6 | $TiO_2$ | $Ti(C_2O_4)_3$ | 3x | 85% | 8–9 | A-68 | Yes | Shattered During Rockwell Test |
| 8-3 | $ZrO_2$ | $ZrOCl_2$ | 3x | 85% | 9–10 | A-72 | None | |

TABLE V

HARDNESS MEASUREMENTS FOR VARIOUS OXIDE IMPREGNATIONS USING COORS AP-99-L3 ALUMINA REFRACTORY BASE MATERIAL
(Acid Treated Hardness Mohs 8–9, Rockwell A-70.5)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| L-4 | $CeO_2$ | $Ce(NO_3)_2$ | 3x | 85% | 8–9 | A-69.1 | Yes | Exploded in Oven |
| L-1 | $Cr_2O_3$ | $CrO_3$ | 3x | 85% | 9–10 | A-80.5 | None | |
| L-3 | $MgCr_2O_4$ | $MgCrO_4$ | 3x | 85% | 9–10 | A-71.0 | None | |
| L-2 | $ZrO_2$ | $ZrOCl_2$ | 3x | 85% | 9–10 | A-60.1 | None | |

TABLE VI

HARDNESS MEASUREMENTS FOR VARIOUS OXIDE IMPREGNATIONS USING COORS AHP-99 ALUMINA REFRACTORY BASE MATERIAL
(Acid Treated Hardness Mohs 5–6, Rockwell A-54.8)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 2 | $Al_2O_3$ | $Al(NO_3)_2$ | 3x | 85% | 8–9 | A-60.0 | None | |
| 7-2 | BeO | $BeCl_2$ | 3x | 85% | 8–9 | A-57.0 | None | |
| 8-X | BeO | $Be(NO_3)_2$ | 3x | 85% | 6–7 | A-67.9 | None | |
| 6 | CaO | $Ca(NO_3)_2$ | 3x | 85% | 6–7 | Fractured | None | |
| 4 | CdO | $Cd(NO_3)_2$ | 3x | 85% | 4–5 | A-55.0 | None | |
| C-5 | $CeO_2$ | $Ce(NO_3)_2$ | 3x | 85% | 8–9 | A-54.9 | None | |
| 10 | CoO | $Co(NO_3)_2$ | 3x | 85% | 6–7 | A-62.2 | None | |
| K-7 | $Cr_2O_3$ | $CrO_3$ | 3x | 85% | 9–10 | A-69.2 | None | |
| 7-4 | CuO | $Cu(NO_3)_2$ | 3x | 85% | 4–5 | A-47.1 | None | |
| 8 | $Fe_2O_3$ | $FeCl_3$ | 3x | 85% | 8–9 | A-45.2 | None | |
| 7-6 | $La_2O_3$ | $La(NO_3)_2$ | 3x | 85% | 8–9 | A-59.0 | None | |
| 7-8 | $Li_2O$ | $LiC_2H_3O_2$ | 3x | 85% | 5–6 | A-53.1 | Yes | |
| 12 | MgO | $Mg(C_2H_3O_2)_2$ | 3x | 85% | 6–7 | A-52.3 | None | |
| K-3 | $MgCr_2O_4$ | $MgCrO_4$ | 3x | 85% | 9–10 | A-63.5 | None | |
| 14 | NiO | $Ni(NO_3)_2$ | 3x | 85% | 7–8 | A-59.6 | None | |
| 6-X | PbO | $Pb(NO_3)_2$ | 3x | 85% | 5–6 | A-55.1 | None | |
| 4-X | $Sb_2O_3$ | $SbCl_3$ | 3x | 85% | 6–7 | A-59.4 | None | |

TABLE VI-continued

HARDNESS MEASUREMENTS FOR VARIOUS OXIDE IMPREGNATIONS
USING COORS AHP-99 ALUMINA REFRACTORY BASE MATERIAL
(Acid Treated Hardness Mohs 5–6, Rockwell A-54.8)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| D-2 | SnO | $SnCl_2$ | 3x | 85% | 8–9 | A-52.0 | None | |
| 1b | SrO | $Sr(NO_3)_2$ | 3x | 85% | 8–9 | A-26.0 | None | |
| 7-9 | $ThO_2$ | $Th(NO_3)_4$ | 3x | 85% | 9–10 | A-58.7 | None | |
| 18 | $TiO_2$ | $Ti_2(C_2O_4)_3$ | 3x | 85% | 8–9 | A-53.3 | None | |
| 10-X | $WO_3$ | $H_4SiW_{16}O_{40}$ | 3x | 85% | 8–9 | A-69.0 | None | |
| Zn-1 | ZnO | $Zn(NO_3)_2$ | 3x | 85% | 8–9 | A-48.1 | None | |
| An99 | ZnO | $ZnCl_2$ | 3x | 85% | 8–9 | A-72.8 | None | |
| K-5 | $ZrO_2$ | $ZrOCl_2$ | 3x | 85% | 8–9 | A-61.7 | None | |

TABLE VII

HARDNESS MEASUREMENTS FOR VARIOUS OXIDE IMPREGNATIONS
USING ALSIMAG 614 (UNDERFIRED) ALUMINA REFRACTORY BASE MATERIAL*
(Acid Treated Hardness Mohs 8–9, Rockwell A-73.7, 96% $Al_2O_3$)

| Sample No. | Oxid Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| A-11 | $CeO_2$ | $Ce(NO_3)_2$ | 3x | 85% | 8–9 | A-69.0 | None | Fractured During Rockwell Test |
| A-14 | $Cr_2O_3$ | $CrO_3$ | 3x | 85% | 9–10 | A-76.0 | None | |
| A-13 | CoO | $Co(NO_3)_2$ | 3x | 85% | 9–10 | A-73.0 | None | Fractured During Rockwell Test |
| A-8 | $MgCr_2O_4$ | $MgCrO_4$ | 3x | 85% | 9–10 | A-65.5 | None | Fractured During Rockwell Test |
| A-12 | NiO | $Ni(NO_3)_2$ | 3x | 85% | 6–7 | A-72.5 | None | Fractured During Rockwell Test |
| A-10 | ZnO | $Zn(NO_3)_2$ | 3x | 85% | 6–7 | A-73.3 | None | |
| A-9 | $ZrO_2$ | $ZroCl_2$ | 3x | 85% | 9–10 | A-68.0 | None | Fractured During Rockwell Test |

*Fired at >2000°F.

TABLE VIII

HARDNESS MEASUREMENTS FOR VARIOUS OXIDE IMPREGNATIONS
USING ALSIMAG 393 ALUMINA REFRACTORY BASE MATERIAL
(Acid Treated Hardness Mohs 8–9, Rockwell A-N.M., 90% $Al_2O_3$)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| A-4 | $Cr_2O_3$ | $CrO_3$ | 3x | 85% P | 9–10 | A-77.0 | None | |
| A-5 | $MgCr_2O_4$ | $MgCrO_4$ | 3x | 85% P | 9–10 | Shattered | None | |
| A-6 | $ZrO_2$ | $ZrOCl_2$ | 3x | 85% P | 8–9 | A-68.5 | None | |

TABLE IX

HARDNESS MEASUREMENTS FOR VARIOUS OXIDE IMPREGNATIONS
USING ALSIMAG 548 ALUMINA REFRACTORY BASE MATERIAL
(Acid Treated Hardness Mohs 6–7, Rockwell A-N.M., 99.8% $Al_2O_3$)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| A-1 | $Cr_2O_3$ | $CrO_3$ | 3x | 85% | 8–9 | Fractured | None | |
| A-2 | $MgCr_2O_4$ | $MgCrO_4$ | 3x | 85% | 8–9 | Fractured | None | |
| A-3 | $ZrO_2$ | $ZrOCl_2$ | 3x | 85% | 8–9 | A-76.4 | None | |

TABLE X

HARDNESS MEASUREMENTS FOR VARIOUS OXIDE IMPREGNATIONS
USING COORS BP-96-11 BERYLLIA REFRACTORY BASE MATERIAL
(Acid Treated Hardness Mohs 6–7, Rockwell A-N.M.)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| B-1 | $Al_2O_3$ | $Al(NO_3)_2$ | 3x | 85% | 8–9 | A-74 | None | |
| B-2 | $Cr_2O_3$ | $CrO_3$ | 3x | 85% | 9–10 | A-81 | None | Shattered in Rockwell Testing |
| B-4 | $MgCrO_4$ | $MgCrO_4$ | 3x | 85% | 9–10 | A-71 | None | |
| B-3 | $ZrO_2$ | $ZrOCl_2$ | 3x | 85% | 9–10 | A-75 | None | Shattered in Rockwell Testing |

TABLE XI

HARDNESS MEASUREMENTS FOR VARIOUS OXIDE IMPREGNATIONS USING DU-CO 89% MAGNESIA REFRACTORY BASE MATERIAL
(Acid Treated Hardness Mohs 4–5, Rockwell - Fractured)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 9-4 | $Al_2O_3$ | $Al(NO_3)_2$ | 3x | 85% | 4–5 | Fractured | None | |
| 9-2 | $Cr_2O_3$ | $CrO_3$ | 3x | 85% | 8–9 | Fractured | None | |
| 9-3 | $MgCr_2O_4$ | $MgCrO_4$ | 3x | 85% | 8–9 | A-51.5 | None | |
| 9-6 | $TiO_2$ | $Ti_2(C_2O_4)_3$ | 3x | 85% | N.M. | N.M. | | MgO Base Disintegrated |
| 9-5 | $ZrO_2$ | $ZrOCl_2$ | 3x | 85% | N.M. | N.M. | | MgO Base Disintegrated |

TABLE XII

HARDNESS MEASUREMENTS FOR VARIOUS OXIDE IMPREGNATIONS USING DU-CO 96% MAGNESIA REFRACTORY BASE MATERIAL
(Acid Treated Hardness Mohs 4–5, Rockwell A-37.0)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 6-4 | $Al_2O_3$ | $Al(NO_3)_2$ | 3x | 85% | 3–4 | Fractured | None | |
| 6-2 | $Cr_2O_3$ | $CrO_3$ | 3x | 85% | 6–7 | Fractured | None | |
| 6-3 | $MgCr_2O_4$ | $MgCrO_4$ | 3x | 85% | 6–7 | A-44.25 | None | |
| 6-6 | $TiO_2$ | $Ti_2(C_2O_4)_3$ | 3x | 85% | N.M. | N.M. | | Dissolved |
| 6-5 | $ZrO_2$ | $ZrOCl_2$ | 3x | 85% | N.M. | N.M. | | Dissolved |

TABLE XIII

HARDNESS MEASUREMENTS FOR VARIOUS OXIDE IMPREGNATIONS USING ALSIMAG 222 MAGNESIUM-SILICATE REFRACTORY BASE MATERIAL
(Acid Treated Hardness Mohs 2–3, Rockwell A-N.M.)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| MS-1 | $Al_2O_3$ | $Al(NO_3)_2$ | 3x | 85% | 3–4 | Fractured | None | |
| MS-2 | $Cr_2O_3$ | $CrO_3$ | 3x | 85% | 8–9 | Fractured | None | |
| MS-3 | $MgCr_2O_4$ | $MgCrO_4$ | 3x | 85% | 7–8 | A-41 | None | Shattered During Rockwell Test |
| MS-4 | $ZrO_2$ | $ZrOCl_2$ | 3x | 85% | 1–2 | Fractured | None | |

TABLE XIV

HARDNESS MEASUREMENTS FOR VARIOUS OXIDE IMPREGNATIONS USING AMERSIL NO. 3 POROSITY SILICA REFRACTORY BASE MATERIAL
(Acid Treated Hardenss Mohs N.M., Rockwell A-N.M.)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| S-2 | $Al_2O_3$ | $Al(NO_3)_2$ | 3x | 85% | 4–5 | Fractured | None | |
| S-6 | $CeO_2$ | $Ce(NO_3)_2$ | 3x | 85% | 4–5 | Fractured | None | |
| S-1 | $Cr_2O_3$ | $CrO_3$ | 3x | 85% | 6–7 | A-54.0 | None | |
| S-3 | MgO | $Mg(C_2H_3O_2)_2$ | 3x | 85% | 4–5 | Fractured | None | |
| S-5 | $MgCrO_4$ | $MgCrO_4$ | 3x | 85% | 6–7 | Fractured | None | |
| S-4 | $ZrO_2$ | $ZrOCl_2$ | 3x | 85% | 4–5 | Fractured | None | |

TABLE XV

HARDNESS MEASUREMENTS FOR VARIOUS OXIDE IMPREGNATIONS USING DU-CO ZIRCONIA REFRACTORY BASE MATERIAL
(Acid Treated Hardness Mohs 8–9, Rockwell A-54.0)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| Z-4 | $Al_2O_3$ | $Al(NO_3)_2$ | 3x | 85% | 6–7 | A-46.8 | None | |
| Z-2 | $Cr_2O_3$ | $CrO_3$ | 3x | 85% | 9–10 | A-66.2 | None | |
| Z-7 | MgO | $Mg(C_2H_3O_2)_2$ | 3x | 85% | 6–7 | Fractured | None | |
| Z-3 | $MgCr_2O_4$ | $MgCrO_4$ | 3x | 85% | 9–10 | A-58.0 | None | |
| Z-8 | $ThO_2$ | $Th(NO_3)_2$ | 3x | 85% | 6–7 | A-55.3 | None | |
| Z-6 | ZnO | $Zn(NO_3)_2$ | 3x | 85% | 6–7 | A-44.7 | None | |
| Z-5 | $ZrO_2$ | $ZrOCl_2$ | 3x | 85% | 8–9 | A-60.3 | None | |

TABLE XVA

HARDNESS MEASUREMENTS FOR VARIOUS OXIDE IMPREGNATIONS USING ALSIMAG 614 96% $Al_2O_3$ REFRACTORY BASE MATERIAL PARTIALLY SINTERED AT 2000°F.
(Acid Treated Hardness Mohs 8–9, Rockwell A-73.7)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 40T | $Cr_2O_3$ | $CrO_3$ | 3x | 85% | 9–10 | A-82.5 | None | |
| 41T | $ZrO_2$ | $ZrOCl_2$ | 3x | 85% | 9–10 | A-74.5 | None | |
| 42T | $MgCr_2O_4$ | $MgCrO_4$ | 3x | 85% | 9–10 | A-67.5 | None | |
| 43T | NiO | $Ni(NO_3)_2$ | 3x | 85% | 9–10 | A-69.5 | None | |
| 44T | | None | | 85% | 5–6 | A-65.6 | None | |

TABLE XVB

HARDNESS MEASUREMENTS FOR VARIOUS OXIDE IMPREGNATIONS USING ALSIMAG 192 TITANIA 98% $TiO_2$ REFRACTORY BASE MATERIAL PARTIALLY SINTERED AT 2000°F.
(Acid Treated Hardness Mohs 4–5, Rockwell A-N.M.)

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 50-T | $Cr_2O_3$ | $CrO_3$ | 3x | 85% | 8–9 | A-77.5 | None | |
| 51-T | $ZrO_2$ | $ZrOCl_2$ | 3x | 85% | 8–9 | A-66.0 | None | |
| 52-T | BeO | $Be(NO_3)_2$ | 3x | 85% | 6–7 | A-69.0 | None | |
| 53-T | MgO | $Mg(C_2H_3O_2)_2$ | 3x | 85% | 6–7 | Fractured | | |
| 54-T | $Al_2O_3$ | $Al(NO_3)_2$ | 3x | 85% | 5–6 | Fractured | | |
| 55-T | $MgCr_2O_4$ | $MgCrO_4$ | 3x | 85% | 9–10 | A-65.0 | | |
| 56-T | | None | | 85% | 4–5 | Fractured | | |

Tables XVI–XXIX show the hardness of selected base materials which have been treated wtih multiple salt impregnations to illustrate the effect on hardness of varying the amount of added oxide prior to the final acid treatment. In the preceding Tables, all samples were impregnated with the salt solution three times. The following impregnations were varied from as few as one time to a maximum of eleven times, and included a final phosphoric acid treatment. The base materials and oxide impregnations tested in this manner were selected from the materials of Table I.

Table XVI shows the effect of 1 through 11 chromic oxide impregnations using Coors AP-99-L3 alumina base material, while Table XVIA shows the effect of 1 through 8 chromic oxide impregnations with AP-94-11 alumina base material and Table XVII shows 1 through 5 impregnations with AP-94-12 material. These tables show the definite increase in hardness with increase in number of oxide impregnations. The rate of increase in hardness is also seen to decrease as the number of impregnations increase. This would appear to follow since there is probably less and less interstitial space for the oxides with each successive treatment. Specific gravity and porosity tests bear this out.

TABLE XVI

HARDNESS VARIATION WITH NUMBER OF CHROMIC OXIDE IMPREGNATIONS USING COORS AP-99-L3 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 80-L | $Cr_2O_3$ | $CrO_3$ | 1x | 85% | 9–10 | A-73.2 | None | |
| 81-L | $Cr_2O_3$ | $CrO_3$ | 3x | 85% | 9–10 | A-80.4 | None | |
| 82-L | $Cr_2O_3$ | $CrO_3$ | 5x | 85% | 9–10 | A-83.9 | None | |
| 83-L | $Cr_2O_3$ | $CrO_3$ | 7x | 85% | 9–10 | A-87.6 | | |
| 84-L | $Cr_2O_3$ | $CrO_3$ | 9x | 85% | 9–10 | A-88.3 | None | |
| 85-L | $Cr_2O_3$ | $CrO_3$ | 11x | 85% | 9–10 | A-88.9 | None | |

TABLE XVIA

HARDNESS VARIATION WITH NUMBER OF CHROMIC OXIDE IMPREGNATIONS USING COORS AP-94-11 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| L-8 | $Cr_2O_3$ | $CrO_3$ | 1x | 85% | 9–10 | A-76.4 | None | |
| L-9 | $Cr_2O_3$ | $CrO_3$ | 2x | 85% | 9–10 | A-80.7 | None | |
| 3X | $Cr_2O_3$ | $CrO_3$ | 3x | 85% | 9–10 | A-81.8 | None | |
| — | $Cr_2O_3$ | $CrO_3$ | 4x | 85% | 9–10 | | | |
| 5X | $Cr_2O_3$ | $CrO_3$ | 5x | 85% | 9–10 | A-85.0 | None | |
| 6X | $Cr_2O_3$ | $CrO_3$ | 6x | 85% | 9–10 | A-85.0 | None | |
| 7X | $Cr_2O_3$ | $CrO_3$ | 7x | 85% | 9–10 | A-86.0 | None | |
| 8X | $Cr_2O_3$ | $CrO_3$ | 8x | 85% | 9–10 | A-87.0 | None | |

TABLE XVII

HARDNESS VARIATION WITH NUMBER OF CHROMIC OXIDE IMPREGNATIONS USING COORS AP-94-12 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| L-7 | $Cr_2O_3$ | $CrO_3$ | 1x | 85% | 9–10 | A-75.8 | | |
| K-8 | $Cr_2O_3$ | $CrO_3$ | 2x | 85% | 9–10 | A-79.6 | | |
| L-4 | $Cr_2O_3$ | $CrO_3$ | 3x | 85% | 9–10 | A-81.5 | | |
| L-5 | $Cr_2O_3$ | $CrO_3$ | 4x | 85% | 9–10 | A-83.9 | | |
| 2-S | $Cr_2O_3$ | $CrO_3$ | 5x | 85% | 9–10 | A-86.0 | | |
| | | | 6x | 85% | | | | |
| 3-S | $Cr_2O_3$ | $CrO_3$ | 7x | 85% | 9–10 | A-83.0 | | |
| 4-S | $Cr_2O_3$ | $CrO_3$ | 9x | 85% | 9–10 | A-84.0 | | |
| 5-S | $Cr_2O_3$ | $CrO_3$ | 11x | 85% | 9–10 | A-85.0 | | |

These tables show that there is very little difference in the hardness results obtained between the AP-94-11 and the AP-94-12 materials. The difference between these two base materials is in their sintering temperatures, respectively 1700°F. and 2130°F.

Table XVIII shows the results obtained with chromic oxide impregnations on Coors AHP-99 alumina material. While the hardness increases with the number of chromic oxide impregnations, the hardness numbers obtained for a given number of treatments is much less than those obtained with chromic oxide treatment of Coors AP-99-L3 material of Table XVI. Since these alumina materials are both 99% aluminum oxide, and both have the same effective porosity of about 40%, the differences measured must be a result of the different pore size. The AHP-99 material has larger pores believed to be on the order of 2–3 microns average, while the AP-99-L3 average pore size appears to be on the order of 0.6–0.7 microns.

TABLE XVIII

HARDNESS VARIATION WITH NUMBER OF CHROMIC OXIDE IMPREGNATIONS USING COORS AHP-99 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| O-6 | $Cr_2O_3$ | $CrO_3$ | 1x | 85% | 8–9 | A-57.4 | None | |
| L-1 | $Cr_2O_3$ | $CrO_3$ | 2x | 85% | 9–10 | A-69.2 | None | |
| O-7 | $Cr_2O_3$ | $CrO_3$ | 3x | 85% | 8–9 | A-68.7 | None | |
| L-2 | $Cr_2O_3$ | $CrO_3$ | 4x | 85% | 9–10 | A-73.0 | None | |
| O-8 | $Cr_2O_3$ | $CrO_3$ | 5x | 85% | | | | |
| | | | 6x | | | | | |
| 3-U | $Cr_2O_3$ | $CrO_3$ | 7x | 85% | 9–10 | A-80.0 | None | |
| | | | 8x | | | | | |
| 4-U | $Cr_2O_3$ | $CrO_3$ | 9x | 85% | 9–10 | A-76.0 | None | |
| | | | 10x | | | | | |
| 5-U | $Cr_2O_3$ | $CrO_3$ | 11x | 85% | 9–10 | A-79.0 | |

Tables XIX and XX show the effect on hardness for 1 through 5 impregnations of zirconium oxide into base materials of AP-94-12 and AHP-99 alumina, respectively. Again, the AP-94 material produces greater hardness than the AHP-99 for comparable impregnations. Also, while the AP-94 material impregnated with zirconium oxide does not produce as hard an end product as does the chromic oxide impregnation, the reverse is true when considering the AHP-99 material. Again, the explanation is undoubtedly connected with differences in pore size and/or impurities in the base material.

Tables XXI and XXII show similar tests to those just described, except that the impregnant was a concentrated solution of magnesium chromate instead of a concentrated solution of zirconyl chloride.

TABLE XIX

HARDNESS VARIATIONS WITH NUMBER OF ZIRCONIUM OXIDE IMPREGNATIONS USING COORS AP-94-12 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| Y-1 | $ZrO_2$ | $ZrOCl_2$ | 1x | 85% | 8–9 | A-71.9 | None | |
| K-6 | $ZrO_2$ | $ZrOCl_2$ | 2x | 85% | 8–9 | A-74.6 | None | |
| 5-T | $ZrO_2$ | $ZrOCl_2$ | 3x | 85% | 9–10 | A-70.0 | None | |
| | | | 4x | | | | | |
| 6-T | $ZrO_2$ | | 5x | 85% | 9–10 | A-73.0 | None | |
| | | | 6x | | | | | |
| 7-T | $ZrO_2$ | $ZrOCl_2$ | 7x | 85% | 9–10 | A-73.0 | None | |
| | | | 8x | | | | | |
| 8-T | $ZrO_2$ | $ZrOCl_2$ | 9x | 85% | 9–10 | A-80.5 | None | |
| | | | 10x | | | | | |
| 9-T | $ZrO_2$ | $ZrOCl_2$ | 11x | 85% | 9–10 | A-78.0 | None | |

TABLE XX

HARDNESS VARIATIONS WITH NUMBERS OF ZIRCONIUM OXIDE IMPREGNATIONS USING COORS AHP-99 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| Y-2 | $ZrO_2$ | $ZrCl_2$ | 1x | 85% | 5–6 | A-55.5 | None | |
| Y-4 | $ZrO_2$ | $ZrCl_2$ | 2x | 85% | 9–10 | A-63.5 | None | |
| K-5 | $ZrO_2$ | $ZrCl_2$ | 3x | 85% | 9–10 | A-61.7 | None | |
| Y-5 | $ZrO_2$ | $ZrCl_2$ | 4x | 85% | 9–10 | A-71.6 | None | |

TABLE XXI

HARDNESS VARIATION WITH NUMBER OF MAGNESIUM CHROMITE IMPREGNATIONS USING COORS AP-94-12 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| M-1 | $MgCr_2O_4$ | $MgCrO_4$ | 1x | 85% | 9–10 | A-66 | None | |
| M-2 | $MgCr_2O_4$ | $MgCrO_4$ | 3x | 85% | 9–10 | A-72 | None | |
| M-3 | $MgCr_2O_4$ | $MgCrO_4$ | 5x | 85% | 9–10 | A-70 | None | |

TABLE XXII

HARDNESS VARIATION WITH NUMBER OF MAGNESIUM CHROMITE IMPREGNATIONS USING COORS AHP-99 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| M-4 | $MgCr_2O_4$ | $MgCrO_4$ | 1x | 85% | 6–7 | A-50 | None | |
| M-5 | $MgCr_2O_4$ | $MgCrO_4$ | 3x | 85% | 9–10 | A-53 | None | |
| M-6 | $MgCr_2O_4$ | $MgCrO_4$ | 5x | 85% | 9–10 | A-61 | None | |

Tables XXIII and XXIV are for ceric oxide impregnated AP-94-11 and AHP-99 base materials, respectively. Table XXV covers the AP-94 material with concentrated cobalt nitrate solution used as the impregnant. Table XXVI is for the same base material but using a concentrated silico-tungstic acid solution for the impregnant. Table XXVII is again for the AP-94 base material but using a 1:1 mixture of concentrated ferric chloride solution and chromic acid as the impregnating solution to form what appears to be a ferric chromite when cured.

TABLE XXIII

HARDNESS VARIATIONS WITH NUMBER OF CERIC OXIDE IMPREGNATIONS USING COORS AP-94-11 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| C-0 | $CeO_2$ | $Ce(NO_3)_2$ | 2x | 85% | 8–9 | A-68.3 | None | |
| C-1 | $CeO_2$ | $Ce(NO_3)_2$ | 3x | 85% | 9–10 | A-71.1 | None | |
| C-2 | $CeO_2$ | $Ce(NO_3)_2$ | 4x | 85% | 9–10 | A-72.9 | None | |
| C-3 | $CeO_2$ | $Ce(NO_3)_2$ | 5x | 85% | 9–10 | A-74.6 | None | |
| C-4 | $CeO_2$ | $Ce(NO_3)_2$ | 6x | 85% | 9–10 | A-75.7 | None | |

TABLE XXIV

HARDNESS VARIATIONS WTIH NUMBER OF CERIC OXIDE IMPREGNATIONS USING COORS AHP-99 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| C-5 | $CeO_2$ | $Ce(NO_3)_2$ | 3x | 85% | 8–9 | A-54.9 | None | |
| C-6 | $CeO_2$ | $Ce(NO_3)_2$ | 4x | 85% | 8–9 | A-59.4 | None | |
| C-7 | $CeO_2$ | $Ce(NO_3)_2$ | 5x | 85% | 8–9 | A-59.0 | None | |
| C-8 | $CeO_2$ | $Ce(NO_3)_2$ | 6x | 85% | 8–9 | A-60.1 | None | |

TABLE XXV

HARDNESS VARIATION WITH NUMBER OF COBALT OXIDE IMPREGNATIONS USING COORS AP-94-I2 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 3-B | CoO | $Co(NO_3)_2$ | 1x | 85% | 9–10 | A-71.5 | None | |
| | — | — | 2x | — | — | — | — | |
| 4-B | CoO | $Co(NO_3)_2$ | 3x | 85% | 9–10 | A-73.0 | None | |

TABLE XXV-continued

HARDNESS VARIATION WITH NUMBER OF COBALT OXIDE IMPREGNATIONS USING COORS AP-94-I2 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| — | — | — | 4x | — | — | — | — | |
| 1-T | CoO | $Co(NO_3)_2$ | 5x | 85% | 9–10 | A-74.5 | None | |

TABLE XXVI

HARDNESS VARIATIONS WITH NUMBER OF TUNGSTIC OXIDE IMPREGNATIONS USING COORS AP-94-I2 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 1-W | $WO_3$ | $H_4SiW_{16}O_{40}$ | 1x | 85% | 8–9 | A-69.0 | None | |
| 2-W | $WO_3$ | $H_4SiW_{16}O_{40}$ | 3x | 85% | 7–8 | A-71.0 | None | |
| 5-W | $WO_3$ | $H_4SiW_{16}O_{40}$ | 4x | 85% | 9–10 | A-76.0 | None | |
| 3-W | $WO_3$ | $H_4SiW_{16}O_{40}$ | 5x | 85% | 9–10 | A-76.0 | None | |
| 7-W | $WO_3$ | $H_4SiW_{16}O_{40}$ | 6x | 85% | — | — | — | |
| 8-W | $WO_3$ | $H_4SiW_{16}O_{40}$ | 7x | 85% | 9–10 | A-75.0 | None | |

TABLE XXVII

HARDNESS VARIATIONS WITH NUMBER OF FERRIC CHROMITE IMPREGNATIONS USING COORS AP-94-I2 ALUMINA REFRACTORY BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 4-A | $Fe_2O_3Cr_2O_3$ | (1)$FeCl_3$+ (1)$CrO_3$ | 1x | 85% | 6–7 | A-72 | None | |
| — | — | — | 2x | — | — | — | — | |
| 1-A | $Fe_2O_3Cr_2O_3$ | (1)$FeCl_3$+ (1)$CrO_3$ | 3x | 85% | 9–10 | A-75 | None | |
| 2-A | $Fe_2O_3Cr_2O_3$ | (1)$FeCl_3$+ (1)$CrO_3$ | 4x | 85% | 9–10 | A-77 | None | |
| 3-A | $Fe_2O_3Cr_2O_3$ | (1)$FeCl_3$+ (1)$CrO_3$ | 5X | 85% | 9–10 | A-82 | None | |

A zirconia base material has been used for tests shown as Tables XXVIII and XXIX. These are for a coarse grain, calcia stabilized, 95% zirconia underfired refractory material with chromic oxide and zirconium oxide impregnations as shown.

TABLE XXVIII

HARDNESS VARIATIONS WITH NUMBER OF CHROMIC OXIDE IMPREGNATIONS USING DU-CO, CALCIA STABILIZED, 95% ZIRCONIA BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 20-Z | $Cr_2O_3$ | $CrO_3$ | 3x | 85% | 6–7 | A-69.5 | None | |
| 21-Z | $Cr_2O_3$ | $CrO_3$ | 5x | 85% | 6–7 | A-78.5 | None | |
| 22-Z | $Cr_2O_3$ | $CrO_3$ | 7x | 85% | 6–7 | A-77 | None | |
| 23-Z | None | None | None | 85% | 8–9 | A-54 | None | |

TABLE XXIX

HARDNESS VARIATIONS WITH NUMBER OF ZIRCONIUM OXIDE IMPREGNATIONS USING DU-CO, CALCIA STABILIZED, 95% ZIRCONIA BASE MATERIAL

| Sample No. | Oxide Formed | Salt Impregnation | No. Salt Impreg. | $H_3PO_4$ Impregnation | Mohs Hardness | Rockwell Hardness | Cracks | Remarks |
|---|---|---|---|---|---|---|---|---|
| 23-Z | $ZrO_2$ | $ZrOCl_2$ | 3x | 85% | 6–7 | A-65 | None | |
| 24-Z | $ZrO_2$ | $ZrOCl_2$ | 5x | 85% | 6–7 | A-66 | None | |
| 25-Z | $ZrO_2$ | $ZrOCl_2$ | 7x | 85% | 6–7 | Fractured | — | |
| 26-Z | None | None | None | 85% | 8–9 | A-54 | None | |

A series of multiple phosphoric acid treatments of the Coors AP-94, AP-85 and AHP-99 alumina base materials has been investigated. The results are shown in Tables XXX, XXXI and XXXII. For the most part, these tests show that one phosphoric acid treatment is equal to, or better than, more than one treatment.

Table XXXIII shows the same type of multiple acid treatment test, except that the Coors (AP-94) material has been first impregnated with three chromic acid applications prior to the final phosphoric acid treatments. Again, one phosphoric acid treatment appears to be optimum.

TABLE XXX

MULTIPLE ACID IMPREGNATIONS USING COORS AP-94-I2 ALUMINA REFRACTORY BASE MATERIAL

| Sample No. | Salt Impregnation | No. Salt Impreg. | H₃PO₄ Impregnation | No. Acid Impreg. | Mohs Hardness | Rockwell Hardness | Cracks | Remarks |
|---|---|---|---|---|---|---|---|---|
| P-1 | None | — | 85% | 1x | 8–9 | A-68.7 | None | |
| P-2 | None | — | 85% | 2x | 8–9 | A-67.8 | None | |
| P-3 | None | — | 85% | 3x | 6–7 | A-67.7 | None | |
| P-4 | None | — | 42½% | 1x | 4–5 | A-64.8 | Yes | Fractured |
| P-5 | None | — | 42½% | 2x | 6–7 | A-58.7 | Yes | Fractured |
| P-6 | None | — | 42½% | 3x | 6–7 | A-58.5 | None | Fractured |

TABLE XXXI

MULTIPLE ACID IMPREGNATIONS USING COORS AP-85-II ALUMINA REFRACTORY BASE MATERIAL

| Sample No. | Salt Impregnation | No. Salt Impreg. | H₃PO₄ Impregnation | No. Acid Impreg. | Mohs Hardness | Rockwell Hardness | Cracks | Remarks |
|---|---|---|---|---|---|---|---|---|
| P-7 | None | — | 85% | 1x | 8–9 | A-61.2 | Yes | |
| P-8 | None | — | 85% | 2x | 9–10 | A-58.5 | Yes | Fractured |
| P-9 | None | — | 85% | 3x | 6–7 | A-63.0 | None | |
| P-10 | None | — | 42½% | 1x | 4–5 | A-53.7 | None | |
| P-11 | None | — | 42½% | 2x | 6–7 | Fractured | Yes | Fractured |
| P-12 | None | — | 42½% | 3x | 6–7 | A-67.6 | Yes | |

TABLE XXXII

MULTIPLE ACID IMPREGNATIONS USING COORS AHP-99 ALUMINA REFRACTORY BASE MATERIAL

| Sample No. | Salt Impregnation | No. Salt Impreg. | H₃PO₄ Impregnation | No. Acid Impreg. | Mohs Hardness | Rockwell Hardness | Cracks | Remarks |
|---|---|---|---|---|---|---|---|---|
| P-13 | None | — | 85% P | 1x | 5–6 | A-44.2 | None | |
| P-14 | None | — | 85% P | 2x | 6–7 | A-45.0 | Yes | Fractured |
| P-15 | None | — | 85% P | 3x | 6–7 | A-68.0 | None | |
| 1-R | None | — | 85% P | 3x | N.M. | N.M. | Yes | |
| 2-R | None | — | 85% P | 4x | N.M. | N.M. | Yes | |
| 3-R | None | — | 85% P | 5x | N.M. | N.M. | Yes | |
| 4-R | None | — | 85% P | 6x | N.M. | N.M. | Yes | |
| P-16 | None | — | 42½% P | 1x | 4–5 | A-31.7 | None | |
| P-17 | None | — | 42½% P | 2x | 6–7 | Fractured | Yes | Fractured |
| P-18 | None | — | 42½% P | 3x | 6–7 | A-41.3 | None | |

TABLE XXXIII

MULTIPLE ACID IMPREGNATION TEST USING COORS AP-94-I2 ALUMINA REFRACTORY BASE MATERIAL WITH CHROMIC OXIDE PRE-TREATMENT

| Sample No. | Salt Impregnation | No. Salt Impreg. | H₃PO₄ Impregnation | No. Acid Impreg. | Mohs Hardness | Rockwell Hardness | Cracks | Remarks |
|---|---|---|---|---|---|---|---|---|
| 1-C | CrO₃ | 3x | 85% | 1x | 9–10 | A-82.5 | None | |
| 2-C | CrO₃ | 3x | 85% | 2x | 9–10 | A-81.0 | None | |
| 3-C | CrO₃ | 3x | 42½% | 1x | 9–10 | A-78.1 | None | |
| 4-C | CrO₃ | 3x | 42½% | 2x | 9–10 | A-81.0 | None | |
| 5-C | CrO₃ | 3x | 42½% | 3x | 9–10 | A-81.0 | None | |

Tables XXIV and XXXV show the effect of varying the phosphoric acid concentration. In the previous tests, the acid strength has been either 85% or 42½% H₃PO₄. In these two tests, 95%, 90% and 75% phosphoric acid are also compared with the standard 85% strength treatment. Table XXXIV covers the AP-94 base material and Table XXXV the AHP-99 material.

TABLE XXXIV

EFFECT ON HARDNESS OF VARYING ACID CONCENTRATION USING COORS AP-94-I2 ALUMINA REFRACTORY BASE MATERIAL

| Sample No. | Salt Impregnation | No. Salt Impreg. | H₃PO₄ Impregnation | No. Acid Impreg. | Mohs Hardness | Rockwell Hardness | Cracks | Remarks |
|---|---|---|---|---|---|---|---|---|
| 21-E | None | — | 95% | 1x | 5–6 | A-63.0 | None | |
| 23-E | None | — | 85% | 1x | 6–7 | A-65.0 | None | |
| 25-E | None | — | 75% | 1x | 6–7 | A-59.5 | None | |
| P-4 | None | — | 42½% | 1x | 4–5 | A-64.8 | None | |
| 27-E | CrO₃ | 3x | 95% | 1x | 9–10 | A-83.0 | None | |
| 29-E | CrO₃ | 3x | 85% | 1x | 9–10 | A-80.5 | None | |
| 31-E | CrO₃ | 3x | 75% | 1x | 8–9 | A-82.0 | None | |
| 3-C | CrO₃ | 3x | 42½% | 1x | 9–10 | A-81.0 | None | |

TABLE XXXIV-continued

EFFECT ON HARDNESS OF VARYING ACID CONCENTRATION
USING COORS AP-94-I2 ALUMINA REFRACTORY BASE MATERIAL

| Sample No. | Salt Impregnation | No. Salt Impreg. | $H_3PO_4$ Impregnation | No. Acid Impreg. | Mohs Hardness | Rockwell Hardness | Cracks | Remarks |
|---|---|---|---|---|---|---|---|---|
| L-4 | $CrO_3$ | 3x | 85% | 1x | 9–10 | A-81.5 | None | |

TABLE XXXV

EFFECT ON HARDNESS OF VARYING ACID CONCENTRATION
USING COORS AHP-99 ALUMINA REFRACTORY BASE MATERIAL

| Sample No. | Salt Impregnation | No. Salt Impreg. | $H_3PO_4$ Impregnation | No. Acid Impreg. | Mohs Hardness | Rockwell Hardness | Cracks | Remarks |
|---|---|---|---|---|---|---|---|---|
| 20-E | None | — | 95% | 1x | 4–5 | A-46.0 | None | |
| 22-E | None | — | 85% | 1x | 6–7 | A-56.0 | None | |
| 24-E | None | — | 75% | 1x | 6–7 | A-46.0 | None | |
| P-16 | None | — | 42½% | 1x | 4–5 | A-31.7 | None | |
| 26-E | $CrO_3$ | 3x | 95% | 1x | 5–6 | A-70.0 | None | |
| 28-E | $CrO_3$ | 3x | 85% | 1x | 4–5 | A-74.0 | None | |
| 30-E | $CrO_3$ | 3x | 75% | 1x | 4–5 | A-71.5 | None | |

When conducting impregnation tests with various metal oxides, it was found that a marked increase in the Mohs hardness scratch number occurred in several instances, even before the final phosphoric acid treatment. It has now been found that this marked increased in hardness occurs with at least two single oxides; chromic oxide and cobalt oxide, and at least two complex oxides; magnesium chromite and iron chromite, when used in their water soluble form as impregnants for one or more of the porous alumina base materials. A fifth impregnant, silico-tungsten acid, has also been found to react in a similar manner.

Tables XXXVI and XXXVII, respectively, show the hardness measurements obtained with AP-94-11 and AHP-99 alumina base materials with multiple impregnations with chromium trioxide "chromic acid" which is converted to chromic oxide on curing (no final acid treatment). Table XXXVIII covers the same two base refractory materials with multiple impregnation with magnesium chromate which is converted to magnesium chromite on curing, and Table XXXIX shows the same Coors AP-94-11 alumina material, but using multiple pregnations with ferric chloride-chromic acid solution which is converted to ferric chromite on curing. Table XXXIXA shows the Coors AP-94-12 material with multiple silica-tungstic acid impregnations.

TABLE XXXVI

HARDNESS MEASUREMENTS FOR MULTIPLE $Cr_2O_3$ IMPREGNATIONS
WITHOUT FINAL ACID TREATMENT
USING COORS AP-94-I2 ALUMINA REFRACTORY BASE MATERIAL

| Sample No. | Base Material | Salt Impregnation | No. Salt Impreg. | $H_3PO_4$ Impregnation | Mohs Hardness | Rockwell Hardness | Cracks | Remarks |
|---|---|---|---|---|---|---|---|---|
| O-1 | AP-94-I2 | $CrO_3$ | 1x | None | 4–5 | A-43.0 | None | |
| O-2 | AP-94-I2 | $CrO_3$ | 2x | None | 4–5 | A-62.2 | None | |
| O-3 | AP-94-I2 | $CrO_3$ | 3x | None | 8–9 | A-74.0 | None | |
| O-4 | AP-94-I2 | $CrO_3$ | 4x | None | 9–10 | A-82.0 | None | |
| O-5 | AP-94-I2 | $CrO_3$ | 5x | None | 9–10 | A-84.0 | None | |
| 3-S | AP-94-I2 | $CrO_3$ | 7x | None | 9–10 | A-84.0 | None | |
| 4-S | AP-94-I2 | $CrO_3$ | 9x | None | 9–10 | A-84.5 | None | |
| 5-S | AP-94-I2 | $CrO_3$ | 11x | None | 9–10 | A-86.0 | None | |

TABLE XXXVII

HARDNESS MEASUREMENTS FOR MULTIPLE $Cr_2O_3$ IMPREGNATIONS
WITHOUT FINAL ACID TREATMENT
USING COORS AHP-99 ALUMINA REFRACTORY BASE MATERIAL

| Sample No. | Base Material | Salt Impregnation | No. Salt Impreg. | $H_3PO_4$ Impregnation | Mohs Hardness | Rockwell Hardness | Cracks | Remarks |
|---|---|---|---|---|---|---|---|---|
| O-6 | AHP-99 | $CrO_3$ | 1x | None | 3–4 | A-15.2 | None | |
| O-7 | AHP-99 | $CrO_3$ | 3x | None | 6–7 | A-54.7 | None | |
| O-8 | AHP-99 | $CrO_3$ | 5x | None | 8–9 | A-69.0 | None | |
| 3-U | AHP-99 | $CrO_3$ | 7x | None | 9–10 | A-75.0 | None | |
| 4-U | AHP-99 | $CrO_3$ | 9x | None | 9–10 | A-78.0 | None | |
| 5-U | AHP-99 | $CrO_3$ | 11x | None | 9–10 | A-79.5 | None | |

TABLE XXXVIII

HARDNESS MEASUREMENTS FOR MULTIPLE MAGNESIUM CHROMITE IMPREGNATIONS WITHOUT FINAL ACID TREATMENT

| Sample No. | Base Material | Salt Impregnation | No. Salt Impreg. | $H_3PO_4$ Impregnation | Mohs Hardness | Rockwell Hardness | Cracks |
|---|---|---|---|---|---|---|---|
| M-1 | AP-94-12 | $MgCrO_4$ | 1x | None | 4–5 | A-24.7 | None |
| M-2 | AP-94-12 | $MgCrO_4$ | 3x | None | 8–9 | A-49.2 | None |
| M-3 | AP-94-12 | $MgCrO_4$ | 5x | None | 9–10 | A-63.1 | None |
| M-4 | AHP-99 | $MgCrO_4$ | 1x | None | 3–4 | A-8.7 | None |
| M-5 | AHP-99 | $MgCrO_4$ | 3x | None | 6–7 | A-28.8 | None |
| M-6 | AHP-99 | $MgCrO_4$ | 5x | None | 8–9 | A-39.0 | None |

TABLE XXXIX

HARDNESS MEASUREMENTS FOR MULTIPLE IMPREGNATIONS WITHOUT FINAL ACID TREATMENT USING COORS AP-94-11 ALUMINA REFRACTORY BASE MATERIAL

| Sample No. | Oxide Formed | Salt Impregnation | No. Salt Impreg. | $H_3PO_4$ Impregnation | Mohs Hardness |
|---|---|---|---|---|---|
| 4-A | $Fe_2O_3 \cdot Cr_2O_3$ | (1)$FeCl_3$+(1)$CrO_3$ | 1x | | 4–5 |
| 5-A | $Fe_2O_3 Cr_2O_3$ | (1)$FeCl_3$+(1)$CrO_3$ | 3x | | 9–10 |
| 6-A | $Fe_2O_3 Cr_2O_3$ | (1)$FeCl_3$+(1)$CrO_3$ | 5x | | 9–10 |

TABLE XXXIXA

HARDNESS MEASUREMENTS FOR MULTIPLE TUNGSTIC OXIDE IMPREGNATIONS WITHOUT FINAL ACID TREATMENT USING COORS AP-94-12 ALUMINA REFRACTORY BASE MATERIAL

| Sample No. | Base Material | Salt Impregnation | No. Salt Impreg. | $H_3PO_4$ Impregnation | Mohs Hardness | Rockwell Hardness | Cracks | Remarks |
|---|---|---|---|---|---|---|---|---|
| 1-W | AP-94-12 | $H_4SiW_{16}O_{40}$ | 1x | None | 4–5 | A-35.0 | None | |
| 2-W | AP-94-12 | $H_4SiW_{16}O_{40}$ | 3x | None | 7–8 | Fractured | None | |
| 5-W | AP-94-12 | $H_4SiW_{16}O_{40}$ | 4x | None | 8–9 | A-75.0 | None | |
| 3-W | AP-94-12 | $H_4SiW_{16}O_{40}$ | 5x | None | 8–9 | A-69.5 | None | |
| 7-W | AP-94-12 | $H_4SiW_{16}O_{40}$ | 6x | None | 9–10 | A-65.0 | None | |
| 8-W | AP-94-12 | $H_4SiW_{16}O_{40}$ | 7x | None | 9–10 | A-74.0 | None | |

Compressive strength tests have been conducted for several treated refractory ceramics using the ASTM tentative standard, Method C528-637.

The data presented in Tables XL, XLI, XLII and XLIII cover Coors AP-94-11, AP-94-12, AP-85-11 and AP-99-L3 alumina refractory base materials, respectively, with a single phosphoric acid treatment only.

TABLE XL

COMPRESSIVE STRENGTH MEASUREMENTS FOR COORS AP-94-11 ALUMINA REFRACTORY BASE MATERIAL USING SINGLE ACID TREATMENT ONLY

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| 1 | None | — | 85% | .622 | .303 | 22.7K | 74,800 psi | |
| 2 | None | — | 85% | .623 | .304 | 23.2K | 76,500 psi | |
| 3 | None | — | 85% | .625 | .306 | 24.2K | 82,200 psi | |
| 4 | None | — | 85% | .622 | .303 | 16.2K | 53,500 psi | |
| 5 | None | — | 85% | .622 | .303 | 22.4K | 74,000 psi | |
| Avg. | | | | | | | 72,500 psi | |

TABLE XLI

COMPRESSIVE STRENGTH MEASUREMENTS FOR COORS AP-94-12 ALUMINA REFRACTORY BASE MATERIAL USING SINGLE ACID TREATMENT ONLY

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| 1 | None | — | 85% | .622 | .303 | 26.3K | 87,000 psi | |
| 2 | None | — | 85% | .623 | .304 | 21.8K | 71,800 psi | |
| 3 | None | — | 85% | .625 | .306 | 25.7K | 83,800 psi | |
| 4 | None | — | 85% | .621 | .302 | 29.0K | 94,000 psi | |
| 5 | None | — | 85% | .624 | .305 | 22.0K | 72,300 psi | |
| Avg. | | | | | | | 81,800 psi | |

TABLE XLII

COMPRESSIVE STRENGTH MEASUREMENTS FOR COORS AP-85-11 ALUMINA REFRACTORY BASE MATERIAL USING SINGLE ACID TREATMENT ONLY

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| 1 | None | — | 85% | .625 | .306 | 17.8K | 58,300 psi | |
| 2 | None | — | 85% | .625 | .306 | 20.0K | 65,500 psi | |
| 3 | None | — | 85% | .625 | .306 | 12.6K | 41,000 psi | |
| 4 | None | — | 85% | .624 | .305 | 12.7K | 41,600 psi | |
| 5 | None | — | 85% | .623 | .304 | 18.95K | 62,300 psi | |
| Avg. | | | | | | | 53,740 psi | |

TABLE XLIII

COMPRESSIVE STRENGTH MEASUREMENTS FOR COORS AP-99-L3 ALUMINA REFRACTORY BASE MATERIAL USING SINGLE ACID TREATMENT ONLY

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| 1 | None | — | 85% | .625 | .306 | 23.6K | 77,400 psi | |
| 2 | None | — | 85% | .624 | .305 | 21.7K | 71,000 psi | |
| 3 | None | — | 85% | .625 | .305 | 21.6K | 70,900 psi | |
| Avg. | | | | | | | 73,100 psi | |

Tables XLIV, XLV and XLVI cover Coors AHP-99 base material with three impregnations of chromic oxide (chromic acid), magnesium chromite and zirconium oxide, respectively. A final, single phosphoric acid treatment was also used in each case.

Table XLVII shows compressive strength measurements for Coors AP-94-11 material with three chromic oxide (chromic acid) impregnations, plus final phosphoric acid treatment.

TABLE XLIV

COMPRESSIVE STRENGTH MEASUREMENTS FOR COORS AHP-99 ALUMINA REFRACTORY BASE MATERIAL USING CHROMIC OXIDE IMPREGNATIONS PLUS SINGLE ACID TREATMENT

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| N-7 | $CrO_3$ | 3x | 85% | .249 | .049 | 3900 | 78,100 psi | |
| N-8 | $CrO_3$ | 3x | 85% | .250 | .049 | 4475 | 89,600 psi | |
| C-1 | $CrO_3$ | 3x | 85% | .249 | .049 | 4150 | 85,215 psi | |
| C-2 | $CrO_3$ | 3x | 85% | .250 | .049 | 3750 | 76,375 psi | |
| C-3 | $CrO_3$ | 3x | 85% | .250 | .049 | 3050 | 62,370 psi | |
| C-4 | $CrO_3$ | 3x | 85% | .249 | .049 | 4375 | 89,835 psi | |
| Avg. | | | | | | | 80,249 psi | |

TABLE XLV

COMPRESSIVE STRENGTH MEASUREMENTS FOR COORS AHP-99 ALUMINA REFRACTORY BASE MATERIAL USING MAGNESIUM CHROMITE IMPREGNATIONS PLUS SINGLE ACID TREATMENT

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| N-2 | $MgCrO_4$ | 3x | 85% | .250 | .0492 | 4175 | 83,600 psi | |
| N-3 | $MgCrO_4$ | 3x | 85% | .250 | .0492 | 3575 | 71,500 psi | |
| Avg. | | | | | | | 77,550 psi | |

TABLE XLVI

COMPRESSIVE STRENGTH MEASUREMENTS FOR COORS AHP-99 ALUMINA REFRACTORY BASE MATERIAL USING ZIRCONIUM OXIDE IMPREGNATIONS PLUS SINGLE ACID TREATMENT

| Sample No. | Salt Impregnation | No. Salt Impreg. | $H_3PO_4$ Impregnation | Sample Diameter | Area (in²) | Lbf | Compressive Strength | Remarks |
|---|---|---|---|---|---|---|---|---|
| N-5 | $ZrOCl_2$ | 3x | 85% | .249 | .049 | 2375 | 47,500 psi | |
| N-6 | $ZrOCl_2$ | 3x | 85% | .250 | .049 | 1800 | 36,050 psi | |
| Avg. | | | | | | | 41,775 psi | |

TABLE XLVII

COMPRESSIVE STRENGTH MEASUREMENTS FOR COORS AP-94-I1 ALUMINA REFRACTORY BASE MATERIAL USING CHROMIC OXIDE IMPREGNATIONS

| Sample No. | Salt Impregnation | No. Salt Impreg. | $H_3PO_4$ Impregnation | Sample Diameter | Area ($in^2$) | Lbf | Compressive Strength | Remarks |
|---|---|---|---|---|---|---|---|---|
| C-5 | $CrO_3$ | 3x | 85% | .251 | .049 | 6100 | 123,730 psi | |
| C-6 | $CrO_3$ | 3x | 85% | .251 | .049 | 6600 | 133,333 psi | |
| Avg. | | | | | | | 128,532 psi | |

Modulus of Rupture tests have been conducted using the procedure of ASTM Method C-369-56 with the exception that the sample size has been reduced. The with multiple (three and six) chromic oxide (chromic acid) impregnations and with chromic acid plus other oxide impregnations.

TABLE XLVIII

MODULUS OF RUPTURE TEST DATA FOR COORS AP-94-I2 (ISOSTATIC) ALUMINA REFRACTORY BASE MATERIAL

| Sample No. | Salt Impregnation | No. Salt Impreg. | $H_3PO_4$ Impregnation | Diameter | Support Distance | Lbf | Modulus of Rupture | Remarks |
|---|---|---|---|---|---|---|---|---|
| 1-R | None | — | 85% | 0.295 | | 68 | 10,200 | |
| 2-R | None | — | 85% | 0.295 | | 68 | 10,200 | |
| 3-R | $CrO_3$ | 3x | 85% | 0.293 | | 92 | 14,000 | |
| 4-R | $CrO_3$ | 3x | 85% | 0.292 | | 65 | 10,000 | |
| 5-R | $CrO_3$ | 6x | 85% | 0.254 | | 76 | 11,480 | |

TABLE XLVIIIA

MODULUS OF RUPTURE TEST DATA FOR COORS AP-99-L3 ALUMINA REFRACTORY BASE MATERIAL

| Sample No. | Salt Impregnation | No. Salt Impreg. | $H_3PO_4$ Impregnation | Diameter | Support Distance | Lbf | Modulus of Rupture | Remarks |
|---|---|---|---|---|---|---|---|---|
| 7 | None | — | 85% | .260 | 1.50 in. | 82 | 17,900 | |
| 9 | $CrO_3$ | 3x | 85% | .258 | 1.50 in. | 125 | 27,900 | |
| 10 | $CrO_3$ | 3x | 85% | .258 | 1.50 in. | 110 | 24,500 | |
| 11 | $CrO_3$ | 6x | 85% | .258 | 1.50 in. | 84 | 18,700 | |
| 12 | $CrO_3$ | 6x | 85% | .260 | 1.50 in. | 164 | 35,700 | |
| 13 | $CrO_3$+ $ZrOCl_2$ | 4x 2x | 85% | .258 | 1.50 in. | 148 | 33,000 | |
| 14 | $CrO_3$+ $ZrOCl_2$ | 4x 2x | 85% | .257 | 1.50 in. | 128 | 28,900 | |
| 15 | $CrO_3$+ $Ni(NO_3)_2$ | 4x 2x | 85% | .260 | 1.50 in. | 110 | 24,000 | |
| 16 | $CrO_3$+ $Ni(NO_3)_2$ | 4x 2x | 85% | .258 | 1.50 in. | 124 | 27,600 | |
| 17 | $CrO_3$+ $H_4SiW_{16}O_{40}$ | 4x 2x | 85% | .258 | 1.50 in. | 105 | 23,400 | |
| 19 | $CrO_3$ + $Be(NO_3)_2$ | 4x 2x | 85% | .258 | 1.50 in. | 80 | 17,800 | |

ASTM Method calls for samples ¾ inch in diameter × 6 inches in length. The present ceramic samples have been prepared with dimensions on the order of ¼ inch in diameter × 2 inches in length. The sample size change was made because of the lack of curing ovens long enough to conveniently handle the 6 inches piece.

Table XLVIII lists the modulus of rupture test results for the Coors AP-94-12 base material with multiple (zero, three and six) chromic oxide (chromic acid) impregnations, and Table XLVIIIA lists the modulus of rupture tests for the Coors AP-99-L3 base material Specific gravity determinations for a number of the porous refractory base materials, measured in the received condition, are presented in Table XLVIX.

Specific gravity measurements for some of these same materials, but processed with a single phosphoric acid treatment, are listed in Table L.

Table LI shows specific gravity measurements for Coors AP-99-L3 alumina base material with 1 through 11 chromic oxide (chromic acid) impregnations. This table shows that a maximum density was obtained with nine chromic oxide impregnations.

TABLE XLVIX

SPECIFIC GRAVITY DETERMINATIONS FOR VARIOUS REFRACTORY BASE MATERIALS WITHOUT OXIDE OR ACID TREATMENTS (AS RECEIVED CONDITION)

| Sample No. | Base Material | Salt Impreg. | No. Salt Impreg. | $H_3PO_4$ Impreg. | Volume (cc) | Wt. in Air (Dry)(gms) | Length (cm) | Diameter (cm) | Specific Gravity |
|---|---|---|---|---|---|---|---|---|---|
| A99 | AHP-99 | None | — | None | 1.684 | 3.53 | 1.471 | 1.210 | 2.10 |
| B93 | AP-99-L3 | None | — | None | 1.674 | 3.95 | 1.474 | 1.205 | 2.36 |
| C51 | AP-85-I1 | None | — | None | 1.645 | 3.94 | 1.456 | 1.200 | 2.39 |
| D41 | Ap-94-I1 | None | — | None | 1.678 | 4.15 | 1.478 | 1.205 | 2.47 |
| E42 | AP-94-I2 | None | — | None | 1.696 | 4.21 | 1.494 | 1.205 | 2.48 |
| E421 | AP-94-I2 | None | — | None | 1.678 | 3.60 | 1.478 | 1.204 | 2.14 |

TABLE XLVIX-continued

SPECIFIC GRAVITY DETERMINATIONS FOR VARIOUS REFRACTORY BASE MATERIALS WITHOUT OXIDE OR ACID TREATMENTS (AS RECEIVED CONDITION)

| Sample No. | Base Material | Salt Impreg. | No. Salt Impreg. | $H_3PO_4$ Impreg. | Volume (cc) | Wt. in Air (Dry)(gms) | Length (cm) | Diameter (cm) | Specific Gravity |
|---|---|---|---|---|---|---|---|---|---|
| | (Isostatic) | | | | | | | | |

TABLE L

SPECIFIC GRAVITY DETERMINATIONS FOR VARIOUS REFRACTORY BASE MATERIALS WITH SINGLE ACID TREATMENT ONLY

| Sample No. | Base Material | Salt Impreg. | No. Salt Impreg. | $H_3PO_4$ Impreg. | Volume (cc) | Wt. in Air (Dry)(gms) | Length (cm) | Diameter (cm) | Specific Gravity |
|---|---|---|---|---|---|---|---|---|---|
| A99 | AHP-99 | None | — | 85% | 1.71 | 4.31 | 1.494 | 1.210 | 2.52 |
| A93 | AP-99-L3 | None | — | 85% | 1.678 | 4.63 | 1.474 | 1.206 | 2.75 |
| A51 | AP-85-I1 | None | — | 85% | 1.632 | 4.49 | 1.466 | 1.194 | 2.75 |
| A41 | AP-94-I1 | None | — | 85% | 1.671 | 4.74 | 1.475 | 1.204 | 2.83 |
| A42 | AP-94-I2 | None | — | 85% | 1.692 | 4.83 | 1.494 | 1.204 | 2.85 |
| A421 | AP-94-I2 (Isostatic) | None | — | 85% | 1.675 | 4.32 | 1.478 | 1.203 | 2.58 |

TABLE LI

SPECIFIC GRAVITY DETERMINATIONS FOR COORS AP-99-L3 ALUMINA REFRACTORY BASE MATERIAL WITH MULTIPLE CHROMIC OXIDE IMPREGNATIONS

| Sample No. | Base Material | Salt Impreg. | No. Salt Impreg. | $H_3PO_4$ Impreg. | Volume (cc) | Wt. in Air (Dry)(gms) | Length (cm) | Diameter (cm) | Specific Gravity |
|---|---|---|---|---|---|---|---|---|---|
| 1 | AP-99-L3 | $CrO_3$ | 1x | None | 1.337 | 3.70 | .704 | 1.555 | 2.77 |
| 2 | AP-99-L3 | $CrO_3$ | 3x | 85% | 1.349 | 4.23 | .710 | 1.555 | 3.09 |
| 3 | AP-99-L3 | $CrO_3$ | 5x | 85% | 1.368 | 4.74 | .714 | 1.563 | 3.46 |
| 4 | AP-99-L3 | $CrO_3$ | 7x | 85% | 1.337 | 4.95 | .704 | 1.555 | 3.70 |
| 5 | AP-99-L3 | $CrO_3$ | 9x | 85% | 1.391 | 5.30 | .726 | 1.563 | 3.81 |
| 6 | AP-99-L3 | $CrO_3$ | 11x | 85% | 1.334 | 5.07 | .696 | 1.564 | 3.80 |

To determine the effective porosity of these ceramic materials, water absorption tests were made. The porosity percentage was calculated by determining the weight of the absorbed water in grams divided by the volume of the sample in cubic centimeters. This type of measurement gives the effective porosity only since there may be completely entrapped pores or pores too small to admit water.

Table LII shows the effective porosity measurements made for a number of the porous, underfired refractory base materials prior to any treatment of any kind. These materials show porosity variations ranging from about 30 to about 50% for the types tested.

Table LIII shows the same type data as above except that the porous base materials have been given a single phosphoric acid treatment only.

TABLE LII

EFFECTIVE POROSITY DETERMINATIONS FOR VARIOUS REFRACTORY BASE MATERIALS WITHOUT OXIDE OR ACID TREATMENT (AS RECEIVED CONDITION)

| Sample No. | Base Material | Salt Impreg. | No. | $H_3PO_4$ Impreg. | Wt. Soaked in $H_2O$(gms) | Wt. in Air (Dry)(gms) | $H_2O$(gms) Absorbed | Volume (cc) | Effective Porosity |
|---|---|---|---|---|---|---|---|---|---|
| A99 | AHP-99 | None | — | None | 4.30 | 3.53 | .77 | 1.684 | 45.7% |
| B93 | AP-99-L3 | None | — | None | 4.66 | 3.95 | .71 | 1.673 | 42.4% |
| C51 | AP-85-I1 | None | — | None | 4.49 | 3.94 | .55 | 1.645 | 33.4% |
| D41 | AP-94-I1 | None | — | None | 4.71 | 4.15 | .56 | 1.678 | 33.5% |
| E42 | AP-94-I2 | None | — | None | 4.77 | 4.21 | .56 | 1.696 | 33.0% |
| F421 | AP-94-I2 (Isostatic) | None | — | None | 4.34 | 3.60 | .74 | 1.678 | 44.1% |

TABLE LIII

EFFECTIVE POROSITY DETERMINATIONS FOR VARIOUS REFRACTORY BASE MATERIALS WITH SINGLE ACID TREATMENT ONLY

| Sample No. | Base Material | Salt Impreg. | No. | $H_3PO_4$ Impreg. | Wt. Soaked in $H_2O$(gms) | Wt. in Air (Dry)(gms) | $H_2O$ (gms) Absorbed | Volume (cc) | Effective Porosity |
|---|---|---|---|---|---|---|---|---|---|
| 99 | AHP-99 | None | — | 85% | 4.64 | 4.31 | .33 | 1.710 | 19.3% |
| 93 | AP-99-L3 | None | — | 85% | 4.87 | 4.62 | .25 | 1.678 | 14.9% |
| 51 | AP-85-I1 | None | — | 85% | 4.70 | 4.49 | .21 | 1.632 | 12.9% |
| 41 | AP-94-I1 | None | — | 85% | 4.95 | 4.74 | .26 | 1.671 | 12.6% |
| 42 | AP-94-I2 | None | — | 85% | 5.03 | 4.83 | .20 | 1.692 | 11.8% |
| 421 | AP-94-I2 (Isostatic) | None | — | 85% | 4.66 | 4.32 | .28 | 1.675 | 16.7% |

Table LIV presents data obtained by using 1 through 11 chromic oxide (chromic acid) impregnations followed by the single phosphoric acid treatment. In this test, Coors AP-99-L3 base material was used. As in the case of the specific gravity measurements, minimum porosity occurs at about 9–11 impregnations.

TABLE LIV

EFFECTIVE POROSITY DETERMINATIONS FOR COORS AP-99-L3 ALUMINA REFRACTORY BASE MATERIAL WITH MULTIPLE CHROMIC OXIDE IMPREGNATIONS

| Sample No. | Base Material | Salt Impreg. | No. | $H_3PO_4$ Impreg. | Wt. Soaked in $H_2O$(gms) | Wt. in Air (Dry)(gms) | $H_2O$(gms) Absorbed | Volume (cc) | Effective Porosity |
|---|---|---|---|---|---|---|---|---|---|
| 1 | AP-99-L3 | $CrO_3$ | 1x | None | 3.95 | 3.70 | .25 | 1.337 | 18.2% |
| 2 | AP-99-L3 | $CrO_3$ | 3x | None | 4.52 | 4.23 | .29 | 1.349 | 21.5% |
| 3 | AP-99-L3 | $CrO_3$ | 5x | None | 4.95 | 4.78 | .21 | 1.368 | 15.3% |
| 4 | AP-99-L3 | $CrO_3$ | 7x | None | 5.10 | 4.95 | .15 | 1.337 | 11.2% |
| 5 | AP-99-L3 | $CrO_3$ | 9x | None | 5.32 | 5.30 | .02 | 1.391 | 1.43% |
| 6 | AP-99-L3 | $CrO_3$ | 11x | None | 5.08 | 5.07 | .01 | 1.334 | 0.74% |

Samples of AHP-99 alumina, with single phosphoric acid treatment only, have been fabricated in the form of thin discs measuring ¼ inch × 3 inches. They were then heated to 1000°F. and water quenched, reheated to 1000°F. and again quenched for a total of ten cycles. No visible signs of cracking or checking were observed.

The same type test has been performed with similarly prepared samples using liquid nitrogen as the quenching media. While liquid nitrogen does not produce as severe a thermal shock as does a good conductor such as water, it does, however, provide a much wider temperature excursion. The samples were left immersed until gas formation ceased and it is estimated that a temperature of about −300°F. had been reached. Again, no cracks or fatiguing were noticed after ten cycles.

These two thermal shock cyclings (1000°F. and liquid nitrogen) were repeated using AP-94-11 alumina base material. These samples were prepared, however, with three, five and seven chromic oxide (chromic acid) impregnations prior to the final phosphoric acid treatment. In this case, the samples measured approximately ⅛ inch in thickness by ¾ inch in diameter. Again, no cracking or structural failure occurred after ten cycles in either environment. Mohs hardness measurements also remained unchanged from the pre-test condition.

All the ceramic type materials produced according to the present invention have been repeatedly cycled between ambient temperature and 2000°F. This includes Coors AHP-99, AP-94, AP-85 to AP-99, basic alumina material with $Cr_2O_3$, $MgCr_2O_4$, $ZrO_2$ and many other multiple oxide impregnations, as well as several similar combinations with the beryllia, zirconia and magnesia base materials. It has also been found that ceramic parts produced by this invention can be cooled very rapidly after heating to high temperatures. For example, a thin cross section piece can be removed from a 2000°F. oven and placed directly on an aluminum cooling plate without cracking.

Thin plates of Coors AHP-99 base material with single phosphoric acid treatment have been exposed continuously to 1000°F. for 6½ days. No fracturing or cracking could be detected and the pre- and post-exposure hardness measurements were identical.

Additional samples were prepared using Coors AHP-99 and AP-94-12 base materials with three magnesium chromite and five chromic oxide (chromic acid) impregnations, respectively. In each type sample, a final phosphoric acid treatment was used following the oxide impregnation. These samples were exposed to 1000°F. for 60 hours followed by 8 hours at 2000°F. Again, no structural or hardness changes could be observed.

Sample ceramic parts (approximately ⅛ inch thick × ¾ inch in diameter) using AHP-99 base material with a single phosphoric acid treatment have also been immersed in liquid nitrogen for 16 hours and then removed and returned to room temperature. No change in hardness was observed and no evidence of cracking or fractures could be found.

Tests have been conducted with machined rods and discs of ceramic materials produced by the instant process to determine what changes occur in dimension between the pre-hardened and the treated and hardened condition. The accuracy of these measurements is considered to be ±.0001

Table LV covers AP-99-L3, AP-85-11 and AP-94-12 porous alumina machined pieces before and after a single phosphoric acid treatment. These parts were cured at a final temperature of 1800°F.

TABLE LV

DIMENSIONAL CHANGE TESTS FOR HARDENED VS. PRE-HARDENED CERAMIC MATERIAL MAX. TEMP. 1800°F., 1 HR.

| Sample No. | Base Material | Salt Impreg. | No. | $H_3PO_4$ Impreg. | Pre-Hardened Dimensions Length | Pre-Hardened Dimensions Diameter | Hardened Dimensions Length | Hardened Dimensions Diameter | Percent Change Length | Percent Change Diameter |
|---|---|---|---|---|---|---|---|---|---|---|
| E | AP-99-L3 | None | — | 85% | 4.957 | 0.3653 | 4.955 | 0.3652 | −0.040% | −0.027% |
| C | AP-94-12 | None | — | 85% | 0.7001 | 0.3781 | 0.7001 | 0.3779 | 0% | −0.058% |
| B | AP-94-11 | None | — | 85% | 0.9467 | 0.8536 | 0.9457 | 0.8532 | −0.105% | −0.045% |
| D-9 | AHP-99 | $CrO_3$ | 3x | 85% | 0.8521 | 1.0940 | 0.8521 | 1.0940 | 0% | 0% |
| D-4 | AP-94-11 | $CrO_3$ | 3x | 85% | 0.1954 | 0.7560 | 0.1954 | 0.7555 | 0% | −0.066% |
| D-7 | AP-94-11 | $ZrOU_2$ | 3x | 85% | 0.8971 | 0.3040 | 0.8963 | 0.3037 | −0.089% | −0.096% |
| | AP-94-12 | $CrO_3$ | 3x | 85% | | | | | | |

Note: Pre-hardened dimensions were read from the machined base material prior to any chemical treatment. Hardened dimensions were read after chemically treating part and curing to 1800°F. for 1 hour.

Table LVI shows dimensional change readings for AP-99-L3 and AP-94-12 materials treated with multiple oxide impregnations followed by a final single acid treatment and cured at a final temperature of 1800°F. Percentage values, as above, reflect change in dimension between those of the original machined basic porous structure and those obtained after the part has been chemically treated and hardened. As can be seen, the dimensional changes are exceedingly small.

TABLE LVI

DIMENSIONAL CHANGE TESTS FOR HARDENED VS. PRE-HARDENED CERAMIC MATERIAL
MAX. TEMP. 2300°F., 2 HRS.

| Sample No. | Base Material | Salt Impreg. | No. | $H_3PO_4$ Impreg. | Pre-Hardened Dimensions Length | Diameter | Hardened Dimensions Length | Diameter | Precent Change Length | Diameter |
|---|---|---|---|---|---|---|---|---|---|---|
| D70 | AP-99-L3 | $CrO_3$ | 3x | 85% | 1.9765 | 0.2570 | 1.9765 | 0.2570 | 0% | 0% |
| D71 | AP-99-L3 | $CrO_3$ | 6x | 85% | 1.9760 | 0.2595 | 1.9765 | 0.2595 | +0.025% | 0% |
| D-72 | AP-99-L3 | $ZrOCl_2$ | 5x | 85% | 1.9760 | 0.2579 | 1.9765 | 0.2579 | +0.025% | 0% |
| D73 | AP-94-I2 (Isostatic) | $CrO_3$ | 3x | 85% | 1.9824 | 0.2590 | 1.9815 | 0.2590 | −0.045% | 0% |
| D74 | AP-94-I2 (Isostatic) | $CrO_3$ | 6x | 85% | 1.9916 | 0.2592 | 1.9910 | 0.2592 | −0.030% | 0% |
| D75 | AP-94-I2 (Isostatic) | $CrO_3$ $ZrOCl_2$ | 4x 2x | 85% | 1.9805 | 0.2681 | 1.9800 | 0.2681 | −0.025% | 0% |

Note: Pre-hardened dimensions were read from the machined base material prior to any chemical treatment. Hardened dimensions were read after chemically treating part and curing to 1800°F.

Various of the treated ceramic materials have been subjected to a number of standard solvents and reagents. Little or no effect has been observed. Immersion tests for treated ceramics utilizing the single phosphoric acid treatment only and for ceramic types incorporating various oxide impregnations, both with and without the final phosphoric acid treatment, have been made in acetone, trichlorethylene, hydrochloric acid, sodium hydroxide, sea water, ferric chloride and concentrated sulfuric acid with no observable effect on either the hardness or physical appearance.

X-ray diffraction analysis of the structure of several types of treated ceramic materials has been conducted using a Norelco diffractometer manufactured by North American Phillips, Inc. The results are briefly summarized in the following Table LVII. Accuracy of measurements can be considered to be at least 0.1%.

having the most intense line with a d spacing of 4.077 angstroms, relative intensity 100 in the 1-1-1 planes; next most intense line d spacing 2.506 angstroms, relative intensity 20, 2-2-0 planes; next most intense line d spacing 2.867 angstroms, relative intensity 10, 1-1-2 planes; next line d spacing 3.162 angstroms, relative intensity 10, 0-2-1 and 2-0-1 planes. There are a number of lesser intense lines. It is important to note, however, that none of the lines with d spacing of 4.077 A; 2.506 A; 2.867 A; 3.162 A or any of the remaining lines appear on the X-ray diffraction chart of the aluminum oxide ceramic materials which have been treated with phosphoric acid according to the present invention. It is assumed that the phosphoric acid treatment results in or produces a new compound or at best a new crystalline structure which accounts for the improved and unique properties of the treated aluminum oxide materials. The source of information for the X-ray data on aluminum ortho phosphate is the National Bureau of Standards Circular No. 539, Oct. 4, 1960.

TABLE LVII

X-RAY DIFFRACTION CRYSTAL STRUCTURE IDENTIFICATION

| Sample No. | Base Material | Salt Impreg. | No. | $H_3PO_4$ Impreg. | X-Ray Diffraction Indentification |
|---|---|---|---|---|---|
| A | AHP-99 | None | — | None | $Al_2O_3$ |
| B | AP-94 | None | — | None | $Al_2O_3$ |
| C | AHP-99 | None | — | 85% | $Al_2O_3+X$ |
| D | AP-94 | None | — | 85% | $Al_2O_3+X$ |
| E | AHP-99 | $ZrOCl_2$ | 3x | 85% | $Al_2O_3+Zr_2P_2O_7+X+(ZrO_2$ trace$)$ |
| F | AHP-99 | $MgCrO_4$ | 3x | 85% | $Al_2O_3+MgCrO_4+X+(Cr_2O_3$ trace$)$ |
| G | AHP-99 | $MgCrO_4$ | 3x | None | $Al_2O_3+MgCrO_4$ |
| 0-7 | AHP-99 | $CrO_3$ | 3x | None | $Al_2O_3+Cr_2O_3$ |
| K-7 | AHP-99 | $CrO_3$ | 3x | 85% | $Al_2O_3+Cr_2O_3+X$ |
| 0-3 | AP-94 | $CrO_3$ | 3x | None | $Al_2O_3+CrO_3$ |
| L-7 | AP-94 | $CrO_3$ | 1x | 85% | $Al_2O_3+CrO_3+X$ |
| K-8 | AP-94 | $CrO_3$ | 2x | 85% | $Al_2O_3+CrO_3+X$ |
| L-4 | AP-94 | $CrO_3$ | 3x | 85% | $Al_2O_3+CrO_3+X$ |
| L-5 | AP-94 | $CrO_3$ | 4x | 85% | $Al_2O_3+CrO_3+X$ |
| L-6 | AP-94 | $CrO_3$ | 5x | 85% | $Al_2O_3+CrO_3+X$ |
| 8X | AP-94 | $CrO_3$ | 8x | 85% | $Al_2O_3+CrO_3+X$ |

It will be noted that in each X-ray diffraction study of an aluminum oxide ceramic sample which has been subjected to a phosphoric acid treatment according to the present invention, there appears a line which has been labled X as there is no existing information in the X-ray indexes of a line having been previously observed at this position. As shown in the Table LVII, the untreated AHP-99 and AP-94 alumina samples A and B do not display the X line, which samples C and D and the others treated with phosphoric acid according to this invention do provide the X line. The X line occurs at a d spacing of approximately 4.12 A. The nearest compound is that of $AlPO_4$, aluminum ortho phosphate Samples of ceramic material formed using Coors AP-99-L3 alumina base refractory material with single phosphoric acid treatment only (no oxide impregnation) have been subjected to various nuclear radiation environment.

One such test consisted of exposing small coil forms made of the material to a transient nuclear environment in a fast burst reactor. In this case, the small pieces ($\sim$ ¼ inch diameter $\times$ ⅛ inch length) were exposed to a neutron flux rate of $2.8 \times 10^{17}$ n/cm$^2$-sec with associated gammas of $6 \times 10^7$ rads/sec. The total dose per burst was $\sim 2.2 \times 10^{12}$n/cm$^2$ (fast neutron), $1.8 \times 10n^{13}$/cm$^2$ (thermal neutrons) and $5 \times 10^3$ rads.

No noticeable effect in the ceramic material could be detected.

Another test was conducted in which small samples of the same type ceramic were irradiated for a period of time long enough to accumulate a total exposure of approximately $10^{19}$ ( $\geq$ MeV). Even with this very high exposure, no physical change in the ceramic part could be detected.

Parts to be fabricated using the method and materials of this invention are first machined to the correct dimensions from the relatively soft, partially sintered, porous refractory base material.

In this original, untreated condition, the material will normally have a Mohs hardness somewhere between 1 to 3 and preferably between 2–3 (such as the Coors AHP-99 and AP-94 alumina).

This hardness range allows machining using ordinary high speed steel or carbide tool bits, drills, cutters, saws, etc. While carbide tooling is recommended for quantity production to reduce tool wear, high speed tool steel will also hold up quite well providing cutting speeds are low to prevent heat buildup at point of contact.

Very fine and intricate parts can be machined and processed from this material. Thin walled parts, such as coil bobbins, can be made with sections as thin as 0.010 inch with little difficulty. Also, providing slow speeds are used to prevent heating, holes as small as 1/64 inch have been drilled to an inch or so in depth.

Recommended lathe turning speeds for small parts (1.4 inch –2 inch dia.) are about 250 rpm and drilling should ordinarily be done at speeds of less than 150 rpm. Band saw cutting should be at 10ft/min or less. Finished parts may also be easily sanded by hand using conventional "wet or dri" type silicon carbide paper with grit size ranging from 100 to 600, depending on the final finish desired.

Since the part will become extremely hard following the chemical treatment and hardening process, the dimensions and surface finish desired in the final cured state should be completed during the initial machining operation. It is possible to provide final polishing operations after not more than three oxide impregnations using silicon carbide paper. After this point, it will usually be necessary to resort to diamond machining since the hardness of most of the hardened ceramic materials will usually exceed that of silicon carbide.

In order to fabricate a hardened ceramic part according to this invention, the piece, machined from the soft, base refractory material, must next be chemically treated and cured.

The chemical treatment method will normally consist of one of the following: (1) Impregnation in phosphoric acid only; (2) One or more oxide impregnations followed by a single phosphoric acid treatment; (3) One or more oxide impregnations without final phosphoric acid treatment. The choice of impregnation method will, of course, depend on the final physical, chemical ane electrical properties desired, as well as the economic factors involved.

Following each chemical impregnation, the part is elevated in temperature to remove the water (including water of crystallization) and to convert the salt, or acid solution to an inert crystalline structure. A typical impregnation and curing cycle is shown in Table LVIII.

TABLE LVIII

CURING AND HARDENING CYCLE FOR UNDERFIRED REFRACTORY CERAMICS

| Step | Description | Temperature | Time |
|---|---|---|---|
| 1 | Heat basic ceramic material | 350°F. | 20 min. |
| 2 | Immerse part in salt solution | Ambient | 40 min. |
| 3 | Cure part | 150°F. – 1000°F. | 120 min. |
| 4 | Cool piece to 600°F. | 600°F. | 20 min. |
| 5 | Immerse in phosphoric acid solution | Ambient | 40 min. |
| 6 | Harden part | 150°F. – 1000°F. | 120 min. |
| 7 | Cool piece to ambient | Ambient | 15 min. |

The above applies to any part having its thinnest section not exceeding ⅜ inch. For thicker pieces, longer curing cycles (steps 3 and 6) and immersion times (steps 2 and 5) are required. Steps 2 and 3 may be repeated for desired number of salt impregnations, depending on mechanical strength properties desired. Where only phosphoric acid treatment is desired, steps 2, 3 and 4 can be omitted. In like manner, if only an oxide treatment is to be used, steps 5 and 6 can be omitted.

Many of the refractory ceramic materials of this invention have been found to exhibit excellent characteristics for bearing and seal applications. Even the simple phosphoric acid treated refractory base materials exhibit a noticeably low coefficient of friction characteristic, suggesting possible bearing use.

Static and sliding coefficient of friction data has been measured for several refractory ceramic materials produced in accordance with the present invention.

Table LIX lists static coefficients determined by sliding various oxide impregnated specimens on a chromic oxide impregnated slide. The slide and most of the oxide impregnated sliders were also given a final phosphoric acid treatment. As can be seen from the data presented in Table LIX, the lowest coefficient is provided by the like materials. The one sample, given four chromic oxide impregnations followed by one zirconium oxide impregnation (plus final phosphoric acid treatment), produced the highest friction coefficient when sliding against the chromic oxide treated slide.

Table LIX shows that the lowest friction coefficients are generally obtained by sliding identical ceramic materials against each other rather than unlike materials.

TABLE LIX

COEFFICIENT OF STATIC FRICTION MEASUREMENTS, RUN DRY

| | SLIDER | | | | SLIDE | | | | | |
|---|---|---|---|---|---|---|---|---|---|---|
| Base Material | Salt Impreg. | No. | $H_3PO_4$ Impreg. | Base Material | Salt Impreg. | No. | $H_3PO_4$ Impreg. | Load (lbs) | lbf | Friction Coefficient |
| AP-94-12 | $CrO_3$ | 5x | None | AP-94-12 | $CrO_3$ | 4x | 85% | 62.38 | 8.2 | .131 |
| AP-94-12 | $CrO_3$ | 5x | 85% | AP-94-12 | $CrO_3$ | 4x | 85% | 62.38 | 11.4 | .183 |
| AP-94-12 | $ZrOCo_2$ | 5x | 85% | AP-94-12 | $CrO_3$ | 4x | 85% | 62.38 | 9.6 | .154 |
| AP-94-12 | $MgCrO_4$ | 5x | None | AP-94-12 | $CrO_3$ | 4x | 85% | 62.38 | 9.8 | .157 |
| AP-94-12 | $Ni(NO_3)_2$ | 5x | 85% | AP-94-12 | $CrO_3$ | 4x | 85% | 62.38 | 8.8 | .141 |
| AP-94-12 | $Co(NO_3)_2$ | 5x | 85% | AP-94-12 | $CrO_3$ | 4x | 85% | 62.38 | 8.3 | .133 |

TABLE LIX-continued

COEFFICIENT OF STATIC FRICTION MEASUREMENTS, RUN DRY

| SLIDER | | | | SLIDE | | | | | |
|---|---|---|---|---|---|---|---|---|---|
| Base Material | Salt Impreg. | No. | $H_3PO_4$ Impreg. | Base Material | Salt Impreg. | No. | $H_3PO_4$ Impreg. | Load (lbs) | lbf | Friction Coefficient |
| AP-94-12 | $SnCl_2$ | 5x | 85% | AP-94-12 | $CrO_3$ | 4x | 85% | 62.38 | 9.3 | .149 |
| AP-94-12 | None | — | 85% | AP-94-12 | $CrO_3$ | 4x | 85% | 62.38 | 10.7 | .172 |
| AP-94-12 | $CrO_3$+ $ZrOCl_2$ | 4x 1x | 85% | AP-94-12 | $CrO_3$ | 4x | 85% | 62.38 | 11.3 | .181 |

Note: Contact area of slider ≈ .6 in²

Table LXI lists coefficients of friction for some common materials and is included for comparison purposes.

TABLE LXI

COEFFICIENT OF STATIC AND SLIDING FRICTION COMPRESSION DATA

| Materials | Static Friction Dry | Sliding Friction Dry |
|---|---|---|
| Glass on Glass | 0.94 | 0.4 |
| Hard Steel on Hard Steel | 0.78 | 0.42 |
| Hard Steel on Graphite | 0.21 | — |
| Hard Steel on Babbit | 0.70 | 0.33 |
| Brass on Mild Steel | 0.51 | 0.44 |
| Cast Iron on Cast Iron | 1.10 | 0.15 |
| Teflon on Teflon | 0.04 | 0.04 |
| Teflon on Steel | 0.04 | 0.04 |
| Tungsten Carbide on Tungsten Carbide | 0.2 | — |
| Tungsten Carbide on Steel | 0.5 | — |

Note: Above data from American Institute of Physics Handbook, 1957.

Wear rate test data was obtained with a variety of treated refractory ceramics using a single rub-shoe type test. Both conventional and non-conventional lubricants have been used in these wear rate tests, including No. 10 SAE motor oil, glycerine, No. 200 polyethylene glycol, G.E. F-50 Versilube silicone lubricant, alcohol, gasoline, paraffin, apiezon high vacuum grease, tap water and sea water.

The rub-shoe test arrangement consists of a single shoe riding against the periphery of a rotating wheel. The wheel in these tests has normally been operated at either 60 or 300 rpm. The contact pressure between the shoe and wheel is variable and may be adjusted simply by changing weights on the end of a lever arm to which the shoe is attached. The wheel is directly driven by means of an electric motor. The slow drive speed has been used because wear rates are generally more severe at slow speeds than at high speeds since more surface-to-surface contact can occur through the lubricating film.

Since the shoe has a flat contacing surface, the line contact pressure between shoe and wheel is extremely high at the beginning of the test. As would be expected, therefore, the highest wear is experienced at the start of the test with the wear rate diminishing with time (as the shoe wears, the psi loading decreases). While this type arrangement is unlike any actual bearing design, it does allow a convenient and rapid means of comparing wear rates.

Table LXII lists the types of treated refractory ceramic materials tested using the rub-shoe arrangement. For the most part, the variations consist in the oxide impregnation employed, which has been found to be a significant factor in the wear properties. Unless otherwise specified, the shoe width has been standardized at 0.25 inch with a wheel diameter of 1.10 inch.

TABLE LXII

RUB-SHOE TEST PARTS

| Part No. | Base Material | 1st Impreg. | No. | 2nd Impreg. | No. | Final Impreg. | Rockwell Hardness | Mohs Hardness | Remarks |
|---|---|---|---|---|---|---|---|---|---|
| W-1 | AP-94-12 | $CrO_3$ | 5x | None | — | None | | 9–10 | |
| W-2 | AP-94-12 | $CrO_3$ | 5x | None | — | 85% | | 9–10 | |
| W-3 | AP-94-12 | $CrO_3$ | 4x | $ZrOCl_2$ | 1x | 85% | | 9–10 | |
| W-4 | AP-94-12 | — | — | — | — | — | | — | |
| W-5 | AP-94-12 | None | — | None | — | 85% | | 8–9 | |
| W-6 | AP-94-12 | $ZrOCl_2$ | 5x | None | — | 85% | | 9–10 | |
| W-7 | AP-94-12 | $MgCrO_4$ | 5x | None | — | None | | 8–9 | |
| W-8 | AP-94-12 | $Ni(NO_3)_2$ | 5x | None | — | 85% | | 9–10 | |
| W-9 | AP-94-12 | $Co(NO_3)_2$ | 5x | None | — | 85% | | 9–10 | |
| W-10 | AP-94-12 | $SnCl_2$ | 5x | None | — | 85% | | 9–10 | |
| W-1-A | AP-94-12 | $CrO_3$ | 8x | None | — | 85% | | 9–10 | |
| W-7-A | AP-94-12 | $MgCrO_4$ | 5x | None | — | 85% | | | |

Tables LXIII through LXVII show comparison runs for various treated refractory ceramic materials using a variety of lubricants. Some comparisons have also been made with conventional bearing materials such as a bearing bronze shoe riding against a mild steel wheel. Such comparisons, however, are not too meaningful since the metal bearings are used only under very lightly loaded conditions with good lubricants or else galling occurs. The better treated refractory ceramic materials under these conditions show negligible wear.

TABLE LXIII

RUB-SHOE WEAR-RATE COMPARISON TESTS
Load 10 lbs, Run Time 1 hr, Lubricant Alcohol, rpm 300
Wheel Diameter 1.1", Shoe Width .25", Base Material AP-94-I2

| Wheel No. | Salt Impreg. | No. | $H_3PO_4$ Impreg. | Shoe No. | Salt Impreg. | No. | $H_3PO_4$ Impreg. | Wear Depth (in) | Wear Length (in) | Corrected Depth (in) | Wear Width (in) | Wear Rate (in/ft) $\times 10^{-9}$ | Remarks |
|---|---|---|---|---|---|---|---|---|---|---|---|---|---|
| W-1 | $CrO_3$ | 5x | None | W-1 | $CrO_3$ | 5x | None | .000345 | .240 | .00033 | .030 | 65 | |
| W-2 | $CrO_3$ | 5x | 85% | W-2 | $CrO_3$ | 5x | 85% | .00029 | .235 | .00027 | .030 | 53 | |
| W-3 | $CrO_3$+ $ZrOCl_2$ | 4x 1x | 85% | W-3 | $CrO_3$+ $ZrOCl_2$ | 4x 1x | 85% | .00010 | .250 | .00010 | .025 | 20 | |
| W-5 | None | — | 85% | W-5 | None | — | 85% | .000885 | .250 | .00089 | .060 | 175 | |
| W-6 | $ZrOCl_2$ | 5x | 85% | W-6 | $ZrOCl_2$ | 5x | 85% | .00075 | .250 | .00075 | .060 | 147 | |
| W-7 | $MgCrO_4$ | 5x | None | W-7 | $MgCrO_4$ | 5x | None | .000485 | .250 | .00049 | .045 | 96 | |
| W-8 | $Ni(NO_3)_2$ | 5x | 85% | W-8 | $Ni(NO_3)_2$ | 5x | 85% | .000465 | .250 | .00047 | .050 | 92 | |
| W-9 | $Co(NO_3)_2$ | 5x | 85% | W-9 | $Co(NO_3)_2$ | 5x | 85% | .00125 | .250 | .00103 | .075 | 200 | |
| W-10 | $SnCl_2$ | 5x | 85% | W-10 | $SnCl_2$ | 5x | 85% | .00055 | .250 | .00055 | .050 | 107 | |
| W-1-A | $CrO_3$ | 8x | 85% | W-1-A | $CrO_3$ | 8x | 85% | .00000 | N.M. | .00000 | N.M. | 0 | |

TABLE LXIV

RUB-SHOE WEAR-RATE COMPARISON TESTS
Load 30 lbs, Run Time 2 hrs, Lubricant Alcohol, rpm 300
Wheel Diameter 1.1", Shoe Width .25", Base Material AP-94-I2

| Wheel No. | Salt Impreg. | No. | $H_3PO_4$ Impreg. | Shoe No. | Salt Impreg. | No. | $H_3PO_4$ Impreg. | Wear Depth (in) | Wear Length (in) | Corrected Depth (in) | Wear Width (in) | Wear Rate (in/ft) $\times 10^{-9}$ | Remarks |
|---|---|---|---|---|---|---|---|---|---|---|---|---|---|
| W-1 | $CrO_3$ | 5x | None | W-1 | $CrO_3$ | 5x | None | .00050 | .235 | .00047 | .045 | 46 | |
| W-2 | $CrO_3$ | 5x | 85% | W-2 | $CrO_3$ | 5x | 85% | .00041 | .220 | .00036 | .035 | 35 | |
| W-3 | $CrO_3$+ $ZrOCl_2$ | 4x 1x | 85% | W-3 | $CrO_3$+ $ZrOCl_2$ | 4x 1x | 85% | .000315 | .220 | .00028 | .035 | 28 | |
| W-2 | $CrO_3$ | 5x | 85% | W-9 | $Co(NO_3)_2$ | 5x | 85% | .0093 | .245 | .00091 | .055 | 89 | |
| W-9 | $Co(NO_3)_2$ | 5x | 85% | W-2 | $CrO_3$ | 5x | 85% | .0071 | .250 | .00071 | .060 | 70 | |
| W-3 | $CrO_3$+ $ZrOCl_2$ | 4x 1x | 85% | W-2 | $CrO_3$ | 5x | 85% | .0026 | .230 | .00024 | .030 | 24 | |
| W-2 | $CrO_3$ | 5x | 85% | W-3 | $CrO_3$+ $ZrOCl_2$ | 4x 1x | 85% | .0031 | .200 | .00025 | .040 | 25 | |
| W-3 | $CrO_3$+ $ZrOCl_2$ | 4x 1x | 85% | W-3 | $CrO_3$+ $ZrOCl_2$ | 4x 1x | 85% | .00001 | .220 | .00021 | .035 | 21 | Re-run after Wheel well polished |
| W-1-A | $CrO_3$ | 8x | 85% | W-1-A | $CrO_3$ | 8x | 85% | .000045 | .215 | .00004 | .020 | 4 | |
| W-8 | $Ni(NO_3)_2$ | 5x | 85% | W-8 | $Ni(NO_3)_2$ | 5x | 85% | .000765 | .245 | .00075 | .065 | 74 | |

TABLE LXV

RUB-SHOE WEAR-RATE COMPARISON TESTS
Load 10 lbs, Run Time 1 hr, Lubricant $H_2O$, rpm 300
Wheel Diameter 1.1", Shoe Width .25", Base Material AP-94-I2

| Wheel No. | Salt Impreg. | No. | $H_3PO_4$ Impreg. | Shoe No. | Salt Impreg. | No. | $H_3PO_4$ Impreg. | Wear Depth (in) | Wear Length (in) | Corrected Depth (in) | Wear Width (in) | Wear Rate (in/ft) $\times 10^{-9}$ | Remarks |
|---|---|---|---|---|---|---|---|---|---|---|---|---|---|
| W-1-A | $CrO_3$ | 8x | 85% | W-1-A | $CrO_3$ | 8x | 85% | N.M. | N.M. | N.M. | N.M. | N.M. | High Wear |
| W-3 | $CrO_3$+ $ZrOCl_2$ | 4x 1x | 85% | W-3 | $CrO_3$+ $ZrOCl_2$ | 4x 1x | 85% | .000135 | .190 | .000103 | .025 | 20 | |
| W-2 | $CrO_3$ | 5x | 85% | W-2 | $CrO_3$ | 5x | 85% | .000145 | .245 | .000142 | .035 | 28 | |
| W-5 | None | — | 85% | W-5 | None | — | 85% | N.M. | N.M. | N.M. | N.M. | N.M. | High Wear |
| W-6 | $ZrOCl_2$ | 5x | 85% | W-6 | $ZrOCl_2$ | 5x | 85% | N.M. | N.M. | N.M. | N.M. | N.M. | Squeeks |
| W-7 | $MgCrO_4$ | 5x | None | W-7 | $MgCrO_4$ | 5x | None | .00094 | .250 | .000940 | .070 | 177 | |
| W-8 | $Ni(NO_3)_2$ | 5x | 85% | W-8 | $Ni(NO_3)_2$ | 5x | 85% | N.M. | N.M. | N.M. | N.M. | N.M. | Squeeks |
| W-9 | $Co(NO_3)_2$ | 5x | 85% | W-9 | $Co(NO_3)_2$ | 5x | 85% | N.M. | N.M. | N.M. | N.M. | N.M. | Squeeks |
| W-10 | $SnCl_2$ | 5x | 85% | W-10 | $SnCl_2$ | 5x | 85% | .00286 | .230 | .000263 | .115 | 52 | |
| W-2-A | $CrO_3$ | 5x | 85%+ $AlPO_4$ | W-2-A | $CrO_3$ | 5x | 85%+ $AlPO_4$ | .000055 | .225 | .000050 | .020 | 10 | |

TABLE LXVI

LUBRICANT COMPARISON RUNS USING W-8 RUB-SHOE
(NiO - 5x impregnation)

| Run No. | Lubricant | Load (lbs) | Run Time (hrs) | rpm | Wear Depth (in) | Wear Length (in) | Corrected Depth (in) | Wear Width (in) | Wear Rate (in/ft) $\times 10^{-9}$ | Remarks |
|---|---|---|---|---|---|---|---|---|---|---|
| 1 | Alcohol | 30 | 2 | 300 | .000765 | .245 | | .065 | 74 | |
| 2 | Polyethylene Glycol | 30 | 2 | 300 | .000405 | .250 | .000248 | .050 | 24 | |
| 3 | Tap Water | 30 | 2 | 300 | N.M. | N.M. | N.M. | N.M. | N.M. | |

TABLE LXVI-continued

LUBRICANT COMPARISON RUNS USING W-8 RUB-SHOE
(NiO - 5x impregnation)

| Run No. | Lubricant | Load (lbs) | Run Time (hrs) | rpm | Wear Depth (in) | Wear Length (in) | Corrected Depth (in) | Wear Width (in) | Wear Rate (in/ft) ×$10^{-9}$ | Remarks |
|---|---|---|---|---|---|---|---|---|---|---|
| 4 | No. 10 SAE Oil | 30 | 2 | 300 | .000005 | .175 | | .010 | | |
| 5 | Paraffin | 30 | 2 | 300 | | | | | | |

TABLE LXVII

LUBRICANT COMPARISON RUNS USING W-3 RUB-SHOE
($CrO_3$- 8x impregnation)

| Run No. | Lubricant | Load (lbs) | Run Time (hrs) | rpm | Wear Depth (in) | Wear Length (in) | Corrected Depth (in) | Wear Width (in) | Wear Rate (in/ft) ×$10^{-9}$ | Remarks |
|---|---|---|---|---|---|---|---|---|---|---|
| 1 | Tap Water | 30 | 2 | 300 | N.M. | N.M. | N.M. | N.M. | N.M. | |
| 2 | Alcohol | 30 | 2 | 300 | .00001 | .220 | | .035 | .88 | |
| 3 | No. 10 SAE Oil | 30 | 2 | 300 | .000005 | .235 | | .025 | .49 | |
| 4 | Tap Water | 10 | 1 | 300 | | | | | | |

The treated refractory ceramic material has been found to perform most satisfactorily as bearing when used against a like material. This is unlike metal bearings where different metals are invariably used to achieve low wear rates. The reason for this behavior is not fully understood.

The Bearings and Seals branch of the Marine Engineering Laboratory of the U.S. Navy Department employs a single rub-shoe test for their sea water lubricated materials. In this case, the shoe has a 1 inch width (usually made as 1 inch cube) and rides on a 1-¼ inch wide × 2 inch diameter wheel. The rpm is adjustable over a range of from 3 to 300. The standard loading is 4 lbs.

Similar tests were conducted using several of the single oxide impregnated chemically treated and hardened ceramic materials. Wear rates were measured to be between $1.55 \times 10^{-9}$ and $3.1 \times 10^{-9}$ inches of wear/ft. of travel with 1 inch contact length, 4 lb. load of point of contact, 60 rpm wheel speed, sea water lubrication and 92 hours running time. This is at least two orders of magnitude less wear than with the titanium carbide/carbon combination presently being used for submarine seals by the M.E.L. Multi-oxide impregnated materials provide even lower wear rates.

Life tests have been made on several bearing configurations. They have been lubricated with various oils and water. To oil lubricated bearings have a total running time to date of over 6615 hours at 1800 rpm without any visible signs of wear. A radially loaded dual bearing had one bearing running in No. 10 SAE motor oil and the other running under sea water operated at 3200 rpm. The load on these bearings total 1.5 pounds. These bearings have been operated continuously for over 5272 hours with no sign of wear. It should be noted that a bearing to be used with or under water should be cured at a temperature which is at least sufficiently high to drive all of the water of crystallization out of the ceramic and convert the structure thereof to a water-insoluble state. As indicated previously, this temperature is found to be at least about 600°F. to about 1000°F. for the aluminum oxide ceramics.

It will be appreciated that these bearings have marine applications in a submersible system and would not require special seals, special lubrication or added buoyancy problems. Silicone lubricated bearings would be useful in low temperature applications and the bearings are also useful in liquid metal lubricated systems.

From room temperature to 600°F., the friction coefficient of the treated refractory ceramic materials has been found to remain extremely low. The ceramic materials exhibit a higher friction coefficient between about 800°F. and 1200°F. Above this temperature, however, it again begins to slide more freely, attaining a reasonably low coefficient as 2000°F. temperatures are approached. Since this behavior of increasing and then decreasing friction with temperature is almost identical to that reported for fully vitrified aluminum oxide ceramics, it is expected that the aluminum oxide base of the treated refractory ceramic is the major contributing factor to the related elevated temperature behavior.

The fact that the treated refractory material can be fabricated with a relatively high degree of porosity suggests the possible use of solid lubricants. This can be accomplished by impregnating the porous ceramic with a salt solution convertible to a solid lubricant, such as a salt of molybdenum or cadmium, and converting some in situ to the sulfide.

A variation in the chemical hardening and salt impregnation method of this invention results in an excellent abrasive material for the honing and finishing of metals. When treated correctly, such an abrasive stone will remove metal very rapidly in addition to have the feature of not loading the stone with metal particles.

The basic material found to be most satisfactory for this purpose is Coors AHP-99 aluminum oxide, although others have been found to be satisfactory. The chemical hardening treatment is different than that used to process standard treated ceramic parts and bearings, however. After machining to the desired shape, the ceramic material is first treated with a reduced strength or starved phosphoric acid solution of less than 85% and then cured at at least 600°F. Following this, a salt impregnation may be added and the piece re-cured at a temperature sufficient to convert the salt to an oxide. (For standard ceramic pieces, the salt impregnation is made prior to the phosphoric acid hardening treatment.) This procedure has been found to retain a high degree of porosity, in addition to providing the necessary low loading of the pores and rapid cutting properties. It will be noted that 85% phosphoric acid saturated with aluminum phosphate will also provide the necessary starved acid solution.

The most significant advantages of this new abrasive material should be in the fact that the desired shapes and close tolerances can be generated prior to the hardening of the abrasive. When using sintering techniques in the production of abrasives, a high proportion of the expense is in the grinding and finishing operations. A further advantage of the present process may be in the low temperature — short time cycle involved in the curing and hardening process, as compared to the presently employed high temperature sintering method. Tables LXVII and LXIX illustrate a variety of abrasive materials resulting from varying the acid concentration and the impregnant.

at 1000°F., the resistance dropped to 6.5 ohms. Another piece of Coors AP-99-L3 aluminum oxide 2.0 inches long and 0.25 inches diameter was given a single chromic oxide impregnation. This piece was subjected to increasing voltage gradients over its length and displayed increasing current conductance to higher potentials as follows: 6KV-b 4.8$\mu$a; 12KV-11 $\mu$a; 18KV-15.5 $\mu$a; 24KV-23 $\mu$a; and, 30KV-31 $\mu$a.

While it is known exactly what occurs when the underfired, porous, substantially pure refractory oxide ceramic is impregnated with phosphoric acid and cured, it is believed that possibly due to the nascent character of the surfaces of the porous structure, a chemical reaction or reorientation occurs as possibly evidenced by the unidentified line on the X-ray diffraction analysis. The pores of the porous starting material appear to be packed with a reaction product to provide an increase in the density of the treated material. The packing of the reaction product within the pores of the skeletal re-

TABLE LXVIII

HONING MATERIAL TESTS USING VARIOUS ACID CONCENTRATIONS

| Sample No. | Base Material | 85% $H_3PO_4$ | 1st Treatment $H_2O$ Parts by Volume | Salt Impregnation | Hardness | Characteristics | Rating | Grade |
|---|---|---|---|---|---|---|---|---|
| 1-H | AHP-99 | (1) | (1) | None | | Grabs and Slips | Poor | — |
| 2-H | AHP-99 | (1) | (1) | $CrO_3$ | | Grabs and Slips | Poor | — |
| 3-H | AHP-99 | (1) | (1) | $ZrOCl_2$ | | Grabs and Slips | Poor | — |
| 4-H | AHP-99 | (1) | (2) | None | | Not as Good as 5–6 | Good | Coarse |
| 5-H | AHP-99 | (1) | (2) | $CrO_3$ | | Fast Cutting | Excellent | Coarse |
| 6-H | AHP-99 | (1) | (2) | $ZrOCl_2$ | | Fast Cutting | Excellent | Coarse |
| 7-H | AHP-99 | (1) | (3) | None | | Not as Good as 8–9 | Good | Coarse |
| 8-H | AHP-99 | (1) | (3) | $CrO_3$ | | Only Good Cutting Fast Cutting | Excellent | Coarse |
| 9-H | AHP-99 | (1) | (3) | $ZrOCl_2$ | | Fast Cutting | Excellent | Coarse |
| 10-H | AHP-99 | (1) | (4) | None | | Not as Good as 11–12 Fairly Fast Cutting | Good | Coarse |
| 11-H | AHP-99 | (1) | (4) | $CrO_3$ | | Not as Good as 12 | Excellent | Coarse |
| 12-H | AHP-99 | (1) | (4) | $ZrOCl_2$ | | Fast Cutting | Excellent | Coarse |

TABLE LXIX

HONING MATERIAL TESTS USING VARIOUS OXIDE IMPREGNATIONS

| Sample No. | Base Material | 85% $H_3PO_4$ | 1st Treatment $H_2O$ Parts by Volume | Salt Impregnation | Hardness | Characteristics | Rating | Grade |
|---|---|---|---|---|---|---|---|---|
| 1-Q | AHP-99 | (1) | (2) | $Be(NO_3)_2$ | | Grabs Very Slightly | Excellent | Fine |
| 4-Q | AHP-99 | (1) | (2) | $Ni(NO_3)_2$ | | Grabs Slightly | Good | Med. Fine |
| 5-Q | AHP-99 | (1) | (2) | $Th(NO_3)_2$ | | Fairly Fast Cutting | Good | Med. Coarse |
| 6-Q | AHP-99 | (1) | (2) | $SnCl_2$ | | Fast Cutting | Excellent | Coarse |
| 7-Q | AHP-99 | (1) | (2) | $Ti_2(C_2O_4)_3$ | | Fast Cutting | Excellent | Coarse |
| 8-Q | AHP-99 | (1) | (2) | $Zr(NO_3)_2$ | | Fast Cutting | Excellent | Coarse |
| 9-Q | AHP-99 | (1) | (2) | $MgCrO_4$ | | About Same as 5-Q | Good | Med. Coarse |
| 6-H | AHP-99 | (1) | (2) | $ZrOCl_2$ | | | Excellent | Coarse |
| 5-H | AHP-99 | (1) | (2) | $CrO_3$ | | | Excellent | Fine |
| 17-Q | AHP-99 | (1) | (2) | $Cu(NO_3)_2$ | 5–6 | Fast Cutting | Excellent | Med. |
| 18-Q | AHP-99 | (1) | (2) | $FeCl_2$ | 4–5 | Fairly Fast Cutting | Good | Med. |
| 19-Q | AHP-99 | (1) | (2) | $La(NO_3)_2$ | 3–4 | Very Fast Cutting | Excellent | Coarse |
| 20-Q | AHP-99 | (1) | (2) | $L_1C_2H_3O_2$ | 3–4 | Fast Cutting | Excellent | Med. |
| 21-Q | AHP-99 | (1) | (2) | $Sr(NO_3)_2$ | 6–7 | Slips Slightly | Good | Med. Coarse |
| 22-Q | AHP-99 | (1) | (2) | $H_4SiW_{16}O_{40}$ | 5–6 | Very Fast Cutting | Excellent | Coarse |

It was further found that, on impregnating and curing the aluminum oxide several times with chromic acid, there is produced to a material which exhibits marked changes in conductivity, both electrical and heat conductivity, with changes in temperature. As an example, a piece of Coors AP-99-L3 aluminum oxide 0.625 inches in diameter and 0.040 inches thick was impregnated with chromic acid and cured through seven cycles and then given a final phosphoric acid treatment and cure. This specimen exhibited an electrical resistance of 185K ohms at 45°F. When heated to 70°F., this specimen had an electrical resistance of 80K ohms, and fractory base material appears to provide support therefor and when the density approaches the maximum, the hardness and strength of the material approaches a maximum.

Certain oxide additives, such as chromic oxide, when impregnated into substantially pure porous refractory oxides, will provide a substantial enhancement of the hardness and strength of such material without further treatment. Here again, the mechanism by which this is accomplished is not fully understood. It is not certain whether a true reaction occurs between the refractory base material and the oxide formed, whether there is a chemical linkage or sharing of electrons or whether the oxide is merely physically deposited. It would appear that something akin to a chemical bonding occurs. This is further borne out by the finding that when the refractory aluminum or other oxide base material is impregnated with phosphoric acid and cured, the thus treated material will not respond to or react with the oxide producing material. Where one or several impregnations with an oxide producing material has been made and appropriately cured, further impregnations and cures with the oxide producing materials will usually result in further accumulation of the oxide; however, once the phosphoric acid is impregnated into the refractory base material and cured, the base material will not materially be hardened by any further oxide additions. This would appear to indicate a completion of a chemical reaction between the refractory base oxide and the phosphoric acid on being cured to produce the unidentified reaction product having d plane spacing of 4.12 angstroms.

It was found that the higher the purity of the porous partially sintered refractory oxide base material, the harder the treated and cured product. Using as a starting material Coors AP-99-L3 which contains 99% aluminum oxide, it is possible to produce a hardness of Rockwell A-90 with the treating process of this invention. The base material can be treated with either phosphoric acid or a salt convertible to an oxide or both. The phosphoric acid appears to react with the base or skeletal oxide and possibly with the added oxide as well. While phosphoric acid is to be preferred from the point of ease of use, other materials may be used as the source of the phosphate ion which are capable of releasing same, such as sodium phosphate and sodium triphosphate in solution.

Applicants' previously filed application, of which the present application is a continuation in part, discloses and claims the chemical treatment of partially sintered refractory base materials. It has now been found that the base refractory material can be prepared from a powder or other finely divided form of the base material by the incorporation of a suitable binder therewith, such as a clay, kaolin and the like, and then pressed, molded, slip-cast, extruded or otherwise process into a shape so that the base oxide particles are packed into close proximity. The packing of the particles is such that the resulting structure is porous and has a substantial amount of interconnecting voids to allow for adequate impregnation with the chemical treating solution. In lieu of a binder referred to above, the particles may be wetted with the chemical treating solution and packed into a molded or packed into a mold and wetted, then impregnated with the chemical treating solution and cured through at least one impregnation and cure cycle whereby the particles are held together sufficiently to permit handling and removal from the mold. It is also possible to form a mixture of the chemical treating solution and the particles with just enough solution to wet the particles or add sufficient binder to produce a kneadable mass which can be shaped and cured. After the initial shaping and curing, these pieces are subjected to multiple cycle impregnations and cures to produce the necessary hardness in the finished piece. The chemical treating solution is a solution of a compound which is capable of being converted to a metal oxide within the voids between particles forming the structure at temperatures below the sintering temperatures of the particles and which fall within the range of from about 600°F. to about 1500°F.

The hardening of structures formed from relatively finely divided particles of the base refractory materials has several advantages over starting with porous partially sintered or underfired pieces, first in avoiding the need for the initial moderately high temperature sintering step and, second, the powder forming method allows the use of a wide variety of starting materials which are not readily available in sintered form or may be difficult to sinter. Also, a wide variety of oxide mixtures may be employed with almost any percentage variation without regard to how such oxides would act when fused together using normal high temperature manufacturing methods. Also, very pure oxide bodies can be employed, unlike the case with sintered bodies where silica, magnesia and other fluxing materials are added to reduce sintering temperatures to practical limits. Finally, this new method allows for the incorporation of ceramic fibers, metal powders and a wide variety of reinforcing materials such as wires, screens and the like. Even glass cloth reinforcing can be employed because of the low curing temperatures involved.

The hardening process preferably comprises the use of multiple impregnations of the porous body with a solution of a compound capable of being converted to an oxide at temperatures below the sintering temperature of the body and heating the body to convert the compound to the oxide. The chemical solution usually consists of a relatively concentrated water solution of a soluble metal salt or oxide that is convertible to a stable or insoluble oxide by the application of heat. Compounds which satisfy this requirement are, for example: cerrous nitrate, zirconyl chloride, cobalt and nickel nitrate, titanium oxalate, silico-tungstic acid, magnesium chromate, beryllium nitrate, chromium trioxide or chromic acid, chromium sulfate, chromium chloride and the like. The preferred compound of a particular metal is usually selected on the basis of maximum solubility. The higher the solubility, normally the greater the amount of the metal oxide will be deposited in the refractory oxide body after each chemical impregnation-cure cycle. For this same reason, a concentrated solution is to be preferred to a dilute solution of the compound. Alcohol, ether and other solvents may be used; however, water is preferred because of its greater solubility characteristic for most all of the metal salts and oxides under consideration. Other facts, such as salt to oxide conversion temperatures, stability throughout the conversion temperature range, relationship of crystal sizes during conversion to the interstitial spaces in the porous base material, desired hardness and strength of the final product are other considerations in the selection and preparation of the impregnating chemical solution.

The most desirable chemical treatment from the standpoint of achieving maximum hardness and strength has been found to be one or more of the high solubility chromium compounds. Among these, concentrated chromic acid has been found to be the most efficient in terms of achieving maximum hardness in the fewest number of impregnation-cure cycles. It should be pointed out, however, that other chromium compounds also have advantages. For example, the trivalent salts such as the chloride or sulfate can be employed when the hexavalent chromium trioxide form may present a health hazard. Also, a non-acidic form such as magnesium chromate may be desirable when chemically hardening basic refractory bodies such as calcium oxide.

While the chromic acid impregnation-treatment process has many advantages, the treated refractory body is generally not suitable for low-loss electrical parts because of the negative electrical resistivity characteristics with increasing temperature as pointed out previously. If low electrical conductivity is required over wide temperature ranges, then one of the other hardening treatments, such as cerrous nitrate, zirconium oxychloride, beryllium nitrate, etc., would be used.

Figure 2:
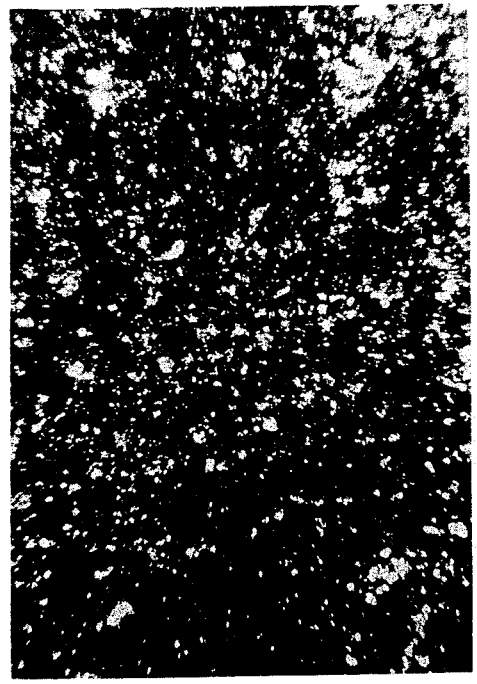
Figure 3:
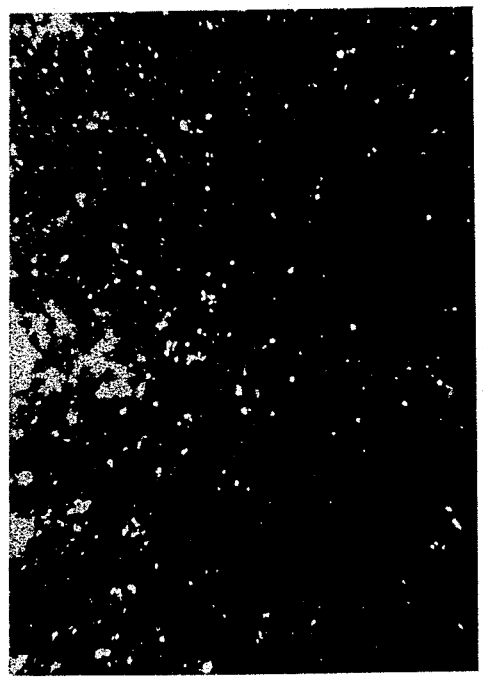
Figure 4:
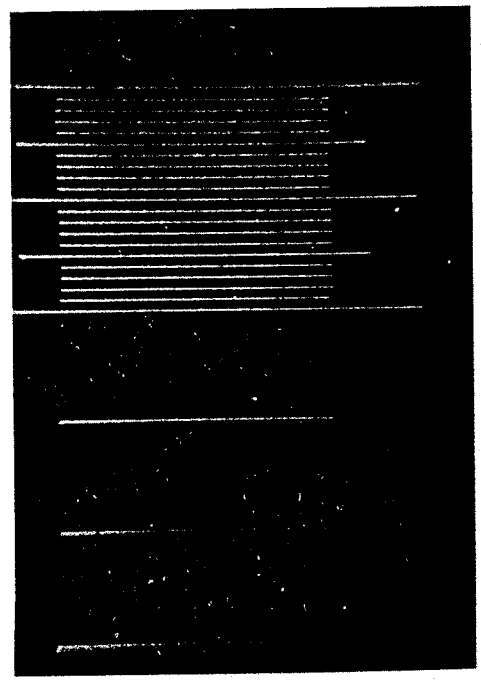
FIG. 4 is a photograph showing a grid at the same magnification as FIGS. 1–3.

It is significant that the process of this invention involves multiple chemical treatments to achieve maximum hardness, at least two or more treatments being required in every case. As breifly mentioned previously, it has been found that a variety of metal salts ans soluble oxides can be used for this chemical hardening process, some with greater success than others as far as ultimate hardness and strength is concerned. It appears that, during the initial heat conversion, the refractory oxide formed, such as $Cr_2O_3$ and the like, makes a very strong bond to the refractory oxide particles, such as alumina and the like, used as the porous oxide body. Subsequent treatments, on the other hand, appear to form a strong bond to the oxide previously deposited. A thin section (petrographic) slide of a porous alumina body indeed reveals that the initial chromic acid treatment, followed bu conversion to the $Cr_2O_3$ form by heat, results in a thorough coating of the alumina particles by the green oxide. By examining pores of relatively large cross section, there is seen to be a continuation of this coating effect as subsequent impregnations-heat conversion cycles are applied. Referring to the photographs of FIGS. 1, 2 and 3, there is shown a pressed body of Coors AP-99-L3 alumina powder with successive impregnation-cure cycles using concentrated chromic acid according to the present invention. FIG. 1 shows a section of the body after a single chromic acid impregnation and cure. The structure as shown in FIG. 1 is quite rough showing considerable unfilled voids. FIG. 2 shows a section of the same body after a total of five (5) impregnation-cure cycles with chromic acid. It is seen that the texture of the body is less rough and many of the voids are filled and filling up. FIG. 3 shows a section of the same body after undergoing a total of nine (9) impregnation-cure cycles with chromic acid. Here, it is seen that the texture is even less rough and many of the voids have been filled. FIG. 4 is a grid with the large divisions being spaced at 0.1 millimeter and the small divisions spaced at 0.01 millimeter photographed at the same magnification as FIGS. 1–3 to provide a scale. The converted oxide has been found to exhibit a strong attraction to either the oxide used as the initial pressed body, or subsequently, to itself. The center of the pores are seen to fill up only after several treatments. The hardness of such a porous oxide body increases considerably as the treatment process is repeated.

A porous alumina body was treated with a diluted phosphoric acid solution and cured prior to the chromic acid treatment. Here, it was seen by examination of a thin section slide that the chromia was not attracted or deposited on the aluminum phosphate surface but, rather, appeared to fill up the larger pores with a loosely packed or porous green material even with the initial treatment. In this case, the chromia does not appear to make an effective bond to aluminum phosphate as it did to the aluminum oxide of the previous example.

While many of the refractory oxides can be effectively coated with a moderately well adhering layer of chromia using the chromic acid treatment method, production of strongly bonded refractory materials have been found to require the presence of small pores, gaps, cracks or interstices. Under such conditions, a very hard and dense part will result. Also, as might be anticipated, physical hardness with a given number of chemical treatments, and using a particular refractory oxide material, will depend on the particle size, shape and packing pressure employed. If the pore sizes are too large, it may take an excessive number of treatments before the body attains a high degree of hardness. If the spaces are too small, then the chemical solution cannot penetrate properly. While the statements above have been directed primarily to the chromic acid treatment, this was by way of example only. The same effects have generally been found to be true with many of the other soluble metal salt and oxide solutions mentioned.

It also should be noted that it is not essential to use a refractory oxide base material in order to obtain a hardened product using the chemical treatment method according to the present invention. The main requirement is for the base structure to contain the necessary small voids and interstices in which the oxide may be formed. For example, a piece of woven glass cloth has been effectively hardened in this manner and becomes brittle and ceramic-like in nature after only a few chromic acid impregnations and cures. In a like manner, compacted steel wool; kaolin and alumina fibers; kaolin, glass and quartz paper, and the like have been effectively hardened. In addition, it has been found that a variety of lightly pressed metal powders can be similarly hardened. A chemical bond appears to be occurring between the chromic oxide and the pressed material. As in the case of pressed porous oxide bodies, multiple treatments are required to produce a well bonded and hard structure with the other materials. It appears that the chemical bonding occurs with an oxide since, where the initial base material is other than an oxide, i.e., a metal powder, the formation of an oxide coating thereon appears to be necessary before satisfactory bonding action takes place. There is almost always a layer of oxide on the particles or one is formed in situ during the impregnation and curing process with the oxygen being supplied from the atmosphere or by the chemical treating agents. If, as in the case of titanium metal powder, where the formation of a suitable well adhering oxide coating may not occur during the curing step, an oxidation step may precede the chemical treatment. This may involve only a simple heating step to a temperature to produce an oxide coating on the particles. It will also be noted that oxide which is deposited and formed in the voids and interstices of the porous body according to the present process serves as a bonding agent for subsequent oxide depositions.

Table LXX shows the hardness results achieved with a wide variety of pressed oxide structures treated with chromic acid. The chromic acid in this case was prepared as a concentrated aqueous solution by adding chromium trioxide ($CrO_3$) to water until no more crystals would dissolve at room temperature. The samples were formed by mixing a small quantity of concentrated chromic acid with the refractory oxide powder and pressing the damp mix into a ring type mold. Pressing was accomplished either by means of an hydraulic press using a die of the approximate ½ inch mold diameter or in later tests was done by means of hand tamping with a small flat die punch. The hand tamping method appears to provide more uniform results, especially when certain "hard-to-flow" type oxides are encountered. The pressed samples were then oven cured Table LXXIII shows the test results obtained with structures press formed from finely divided mixtures of refractory oxides. These structures were prepared in the same manner as those described above for those shown in Table LXX. The ultimate hardness of a structure appears to be generally predictable, based on the single oxide hardness of the particular oxides used.

TABLE LXX

HARDNESS MEASUREMENTS FOR PRESSED SAMPLES COMPOSED OF
HIGH PURITY SINGLE OXIDES WITH MULTIPLE CHROMIC ACID IMPREGNATION-CURE CYCLES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 97 | Al₂O₃(30 μ Meller 99.98%) | 20,000 psi | 57.4 | 80.7 | — | 91.6 | 92.7 | 94.6 |
| 116 | Cr₂O₃ | Hand Tamped | 84.5 | 88.1 | 94.3 | 96.2 | 96.0 | 96.6 |
| J | TiO₂(anatase) | 20,000 psi | — | — | 78.6 | 83.6 | 89.9 | 90.0 |
| K | TiO₂(rutile) | 20,000 psi | — | 84.3 | 89.6 | 91.7 | 91.4 | 91.7 |
| W | ZrO₂ | 10,000 psi | — | 88.4 | 90.0 | 90.5 | 93.1 | 91.0 |
| 98 | BeO | 20,000 psi | 84.1 | 91.9 | 92.4 | 95.2 | 95.5 | 95.3 |
| Y | HySiO₂ | 10,000 psi | — | 81.0 | 86.7 | 92.0 | 94.3 | 93.1 |
| Z | NiO | 10,000 psi | — | 78.8 | 86.5 | 86.5 | 89.2 | 88.9 |
| AA | CoO | 10,000 psi | — | 75.1 | 85.9 | 89.3 | 89.0 | — |
| BB | CeO | 10,000 psi | — | 85.1 | 88.4 | 90.3 | 89.8 | — |
| CC | Fe₂O₃ | 10,000 psi | — | 84.8 | 86.2 | 89.1 | 91.0 | — |
| 28 | Al₂O₃.H₂O | 20,000 psi | 57.0 | 75.8 | 84.3 | 88.2 | 86.8 | 89.5 |
| 111 | S,D₂ | 20,000 psi | 84.5 | 87.0 | — | 93.8 | 93.9 | 94.7 |
| 188 | MnO₂ | Hand Tamped | — | — | 68.7 | — | 77.5 | 84.3 |
| 190 | WO₃ | Hand Tamped | 59.5 | — | 74.0 | 84.1 | 85.5 | 85.8 |
| 191 | Ta₂O₅ | Hand Tamped | 77.8 | 85.4 | 89.6 | 91.1 | 92.2 | 90.8 |
| 222 | Fe₃O₄ | Hand Tamped | 84.7 | 88.0 | 91.5 | 94.2 | 95.5 | 95.4 | to a maximum of 1200°F. The still porous samples were then heated to 350°F., immersed in concentrated chromic acid, removed and then heated slowly to 1200°F. and the process repeated for the number of cycles indicated in Table LXX.

A typical curing cycle is as follows: Body heated to room temperature of up to 350°F. immersed in concentrated chromic acid solution; remove from acid solution and cure in an oven at 150°F. for 20 minutes; cure at 350°F. for 20 minutes; cure at from 500°F. to 550°F. for 30 minutes; cure at 750°F. to 800°F. for 20 minutes; cure at 1200°F. for 15 to 20 minutes; remove from oven; and, cool to room temperature or to 350°F. for further immersion. These steps would, of course, be repeated for multiple cycle treatment.

Heating the body to 350°F. prior to immersion in the chemical solution was done only as an attempt to create a partial vacuum within the part upon cooling to enhance complete impregnation with the treating solution. It has been found that capillary action is usually sufficient to cause complete impregnation within the parts even at room temperature; however, it has been found that improved impregnation is accomplished by heating the impregnating solution, particularly chromic acid. A temperature on the order of 190°F. for chromic acid produces an increase in impregnation on the order of about 10%.

In order to assure flat smooth surfaces, especially with the hand tamped samples, the test pieces were lightly sanded on silicon carbide abrasive paper after the first or second cycle. Early finishing was done only to avoid the necessity of diamond lapping which, for most of these samples, would be required after three or four impregnations.

Table LXXI has been included for comparison purposes and gives the 15-N Rockwell hardness values for a variety of common materials. It can be seen that some of the oxides hardened by the method of the present invention as listed in Table LXX become extremely hard. Table LXXII is a conversion table for Rockwell A hardness to Rockwell 15-N over a limited range.

TABLE LXXI

15N-ROCKWELL HARDNESS VALUES
FOR SOME COMMON MATERIALS

| | |
|---|---|
| Titanium, Type A | 15N-63 |
| Cold Rolled Steel (1040) | 15N-69 |
| 303 Stainless Steel | 15N-69.6 |
| 416 Stainless Steel | 15N-72 |
| Beryllia Ceramic (Coors BD-96 | 15N-88.5 |
| Titania Ceramic (AlSiMag 192) | 15N-89.6 |
| Spring Steel (Hack Saw Blade) | 15N-91 |
| Hardened Tool Steel (Rex AAA) | 15N-92.4 |
| Pyrex Glass, Tempered | 15N-93.6 |
| Alumina Ceramic (Coors AD-94) | 15N-94.2 |
| Alumina Ceramic (Coors AD-995) | 15N-94.8 |
| Tungsten Carbide Alloy (Carboloy 603) | 15N-95.9 |

NOTE: Above average readings were made on actual samples. Values may not necessarily agree with those of manufacturers published data.

TABLE LXXII

HARDNESS CONVERSION-ROCKWELL A TO ROCKWELL 15-N

| Rockwell A | Rockwell 15-N | Rockwell A | Rockwell 15-N |
|---|---|---|---|
| 92.0 | 96.5 | 79.0 | 88.5 |
| 91.5 | — | 78.5 | 88.0 |
| 91.0 | 96.0 | 78.0 | 87.5 |
| 90.5 | — | 77.5 | 87.0 |
| 90.0 | 95.5 | 77.0 | 86.5 |
| 89.5 | — | 76.5 | 86.0 |
| 89.0 | 95.0 | 76.0 | 85.5 |
| 88.5 | — | 75.5 | 85.0 |
| 88.0 | 94.5 | 74.5 | 84.5 |
| 87.0 | — | 74.0 | 84.0 |
| 86.5 | 94.0 | 73.5 | 83.5 |
| 86.0 | 93.5 | 73.0 | 83.0 |
| 85.5 | — | 72.5 | 82.5 |
| 85.0 | 93.0 | 72.0 | 82.0 |
| 84.5 | 92.5 | 71.5 | 81.5 |
| 84.0 | 92.0 | 71.0 | 81.0 |
| 83.5 | — | 70.5 | 80.5 |
| 83.0 | 91.5 | 70.0 | 80.0 |
| 82.5 | 91.0 | 69.5 | 79.5 |
| 81.5 | 90.5 | 69.0 | 79.0 |
| 81.0 | 90.0 | 68.5 | 78.5 |
| 80.5 | 89.5 | 68.0 | 78.0 |
| 80.0 | — | 67.5 | 77.0 |
| 79.5 | 89.0 | 67.0 | 76.5 |
| 66.5 | 76.0 | 63.0 | 72.0 |
| 66.0 | 75.5 | 62.5 | 71.5 |
| 65.5 | 75.0 | 62.0 | 71.0 |
| 65.0 | 74.5 | 61.5 | 70.5 |
| 64.5 | 74.0 | 61.0 | 70.0 |

TABLE LXXII-continued

HARDNESS CONVERSION-ROCKWELL A TO ROCKWELL 15-N

| Rockwell A | Rockwell 15-N | Rockwell A | Rockwell 15-N |
|---|---|---|---|
| 64.0 | 73.5 | 60.5 | 69.5 |
| 63.5 | 72.5 | | | ceived from the manufacturer (−325 mesh). The remaining samples employed the same material with additional ball milling using water as the vehicle. Microscopic examination of particles showed a definite reduction in size with hours of milling. The −325 mesh material, 48 hours milled material and the mixtures of various particle sizes, show the best results. The 24 hour and the 96 hour ball milled materials show defi-

TABLE LXXIII

HARDNESS MEASUREMENTS FOR PRESSED SAMPLES COMPOSED OF HIGH PURITY MIXED OXIDES WITH MULTIPLE CHROMIC ACID IMPREGNATIONS

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| EE | $ZrO_2(1) + Al_2O_3$-tabular(1) | 10,000 psi | — | 87.7 | 91.0 | 92.9 | 92.4 | 93.1 |
| 225 | $Cr_2O_3(4) + Fe_3O_4(1)$ | Hand Tamped | — | 89.5 | 94.0 | 94.4 | 95.7 | 96.2 |
| GG | $BeO(1) + Al_2O_3$-tabular(1) | 10,000 psi | — | 92.0 | 91.7 | 94.0 | 94.6 | 92.5 |
| HH | $NiO(1) + Al_2O_3$-tabular(1) | 10,000 psi | — | 85.2 | 88.6 | 90.7 | 91.4 | 91.7 |
| 7 | $TiO_2$-rutile(2) + $Al_2O_3$-tabular(1) | 20,000 psi | 80.0 | 86.2 | 91.5 | 92.2 | 91.5 | 93.0 |
| 8 | $TiO_2$-rutile(1) + $Al_2O_3$-tabular(1) | 20,000 psi | 79.6 | 87.6 | 91.9 | 89.6 | 91.3 | 89.7 |
| 9 | $TiO_2$-rutile(1) + $Al_2O_3$-tabular(1) | 20,000 psi | 78.2 | 89.6 | 93.0 | 93.4 | 90.1 | 89.9 |
| 10 | $CeO(1) + Al_2O_3$-tabular(1) | 20,000 psi | 81.4 | 88.3 | 91.4 | 91.4 | 91.4 | 92.5 |
| 11 | $Fe_2O_3(1) + Al_2O_3$-tabular(1) | 20,000 psi | 82.4 | 87.3 | 91.6 | 92.7 | 93.5 | 93.5 |
| 13 | $Cr_2O_3(1) + Al_2O_3$-tabular(1) | 20,000 psi | 82.8 | 90.4 | 93.6 | 94.5 | 94.4 | 94.5 |
| 14 | $Cr_2O_3(1) + Al_2O_3$-tabular(2) | 20,000 psi | 81.8 | 90.8 | 91.1 | 93.9 | 93.4 | 94.1 |
| 15 | $Cr_2O_3(1) + TiO_2$-rutile(1) | 20,000 psi | 83.0 | 86.9 | 90.1 | 90.4 | 92.4 | 91.9 |
| 16 | $Cr_2O_3(1) + BeO(1)$ | 20,000 psi | 83.5 | 92.2 | — | 95.5 | 95.4 | 96.7 |
| 17 | $Cr_2O_3(1) + ZrO_2(1)$ | 20,000 psi | 85.0 | 88.7 | 92.1 | 93.5 | 93.6 | 94.6 |
| 18 | $BeO(1) + TiO_2$-rutile(1) | 20,000 psi | 80.3 | 89.3 | 92.3 | 88.6 | 94.2 | 93.5 |
| 19 | $ZrO_2(1) + TiO_2$-rutile(1) | 20,000 psi | 75.7 | 81.6 | 86.1 | 88.2 | 89.5 | 92.3 |
| 20 | $ZrO_2(1) + BeO(1)$ | 20,000 psi | 81.9 | 87.8 | 92.0 | 94.0 | 95.1 | 94.3 |

Samples were prepared to determine the effect of particle size on the hardness of pressed refractory oxides hardened by means of the present chemical process. Samples described below were chemically treated with chromic acid and cured at a maximum temperature of 1200°F.

Table LXXIV covers Rockewell hardness measurements for samples pressed from several grades of Meller 99.8% aluminum oxide. The tests were conducted on samples predominently of 0.06 $\mu$, 0.3 $\mu$, 1.0 $\mu$ particle size in addition to a 1–30 $\mu$ and a 5–10 $\mu$ range particle size. It is interesting to note from the table that there is very little difference in the hardness values achieved with any of these various size oxides except for the 5–10 $\mu$ type which gave noticeably lower values.

Because of the limited particle size distribution of the 5–10 $\mu$ powder, it is quite probable that the pressed body has a structure composed of both large and small pores. This would be primarily due to the lack of fine particles to fit into the spaces between the larger ones. Such a structure is difficult to completely harden since, once the smaller pores or passages becomes filled, there is no longer any way to reach the larger, and by now sealed off, spaces with subsequent treatments.

Table LXXV shows the results of another comparison using Alcoa T-61 tabular alumina (~99.3% $Al_2O_3$). Sample A was pressed using a dry milled grade as re- nitely inferior hardness results. The same results have been achieved with the 24 hour and 96 hour materials in several other tests so it can again only be assumed that a difference in pore structure exists in the bodies pressed from this material.

Indications as a result of a great many samples are that maximum hardness and density with a given oxide material is achieved only with particle sizes and shapes that provide the most uniform interstitial structure. In such cases, there can be a very complete impregnation resulting in the most dense and hardest structure possible with the materials involved. The uniform interstitial requirement would also explain the reason that lightly pressed samples can sometimes be chemically treated to a greater degree of hardness than those formed under extremely high pressure. In the latter case, trapped pores, or at least spaces with smaller passages leading to them, may occur, resulting in less than maximum hardness.

Figure 7:
FIG. 7 is a 200X metallographic photograph of a pressed body of beryllium oxide powder which has been chemically hardened.
Figure 8:
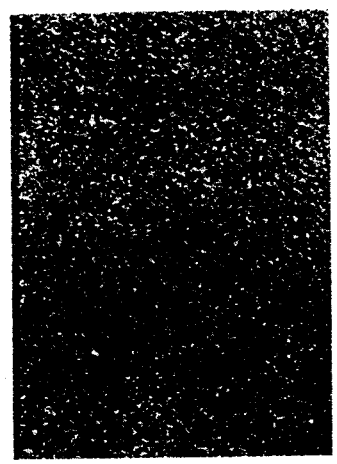
FIG. 8 is a 200X metallographic photograph of a pressed body of chromium oxide powder which has been chemically hardened.

Referring to the drawing, FIG. 8 shows a metallographic photograph with a magnification of 200X of a body of pressed powdered chromium oxide as the refractory base material which has been hardened by chromic acid treatments. The material of FIG. 8 appears as sample No. 116 in Table LXX. FIG. 7 is also a metallographic photo at 200X of a pressed body where the base material is beryllium oxide. FIG. 7 appears as sample No. 98 in Table LXX.

TABLE LXXIV

HARDNESS VARIATIONS AS A RESULT OF USING HIGH PURITY ALUMINA (99.98% $Al_2O_3$) OF DIFFERENT PARTICLE SIZES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 124 | $Al_2O_3$, 99.98% Meller, 0.06 $\mu$ | Hand Tamped | 66.8 | 78.4 | 84.0 | 92.5 | 95.0 | 93.5 |
| 123 | $Al_2O_3$, 99.98% Meller, 0.3 $\mu$ | Hand Tamped | 75.2 | — | 91.9 | 92.6 | 93.9 | 94.1 |
| 122 | $Al_2O_3$, 99.98% Meller, 1.0 $\mu$ | Hand Tamped | 76.4 | — | 92.1 | 93.6 | 94.7 | 95.8 |
| 125 | $Al_2O_3$, 99.98% Meller, 5–10 $\mu$ | Hand Tamped | 76.5 | 87.6 | 88.9 | 88.9 | 91.6 | 91.2 |
| 126 | $Al_2O_3$, 99.98% Meller, 1–30 $\mu$ | Hand Tamped | 74.0 | — | 91.4 | 92.4 | 93.7 | 95.3 |

TABLE LXXV

HARDNESS VARIATIONS IN ALCOA TABULAR ALUMINA
DRY GROUND OR WET MILLED TO OBTAIN DIFFERENT PARTICLE SIZE AND RANGES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| A | $Al_2O_3$-tabular, Alcoa T-61(−325 mesh) | 20,000 psi | N.M. | N.M. | 92.8 | 93.1 | 94.8 | 94.3 |
| 29 | $Al_2O_3$-tabular, T-61(−325 mesh), Ball Milled 24 hrs. | 20,000 psi | 81.8 | 88.8 | 90.7 | 91.6 | 92.8 | 92.9 |
| 30 | $Al_2O_3$-tabular, T-61(−325 mesh), Ball Milled 48 hrs. | 20,000 psi | 82.4 | 90.6 | 92.0 | 94.0 | 95.0 | 94.3 |
| 31 | $Al_2O_3$-tabular, T-61(−325 mesh), Ball Milled 96 hrs. | 20,000 psi | 82.1 | 87.1 | 91.7 | 91.6 | 90.4 | 92.7 |
| 32 | $Al_2O_3$-tabular, T-61(−325 mesh), Ball Milled 24 hrs. (1 part), 48 hrs. (1 part), 96 hrs. (1 part) | 20,000 psi | 83.9 | 90.3 | 92.1 | 91.7 | 93.1 | 93.2 |
| 33 | $Al_2O_3$-tabular, T-61(−325 mesh), −325 mesh (1 part), 96 hrs. (1 part), 24 hrs. (1 part), 48 hrs. (1 part) | 20,000 psi | 81.6 | 90.0 | 91.9 | 93.4 | 94.2 | 93.7 |

Samples were prepared and tested to determine the effect on hardness due to using various available forms of alumina and chromia as the base oxide material for pressed samples. Among the forms of alumina investigated were alpha, beta and gamma types and including hydrated, calcined, tabular and fused varieties of one or more of these types. The chromia ($Cr_2O_3$) is available in a much narrower selection of forms. However, a comparision of standard finely divided, chemically produced chromia with that of fused ball milled chromia has been made.

Table LXXVI gives hardness comparisons for pressed samples made from several commercially available Alcoa aluminas. These include tabular, calcined and hydrated forms. As might be expected, the hydrated forms do not achieve maximum hardness, at least as rapidly as do the tabular and calcined types. Since the particular hydrated aluminas tested (Type C-37 and C-331) are approximately 65% $Al_2O_3$ in their pre-heated condition, it is to be understood that more chemical treatment-cure cycles would be required to reach maximum hardness than would be the case with the tabular and calcined varieties.

The hydrated aluminas take the form of white granular crystals with the formula $Al_2O_3 \cdot 3H_2O$ (or sometimes written $Al(OH)_3$). Type C-37 is a beta crystal form with a +325 mesh size (325 mesh ≈35 micron particle size), while C-331 is much finer than 325 mesh, having an average particle size of only 6.5 to 8.5 microns.

The tabular and calcined aluminas listed in Table LXXVI are all −325 mesh and are 99+% $Al_2O_3$. These are aluminas of the alpha type. The tabular alumina is ground from tablet-like crystals (well developed alpha alumina) that has been converted to the corundum form by heating to a temperature slightly below the fusion point (3700°F.) of aluminum oxide. The calcined aluminas are here considered to be of a less well developed alpha form.

There is very little difference in hardness of samples produced with the tabular as compared with the calcined aluminas. Since it was expected that the hydrated alumina (especially sample 152) would approach comparable hardness with additional chemical hardening treatments, samples 151 and 152 were given additional impregnations. After 17 impregnation-cure cycles, No. 152 achieved a hardness of 15-N-93.2 on the Rockwell scale. Sample No. 151 did not do as well, reaching only 15-N-90.6 after 17 cycles. This sample (151) is composed of large size particles; being predominently greater than 35 μ in dimension, which probably accounts for the very slow rate at which hardness of this sample is increasing.

Table LXXVII shows hardness results obtained by means of the chemical hardening process of the invention using a variety of additional aluminum oxide forms. These include crushed and/or ball milled fused alumina abrasives of 90 to 99% purity in addition to one test (No. 167) pressed from a −325 mesh fused bauxite material containing about 5–8% titanium and other impurities. From the data of Tables LXXVI and LXXVII, it would appear that maximum hardness of alumina material is not as dependent on form or purity as it is on particle size and uniformity of porosity. It must be pointed out, however, that the major impurity of most of the materials listed, especially those of Table LXXVII, are iron oxide and titania, which as seen earlier also provides an extremely hard body when used by themselves with the chromic acid treatment.

Table LXXVII shows comparison of three chromia samples. Number 116 is pressed from the standard 99% chemically produced chromia of finely divided crystalline form. Sample 205 is the same material after ball milling wet for 40 hours. These two samples show only slight differences in hardness. The third test, sample 220, however, shows significantly lower hardness. This material was prepared by ball milling plasma sprayed chromium oxide coatings built up to a heavy layer on a subsequently discarded metal substrate. While the purity of sample 220 is nominally about 90% (with a high percentage of silica for the impurity), this material was quite difficult to ball mill with a noticeable percentage of large size particles being included along with the greater percentage of very fine particles. Again, therefore, reduced hardness of this particular sample is believed to be due primarily to an unfortunate interstitial structure of irregular porosity and/or large pore size, rather than purity or the fact that it is a re-ground fused material.

Figure 5:
FIG. 5 is a metallographic photograph at 200X magnification of a pressed body of Alcoa T-61(-325 mesh) alumina ball milled 48 hours and chemically hardened.
Figure 6:
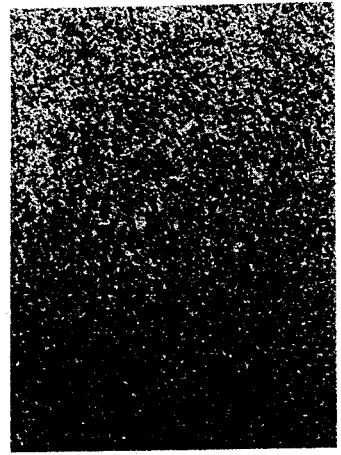
FIG. 6 is a 200X metallographic photograph of a pressed body of Alcoa T-61(-325 mesh) alumina ball milled 96 hours and chemically hardened.

Again referring to the drawings, FIG. 5 shows a metallographic photograph with a magnification of 200X where the base material is a pressed Alcoa T-61 (−325 mesh) alumina ball milled for 48 hours and hardened by chromic acid treatments. FIG. 5 appears as sample No. 31 in Table LXXV. FIG. 6 is also a pressed body of Alcoa T-61 (−325 mesh) alumina like that of FIG. 5, but having been ball milled for 96 hours before chromic acid hardening treatments. A finer particle size is noticeable. FIG. 6 appears as sample No. 31 in Table LXXV.

TABLE LXXVI

HARDNESS RESULTS OBTAINED WITH A VARIETY OF COMMERCIALLY AVAILABLE FORMS OF ALUMINA AFTER CHEMICAL HARDENING

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 119 | $Al_2O_3$, tabular, Alcoa T-61 (−325 mesh) | Hand Tamped | 80.6 | 91.3 | 92.1 | 92.6 | 94.3 | 94.0 |
| 155 | $Al_2O_3$, calcined, Alcoa A-3(−325 mesh) | Hand Tamped | 71.9 | 86.4 | 89.1 | 92.1 | 92.7 | 93.9 |
| 154 | $Al_2O_3$, calcined, Alcoa A-5 (−325 mesh) | Hand Tamped | — | 79.2 | 89.1 | 94.1 | 94.8 | 94.6 |
| 153 | $Al_2O_3$, calcined, Alcoa A-14 (−325 mesh) | Hand Tamped | 73.4 | 88.9 | 93.0 | 93.3 | 93.4 | 93.7 |
| 151 | $Al_2O_3$, hydrated, Alcoa C-37 | Hand Tamped | 41.9 | 65.9 | 80.4 | 82.2 | 87.4 | 88.6 |
| 152 | $Al_2O_3$, hydrated, Alcoa C-331 | Hand Tamped | — | — | 81.3 | 85.8 | 90.3 | 92.2 |

TABLE LXXVII

HARDNESS RESULTS OBTAINED BY CHEMICALLY TREATING A NUMBER OF COMMERCIALLY AVAILABLE, FUSED ALUMINA MATERIALS

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 45 | $Al_2O_3$, fused 1700 grit abrasive | 20,000 psi | 65.3 | 83.0 | 86.4 | 87.6 | 86.8 | 89.6 |
| 50 | $Al_2O_3$, fused 1700 grit, Ball Milled 96 hours | 20,000 psi | 78.1 | 87.4 | 87.3 | 89.2 | 88.9 | 90.2 |
| 60 | $Al_2O_3$, fused 36 grit semi-friable, Ball Milled 48 hours | 20,000 psi | 76.1 | 87.0 | 88.8 | 90.3 | 90.4 | 92.0 |
| 206 | $Al_2O_3$, fused 240 grit friable (99%), Ball Milled 40 hours | Hand Tamped | 74.5 | 89.0 | 93.3 | 94.1 | 93.9 | 93.4 |
| 167 | Fused Bauxite, DCF abrasive, −325 mesh | Hand Tamped | — | 87.2 | 92.6 | 93.4 | — | 93.8 |

TABLE LXXVIII

HARDNESS RESULTS OBTAINED BY CHEMICALLY HARDENING STANDARD AND BALL MILLED CHROMIA AND BALL MILLED, FUSED CHROMIA PRESSED SAMPLES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 220 | Fused $Cr_2O_3$, Ball Milled 48 hours | Hand Tamped | 85.8 | 91.7 | 92.3 | 92.6 | 93.3 | 93.6 |
| 116 | $Cr_2O_3$, 99% (chemically reduced) | Hand Tamped | 84.5 | 88.1 | 94.3 | 96.2 | 96.0 | 96.6 |
| 205 | $Cr_2O_3$, 99%, Ball Milled 40 hours | Hand Tamped | 75.8 | 89.4 | 93.8 | 95.7 | 95.9 | 96.0 |

Powdered oxide forming pressure variations and their effect on hardness have been investigated to a limited extent.

Table LXXIX shows variations in die pressure for alumina samples made from a 99.5% $Al_2O_3$ ball milled material. Treatment and curing were identical to that of previous chromic acid processing. Maximum cure temperature was 1200°F. Samples were approximately ½ inch in diameter and about 1/10 inch in thickness. Pressure was applied to the ½ diameter areas by means of a hydraulic press. The sample was contained within a ring mold which was removed after reaching about 1200°F. during the initial cure cycle.

Table LXXX shows data of the same type, but made using chromia (99.9%) instead of alumina or the base oxide material.

The data presented in Tables LXXIX and LXXX show very little significant variation in hardness with die pressure within the ranges tested. It has been found that too little pressure will sometimes result in a part with voids and "soft spots." It is also suspected (based partly on inconclusive tests) that too high a forming pressure could close up vital passages and result in less than optimum hardness.

TABLE LXXIX

HARDNESS VARIATIONS FOR CHEMICALLY TREATED PRESSED ALUMINA SAMPLES USING DIFFERENT FORMING PRESSURES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| R | $Al_2O_3$, Coors AHP-99, Ball Milled 48 hrs. | 5,000 psi | — | 85.8 | 88.4 | 91.7 | 92.5 | 92.9 |
| P | $Al_2O_3$, Coors AHP-99, Ball Milled 48 hrs. | 10,000 psi | — | 84.7 | 90.7 | 91.9 | 91.6 | 90.8 |
| O | $Al_2O_3$, Coors AHP-99, Ball Milled 48 hrs. | 20,000 psi | — | — | 88.1 | 91.3 | 93.5 | 93.4 |
| B | $Al_2O_3$, Coors AHP-99, Ball Milled 48 hrs. | 40,000 psi | — | 88.9 | 90.9 | 93.5 | 94.7 | 93.8 |

TABLE LXXX

HARDNESS VARIATIONS FOR CHEMICALLY TREATED PRESSED CHROMIA SAMPLES USING DIFFERENT FORMING PRESSURES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| T | $Cr_2O_3$, 99% (very fine powdered form) | 5,000 psi | — | 84.6 | 91.6 | 93.8 | 95.2 | 96.2 |
| U | $Cr_2O_3$, 99% (very fine powdered form) | 10,000 psi | — | 90.3 | 94.2 | 96.1 | 96.4 | 95.9 |

TABLE LXXX-continued

HARDNESS VARIATIONS FOR CHEMICALLY TREATED PRESSED CHROMIA SAMPLES USING DIFFERENT FORMING PRESSURES

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| I | Cr$_2$O$_3$, 99% (very fine powdered form) | 20,000 psi | — | 88.3 | 92.3 | 95.7 | 94.2 | 97.0 |
| S | Cr$_2$O$_3$, 99% (very fine powdered form) | 40,000 psi | — | 79.6 | 93.7 | 94.3 | 96.7 | 95.3 |

Various schemes of type and amount of moistening agent used have been investigated and their effect on product hardness and density determined. These variations, at least as applied to pressed oxide samples, have been fairly minor in effect.

For example, using concentrated chromic acid as the refractory oxide powder moistening agent in pressed samples, little difference in final sample hardness was found whether a very little acid or a great excess was used. Three such samples are shown in Table LXXXI. When too much acid was used, the excess was simply forced out of the mold when pressure was applied. When very little (or a diluted chromic acid solution) was used as the moistening agent, a minor degradation in hardness is sometimes noted in the first two or three impregnation-cure cycles.

Other tests were performed in which the powder was pressed dry, with water or polyethylene glycol as the moistening agent. In this case, the pressed oxide was left in the mold, dried out and chromic acid applied and converted to the Cr$_2$O$_3$ form before removing the sample from the mold. Aside from the convenience of requiring the initial chemical treatment in the mold before the sample could be removed and handled without falling apart, little difference in ultimate hardness was found.

Tests were made with identically prepared pressed oxide samples with the only variation being the curing temperature. The chromic oxide treatment was employed except that the maximum cure temperatures for individual sample runs were selected as 900°F., 1200°F., and 1500°F. These temperatures were selected because definite color changes are seen to occur in these ranges, changing from a darker blue-green with 850° to 1000°F. cure temperature to a medium green at 1200°F. and a somewhat lighter green at 1400° to 1500°F. It is expected that the color variation is due to an incomplete decomposition of the CrO$_3$ at the lower temperatures and that some of the intermediate chromium oxides such as CrO$_2$, Cr$_6$O$_{15}$, Cr$_4$O$_9$, etc., may be present. No significant difference in hardness of the samples cured at the different temperatures was found.

During the heating of chromic acid impregnated samples, and especially in the 400° to 700°F. temperature range, there tends to be an evolvement of reddish fumes from the sample. The fumes become quite noticeable when heated to the above temperatures should the oven door be opened admitting a fresh supply of air. In the 400° to 700°F. temperature range, the chromic acid has most certainly been converted to the chromium trioxide form, the water having been driven off by this time. Because of this noticeable decomposition in the presence of air, the hardening or conversion process was carried out in an inert atmosphere and the results compared with the normal oven curing method in which at least a partial oxygen environment exists. Another test consisted of forcing air through the oven during the curing cycles.

None of these tests showed any significant difference in amount of weight increase in the sample, even after several impregnation-cure cycles. Hardness differences likewise could not be detected.

This section describes hardness results obtained with pressed bodies formed of so-called impure refractory materials such as kaolin, clays and the like, or high purity oxides to which such impurities have been added.

Table LXXXIII shows hardness results of a variety of commercially available kaolin clays. The kaolins tested were all products of the Georgia Kaolin Company and represent both hydrated and calcined types of a variety of mean particle sizes. Table LXXXIV gives particle size data for these various grades. Kaolin materials are aluminum silicate clays and generally take the form of small plate-like crystals. The alumina content may range from about 40 to 50%, depending on the grade and type involved. Table LXXXIII shows a wide variety of hardness values depending on the type used. As might be expected, the calcined kaolins provide the highest hardness values. Two of these, Glomax-JD and Glomax-LL (samples 211 to 213), are seen to achieve a Rockwell hardness in excess of 15-N-94. This is comparable with the maximum hardness for several of the high purity (99+%) aluminum oxides previously described.

Table LXXXV shows similar hardness tables for other impure materials, including feldspar, fused and non-fused bauxite, Kentucky ball clay, bentonite and other clays. While hardness values of these materials are not as great as for some of the kaolins or many of the purer oxides described earlier, some of them are at least comparable with commercially available ceramic materials formed by high temperature sintering processes. The 100 mesh feldspar and bauxite might have shown better hardness values if they had been milled to

TABLE LXXXI

HARDNESS MEASUREMENTS FOR CHEMICALLY TREATED PRESSED ALUMINA SAMPLES USING VARYING AMOUNTS OF CHROMIC ACID AS THE OXIDE MOISTENING AGENT

| Sample | Base Oxide Material | Condition of Mix | Forming Pressure | 15-N Rockwell Hardness vs No. Impregnations | | | | | |
|---|---|---|---|---|---|---|---|---|---|
| | | | | 3x | 5x | 7x | 9x | 11x | 13x |
| JJ | Al$_2$O$_3$ (94%) Coors AP-94, Ball Milled 52 hrs. | slightly damp | 10,000 psi | 83.9 | 88.5 | 92.3 | 92.1 | 93.1 | — |
| KK | Al$_2$O$_3$ (94%) Coors AP-94, Ball Milled 52 hrs. | damp | 10,000 psi | 81.8 | 89.2 | 91.5 | 90.9 | 91.9 | — |
| LL | Al$_2$O$_3$ (94%) Coors AP-94, Ball Milled 52 hrs. | wet | 10,000 psi | 83.1 | 89.4 | 93.0 | 93.1 | 93.1 | — | a much finer particle size and dehydrated before attempting to chemically harden.

The data presented in Table LXXXVI is of a test series showing hardness achieved by adding 25% or less, by volume, amounts of kaolin, or iron oxide of the $Fe_3O_4$ form to a > 99+% base oxide material. It will be noted that these additions ($\approx$10% to 20% by weight) do not necessarily degrade the hardness over that obtained with the pure oxide. For example, comparing the 99% alumina sample No. 206 with the impure sample No. 223 or the 99% chromia sample No. 116 with sample No. 225 and No. 219, the $Fe_3O_4$ or calcined kaolin additives result at best in only minor hardness degradation in these particular percentage combinations. Again, as expected, the particle size distribution and resulting interstitial structure of the pressed body appears to be playing a large role in ultimate hardness obtained.

TABLE LXXXIV

PARTICLE SIZE VARIATIONS FOR HYDRATED AND CALCINED KAOLINS MANUFACTURED BY THE GEORGIA KAOLIN COMPANY

1. HYDRATED KAOLINS

| Type Designation | Mean Particle Size | % <2 Microns |
|---|---|---|
| Ajax P | 0.45 – 0.50μ | 92 – 94% |
| Ajax 70 | 0.75 – 0.80μ | 70 – 74% |
| Velvacast | 3.5 – 4.5μ | 30 – 35% |
| Pioneer Air Floated | 0.8 –1.0μ | 55 – 65% |

2. CALCINED KAOLINS

| Type Designation | Mean Particle Size | % <2 Microns |
|---|---|---|
| Ajax S | 5.0 – 6.4μ | 14 – 20% |
| Glomax JD | 0.9μ | ~89% |
| Glomax HE | 1.2μ | ~80% |
| Glomax LL | 1.8μ | ~52% |
| Glomax PVR | 4.8μ | ~22% |

TABLE LXXXIII

HARDNESS MEASUREMENTS OBTAINED BY MYLTIPLE CHEMICAL TREATMENTS USING VARIOUS GRADES AND TYPES OF KAOLIN AS THE PRESSED OXIDE

| Sample | Base Oxide Material | Forming Pressure | 15-N Rockwell Hardness vs. No. Impregnations | | | | | |
|---|---|---|---|---|---|---|---|---|
| | | | 3x | 5x | 7x | 9x | 11x | 13x |
| 207 | Kaolin, Pioneer Air Floated (hydrated) | Hand Tamped | 68.3 | 84.4 | 88.7 | 90.5 | 90.0 | 89.3 |
| 208 | Kaolin, Ajax P (hydrated) | Hand Tamped | 69.7 | 84.0 | 89.3 | 90.1 | 90.2 | 90.1 |
| 209 | Kaolin, Ajax 70 (hydrated) | Hand Tamped | 69.7 | 84.7 | 89.1 | 90.3 | 89.9 | 90.3 |
| 210 | Kaolin, Ajax SC (calcined) | Hand Tamped | — | 70.5 | 87.1 | 91.0 | 91.8 | 92.4 |
| 211 | Kaolin, Glomax JD (calcined) | Hand Tamped | — | 82.6 | 90.6 | 92.8 | 94.2 | 94.1 |
| 212 | Kaolin, Glomax HE (calcined) | Hand Tamped | — | — | 78.6 | 88.4 | 91.7 | 93.0 |
| 213 | Kaolin, Glomax LL (calcined) | Hand Tamped | 66.8 | — | 90.4 | 92.3 | 93.5 | 94.3 |
| 214 | Kaolin, Glomax PVR (calcined) | Hand Tamped | 68.8 | 84.6 | 88.5 | 90.4 | 91.4 | 90.9 |
| 215 | Kaolin, Velvacast (hydrated) | Hand Tamped | 79.5 | 86.0 | 88.5 | 89.7 | 90.0 | 89.4 |

TABLE LXXXV

HARDNESS MEASUREMENTS OBTAINED AFTER MULTIPLE CHEMICAL TREATMENTS USING A VARIETY OF CLAYS AND GROUND ORES AS THE PRESSED BASE MATERIALS

| Sample | Base Oxide Material | Forming Pressure | 15-N Rockwell Hardness vs No. Impregnations | | | | | |
|---|---|---|---|---|---|---|---|---|
| | | | 3X | 5x | 7x | 9x | 11x | 13x |
| 4 | Feldspar, –100 mesh | 20,000 psi | 65.6 | 88.6 | 80.1 | — | 87.2 | 87.8 |
| 36 | Bauxite, –100 mesh | 20,000 psi | — | 46.5 | 73.6 | 80.2 | 84.1 | 77.9 |
| 35 | King Island (Alaska) Clay | 20,000 psi | — | 64.0 | 72.3 | 76.1 | 84.3 | 87.1 |
| 69 | Amaco type X-11 Grey Clay | 20,000 psi | 48.4 | 51.9 | 57.0 | 73.1 | 75.2 | 74.5 |
| 77 | Kentucky Ball Clay | 20,000 psi | 61.2 | 72.8 | 76.2 | 89.3 | 91.3 | 91.8 |
| 96 | Bentonite Clay | 20,000 psi | N.M. | N.M. | N.M. | N.M. | N.M. | N.M. |
| 142 | Fused Bauxite, DCF abrasive, –325 mesh | Hand Tamped | 70.3 | 85.3 | 90.0 | 89.4 | 89.1 | 92.4 |

TABLE LXXXVI

HARDNESS MEASUREMENTS OF PRESSED SAMPLES AS A RESULT OF MULTIPLE CHEMICAL TREATMENTS FOR RELATIVELY PURE OXIDES WITH KAOLIN ADDED AS THE IMPURITY

| Sample | | Base Oxide Material | Ball Milled | Parts by Volume | Forming Pressure | 15-N Rockwell Hardness vs No. Impregnations | | | | | |
|---|---|---|---|---|---|---|---|---|---|---|---|
| | | | | | | 3x | 5x | 7x | 9x | 11x | 13x |
| 226 | $Cr_2O_3$ | Kaolin, Ajax P | — | 4:1 | Hand Tamped | — | 85.9 | 90.5 | 91.6 | 92.4 | 94.0 |
| 225 | $Cr_2O_3$ | $Fe_3O_4$ | — | 4:1 | Hand Tamped | — | 89.5 | 94.0 | 94.4 | 95.7 | 96.2 |
| 224 | Kaolin, Ajax P | $Al_2O_3$, 240 grit Friable Abrasive (99%) | 40 hrs. | 1:4 | Hand Tamped | — | 86.9 | 89.9 | 90.9 | 93.0 | 91.5 |
| 223 | $Fe_3O_4$ | $Al_2O_3$, 240 grit Friable Abrasive (99%) | 40 hrs. | 1:4 | Hand Tamped | — | 89.2 | 92.3 | 92.8 | 93.1 | 93.5 |
| 219 | $Cr_2O_3$ | Kaolin, Glomax HE | — | 4:1 | Hand Tamped | 82.0 | 89.1 | 93.0 | 95.5 | 96.4 | 96.2 |
| 217 | $Cr_2O_3$ | Kaolin, Ajax 70 | — | 6:1 | Hand Tamped | 85.5 | 91.4 | 94.1 | 95.0 | 95.3 | 94.7 |
| 216 | $Cr_2O_3$ | Kaolin, Ajax 70 | — | 4:1 | Hand Tamped | 81.6 | 89.2 | 91.7 | 95.0 | 94.5 | 94.6 |
| 206 | — | $Al_2O_3$, 240 grit Friable Abrasive | 40 hrs. | 0:1 | Hand Tamped | 74.5 | 89.0 | 93.3 | 94.1 | 93.9 | 93.4 |
| 116 | $Cr_2O_3$ | — | — | 1:0 | Hand Tamped | 84.5 | 88.1 | 94.3 | 96.2 | 96.0 | 96.6 |

The process of this invention also encompasses composites made with a base refractory oxide material such as alumina or chromia to which has been added powdered metals, metal fibers, ceramic fibers, glass fibers, glass or metal cloth, high strength whiskers and the like.

The chemical hardening method is particularly interesting for the use in the fabrication of these composite materials. First, the low temperature (600° to 1500° F.) hardening requirement allows the use of many additives and reinforcing materials that could not be employed with ceramic based composites if the normal high temperature (2500° to 4000° F.) sintering or fusing temperatures are used. Secondly, the instant process appears to make a very strong chemical bond to many of these added materials, including glass and ceramic fibers and many of the metals.

The exceptionally strong bond to metals is believed to be due to a chemical bond to the metal oxide film that forms on the surface. Most of these metal oxides, such as those readily formed on iron, titanium, aluminum and many of the stainless steels are strongly bound to the metal surface. The chromium treatment (normally chromic acid) has, of course, already been shown to make strong bonds to most metal oxides, including those of titanium, iron, nickel and aluminum. Therefore, the metal oxide appears to form the required bridge making a true chemical bond to the metal possible.

Figure 9:
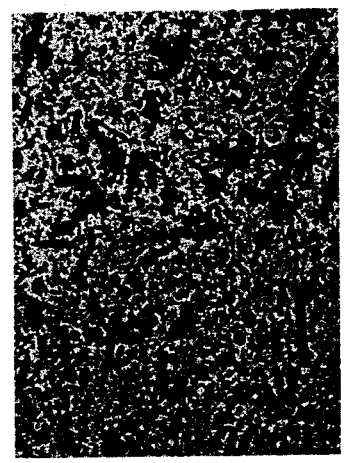
FIG. 9 is a 200X metallographic photograph of a pressed body of Alcoa T-61(-325 mesh) ball milled 96 hours with aluminum fibers added and chemically hardened.
Figure 10:
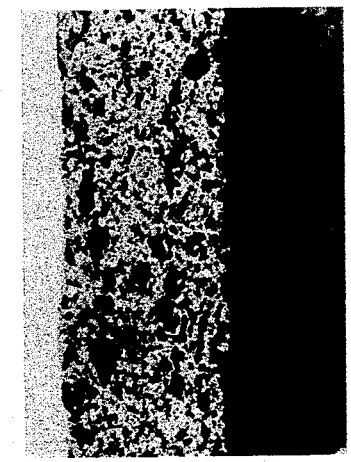
FIG. 10 is a 200X metallographic photograph of a refractory oxide painted on a metal substrate and chemically hardened.

A number of these composite material structures hardened by the chemical process of this invention are shown in Table LXXXVII. Some of these combinations are mixtures of widely different physical sizes and shapes of the same material, others are refractory oxides with added glass, metal or ceramic fibers, some are mixtures of refractory oxide and metal powders, and others are ceramic base materials with additives such as boron nitride or graphite used as "built-in" solid lubricants. Many other composites can, of course, be readily visualized using this low temperature bonding technique that should provide new families of materials not heretofore possible with normal high temperature sintering processes. Reference is made to FIG. 9 of the drawings which shows a metallographic photograph at 200 magnification of a pressed body of T-61 (-325 mesh) alumina ball milled 96 hours with alumina fibers added to produce a composite. This body has been hardened by chromic acid treatments according to the invention and appears as sample No. 87 in Table LXXXVII.

TABLE LXXXVII

HARDNESS DATA OBTAINED FOR A VARIETY OF CHEMICALLY TREATED COMPOSITE MATERIALS

| Sample | Reinforcing or Added Material | Base Oxide Material | Parts by Volume | Forming Pressure | 15-N Rockwell Hardness vs No. Impregnations | | | | | |
|---|---|---|---|---|---|---|---|---|---|---|
| | | | | | 3x | 5x | 7x | 9x | 11x | 13x |
| 185 | No. 30 Friable $Al_2O_3$ Abrasive | $Al_2O_3$-tabular, −325, Ball Milled 48 Hours | 1:1 | Hand Tamped | 87.5 | 90.4 | 90.8 | 92.9 | 95.1 | 94.3 |
| 186 | No. 30 Friable $Al_2O_3$ Abrasive | $Al_2O_3$-tabular, −325 Ball Milled 48 Hours | 2:1 | Hand Tamped | 87.6 | 91.7 | 92.3 | 93.6 | 92.6 | 93.6 |
| 187 | No. 30 Friable $Al_2O_3$ Abrasive | $Al_2O_3$-tabular, −325 Ball Milled 48 Hours | 3:1 | Hand Tamped | 87.5 | 89.9 | 91.5 | 93.0 | 93.2 | 93.2 |
| 40 | Glass Cloth | $Al_2O_3$-tabular, −325 Ball Milled 24 Hours | — | 20,000 psi | 81.5 | 87.3 | 88.5 | 91.8 | 88.5 | 90.3 |
| 53 | Boron Carbide (fine) | $Al_2O_3$-tabular, −325 Ball Milled 96 Hours | 1:1 | 20,000 psi | 40.3 | 64.4 | 70.0 | 70.2 | 74.9 | 77.3 |
| 50 | 1700 grit S.F. Abrasive | $Al_2O_3$-tabular, −325 Ball Milled 96 Hours | 2:1 | 20,000 psi | 78.1 | 87.4 | 87.3 | 89.2 | 88.9 | 90.2 |
| 70 | Graphite | $Al_2O_3$-tabular, −325 Ball Milled 24 Hours | 1:5 | 20,000 psi | 64.4 | 81.1 | 86.4 | 89.8 | 91.4 | 90.7 |
| 78 | Fe (reduced) | $Al_2O_3$-tabular, −325 Ball Milled 96 Hours | 1:1 | 20,000 psi | 81.5 | 83.0 | 83.1 | 83.3 | 83.3 | 82.4 |
| 85 | Kaolin Fibers (chopped) | $Al_2O_3$-tabular, −325 Ball Milled 96 Hours | — | 20,000 psi | 84.6 | 86.2 | 85.0 | 91.0 | 92.6 | 93.3 |
| 88 | Kaolin Fibers (unlubricated) | $Al_2O_3$-tabular, −325 Ball Milled 96 Hours | — | 20,000 psi | 78.5 | 89.1 | 89.0 | 89.5 | 87.4 | 90.8 |
| 87 | Alumina Fibers | $Al_2O_3$-tabular, −325 Ball Milled 96 Hours | — | 20,000 psi | 86.1 | 88.3 | 90.9 | 93.4 | 92.2 | 94.2 |
| 95 | Kaolin Fibers (chopped) | $Cr_2O_3$ | — | 20,000 psi | — | 83.7 | — | 91.4 | 91.8 | 92.6 |
| 118 | Alumina Fibers | $Cr_2O_3$ | — | Hand Tamped | 82.2 | 86.4 | 90.4 | 92.5 | 96.3 | 94.5 |
| 100 | Fe (reduced) | $Al_2O_3$-tabular, −325 Ball Milled 96 Hours | 2:1 | 20,000 psi | 72.5 | 78.9 | — | 80.7 | 82.4 | 81.0 |
| 101 | Fe (reduced) | $Al_2O_3$-tabular, −325 Ball Milled 96 Hours | 1:2 | 20,000 psi | 84.3 | 87.2 | — | 88.3 | 88.3 | 88.6 |
| 102 | Fe (reduced) | $Al_2O_3$-tabular, −325 Ball Milled 96 Hours | 1:3 | 20,000 psi | 84.2 | 88.3 | — | 90.0 | 91.1 | 91.3 |
| 130 | Alumina fibers | $TiO_2$ | — | Hand Tamped | 79.8 | — | 89.0 | 91.6 | 92.1 | 92.4 |
| 132 | Alumina Fibers | BeO | — | Hand Tamped | 83.7 | 88.3 | 91.3 | 92.5 | 93.7 | 94.9 |
| 135 | Kaolin Fibers (chopped) | Kaolin | — | Hand Tamped | 49.3 | 61.4 | 66.5 | 78.5 | 86.0 | 87.6 |
| 194 | Boron Nitride | $Al_2O_3$-tabular, −325 | 1:1 | Hand Tamped | 73.5 | 73.8 | 74.1 | — | 79.0 | 82.8 |

TABLE LXXXVII-continued

HARDNESS DATA OBTAINED FOR A
VARIETY OF CHEMICALLY TREATED COMPOSITE MATERIALS

| Sample | Reinforcing or Added Material | Base Oxide Material | Parts by Volume | Forming Pressure | 15-N Rockwell Hardness vs No. Impregnations | | | | | |
|---|---|---|---|---|---|---|---|---|---|---|
| | | | | | 3x | 5x | 7x | 9x | 11x | 13x |
| 195 | Boron Nitride | Ball Milled 96 Hours Al$_2$O$_3$-tabular, −325 | 1:4 | Hand Tamped | 84.7 | 89.0 | 92.9 | 93.1 | 93.4 | 95.0 |
| 198 | Boron (amorphous) | Ball Milled 96 Hours Al$_2$O$_3$-tabular, −325 | 1:3 | Hand Tamped | 86.1 | 86.4 | 84.5 | 87.6 | 88.3 | 88.6 |
| 199 | CaF$_2$ | Ball Milled 48 Hours Al$_2$O$_3$-tabular, −325 | 1:3 | Hand Tamped | 59.9 | 72.9 | 85.7 | 87.9 | 86.1 | 86.4 |
| 200 | Mica (powdered) | Ball Milled 48 Hours Al$_2$O$_3$-tabular, −325 | 1:3 | Hand Tamped | 89.0 | 90.1 | 91.3 | 91.9 | 92.2 | 92.8 |
| 227 | 000 Steel Wool | Ball Milled 48 Hours Al$_2$O$_3$-tabular, −325 | — | Hand Tamped | — | 90.3 | 99.2 | 91.9 | 93.5 | 92.2 |
| 232 | Stainless Steel Screen | Ball Milled 96 Hours Al$_2$O$_3$-tabular, −325 Ball Milled 96 Hours | — | Hand Tamped | — | — | — | — | — | — |

As previously mentioned, it has been found that a strong chemical type bond can be made to many metals, glass, ceramics and related materials. Table LXXXVIII shows hardness results for a series of pressed metal powder samples. When pressing these metal-powders, the forming pressure is extremely important since the pressure will have a decided effect on the pore structure. This is especially true with ductile metals such as copper or aluminum where excessive pressure will tend to eliminate the interconnected porous structure altogether. While the hardness achieved is not as great as with most ceramic bodies, it has been found to be higher than values for the same metal in its normal solid form, evidence that a well bonded composite has been formed between the metal particles during the chromic acid-chromic oxide conversion process. Table LXXXIX lists for comparison purposes the 15-N Rockwell hardness values for most of the metals used in the composites of Table LXXXVIII.

Table XC shows a number of miscellaneous materials such as ground glass, glass and ceramic fibers, boron carbide, silicon carbide, etc. treated with the process of this invention and the resulting hardness measurements.

Impregnation-cure cycles for samples listed in Tables LXXXVIII and XC were as previously set out. Maximum cure temperature was 1200° F. except for powdered aluminum sample of Table LXXXVIII which was reduced to 1000° F.

TABLE LXXXVIII

HARDNESS VALUES AS A FUNCTION OF NUMBER OF CHEMICAL TREATMENT
FOR VARIOUS PRESSED METAL POWDERS

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 38 | Mo, powdered (fine) | 20,000 psi | 76.7 | 74.1 | 73.7 | 74.2 | 79.0 | 79.0 |
| 46 | Cr, powdered (coarse) | 20,000 psi | 62.1 | 71.9 | 72.8 | 75.2 | 74.4 | 78.5 |
| 64 | Al, powdered (very fine) | 10,000 psi | Too soft N.M. | N.M. | N.M. | N.M. | N.M. | N.M. |
| 59 | Cu, powdered (~ .005″ particles) | 40,000 psi | 34.5 | 35.1 | 41.1 | — | — | — |
| 79 | Fe, reduced (very fine) | Hand Tamped | 75.8 | 78.6 | 80.0 | 77.8 | — | 78.8 |

TABLE LXXXIX

ROCKWELL HARDNESS VALUES FOR SOME COMMON METALS

| | |
|---|---|
| Iron (cold rolled steel) | 15N-69 |
| Titanium, Type A | 15N-63 |
| 303 Stainless Steel | 15N-69.6 |
| 316 Stainless Steel | 15N- |
| Aluminum Alloy | 15N-43 |
| Copper | 15N-24 |
| Brass | 15N-43 |
| Tempered (Spring) Steel | 15N-91 |

TABLE XC

HARDNESS VALUES AS A FUNCTION OF NUMBER OF CHEMICAL TREATMENTS
FOR A VARIETY OF PRESSED POWDERS, FIBERS, ETC.

| Sample | Base Oxide Material | Forming Pressure | 15-N Rockwell Hardness vs No. Impregnations | | | | | |
|---|---|---|---|---|---|---|---|---|
| | | | 3x | 5x | 7x | 9x | 11x | 13x |
| 44 | Ground Glass | 20,000 psi | 45.5 | 67.0 | 76.1 | 80.7 | 80.7 | 83.7 |
| 52 | Boron Carbide (fine powder) | 20,000 psi | 40.4 | 69.8 | 58.8 | 72.5 | 76.4 | 72.5 |
| 72 | Glass Paper (cut in discs and pressed in mold) | 20,000 psi | 74.9 | 80.5 | 80.2 | 80.2 | 87.8 | 79.3 |
| 81 | Alumina Fibers | 20,000 psi | 79.4 | 84.4 | 89.0 | 92.0 | 92.6 | 92.0 |
| 82 | Kaolin Fibers (chopped bulk) | 20,000 psi | 75.2 | 75.2 | 84.4 | 87.7 | 90.2 | — |
| 83 | Kaolin Fibers (unlubricated) | 20,000 psi | 64.3 | 77.9 | 85.0 | 90.6 | 91.0 | 90.9 |

Normally, maximum hardness of treated materials may be achieved with either multiple chromic acid or other oxide forming compound plus cure treatments alone or with a number of such treatments followed by a single phosphoric impregnation cure. Using two or more phosphoric acid treatments will not materially increase hardness and often results in cracking of the part if sufficient porosity still exists. Furthermore, it has been found that the phosphoric acid treatment works most efficiently in materials with fairly large pore sizes as contrasted to the chromic acid treatment that provides most rapid hardening in a structure with smaller pores.

The phosphoric acid treatment is interesting, therefore, as a final hardening treatment for pressed oxide bodies to minimize the number of chromic acid treatments required.

Tables XCI, XCII and XCIII provide comparison data between pressed oxide bodies with multiple chromic acid-cure cycles with and without a final phosphoric acid treatment. Hardness measurements have been made for pressed bodies of chromia, −325 mesh tabular alumina and additionally ball milled tabular alumina. In each case, samples have been prepared and tested after 3, 5, 7, 9 and 11 chromic acid impregnations. After the hardness measurement was made, the part was impregnated with phosphoric acid and slowly cured to 1200° F. and, after cooling to room temperature and slightly polished, was re-measured to see effect on hardness.

As can be seen in the tables, the phosphoric acid treatment has a marked effect towards increasing hardness of the pre-treated part until the pore size, resulting from the chromic acid cure cycles, becomes too small to accept the phosphoric acid, at least in meaningful amounts.

Table XCI, using a finely divided pressed chromia body, shows that nine chromic acid treatments followed by a single phosphoric acid treatment will provide as hard a sample as will eleven chromic acid treatments and no phosphoric acid treatment. Also, using the phosphoric acid after eleven chromic acid cycles has no additional effect on the hardness.

Table XCII is a relatively coarse alumina body having a much larger pore structure than that of Table XCI. In this case, the advantage of the phosphoric acid in a larger pore structure body can be seen. Here the phosphoric acid treatment applied to a sample pretreated seven times in chromic acid is harder than for one treated eleven times without the final phosphoric acid impregnation and cure. The phosphoric acid treatment after nine cycles appears to be about optimum in hardness since using the phosphoric after eleven times is not as effective.

Table XCIII shows results more typical of a smaller particle size pressed body.

These tables show the important role played by the interstitial structure, or pore size for both the chromic acid and phosphoric acid treatments.

Additional X-ray diffraction analysis of phosphoric acid treated porous refractory oxide samples usually usually reveals the presence of phosphates of the base material. For example, a porous aluminum oxide body treated with phosphoric acid and suitably cured (600° F. or higher) show the formation of aluminum phosphate ($AlPO_4$) of the orthorhombic form (ASTM card 11–500). Similarly treated titania samples show the presence of $TiP_2O_7$ (ASTM card 3–0300). While phosphoric acid treated porous beryllia bodies showed no cataloged beryllium phosphate, the presence of an unidentifiable X-ray pattern strongly suggests the formation of such a phosphate. In all these cases, the X-ray diffraction patterns also showed the presence of the base oxide material in addition to $Cr_2O_3$ if a chromic acid pre-treatment was employed. In no case was a chromium phosphate identified, probably due to the higher reaction temperature of the chromium oxide with the phosphorous oxide than that of the other oxides involved. For x-ray diffraction studies, the samples were ground into fine powders by means of mullite mortars, mixed with DuPont's Household Duco cement and rolled into thin rods, or fibers, between two microscope slides held .013 inch apart in a special jig. When dry, the rods were mounted into 10 cm diameter single crystal rotation General Electric cameras that have been modified for doing powder studies. The patterns were recorded on Ilford Industrial x-ray Film G with nickel filtered copper radiation produced at 40 KV and 22½ ma. The time of exposure was 1½ hours with a fine focus tube.

TABLE XCI

PRESSED CHROMIA SAMPLES SHOWING EFFECT ON HARDNESS
WITH AND WITHOUT FINAL PHOSPHORIC ACID TREATMENT
SAMPLES PRESSED FROM VERY FINE (MICRON SIZE) $Cr_2O_3$ POWDER

| Sample No. | Base Oxide Material | $H_2CrO_4$ Treatment | $H_3PO_4$ Treatment | Forming Pressure | Rockwell Hardness | Remarks |
|---|---|---|---|---|---|---|
| X-1 | $Cr_2O_3$ | 3x | None | Hand Tamped | 15N-87.8 | |
| X-1-P | $Cr_2O_3$ | 3x | 1x | Hand Tamped | 15N-93.8 | |
| X-2 | $Cr_2O_3$ | 5x | None | Hand Tamped | N.M. | |
| X-2-P | $Cr_2O_3$ | 5x | 1x | Hand Tamped | 15N-94.7 | |
| X-3 | $Cr_2O_3$ | 7x | None | Hand Tamped | 15N-94.5 | |
| X-3-P | $Cr_2O_3$ | 7x | 1x | Hand Tamped | 15N-95.9 | |
| X-4 | $Cr_2O_3$ | 9x | None | Hand Tamped | 15N-95.8 | |
| X-4-P | $Cr_2O_3$ | 9x | 1x | Hand Tamped | 15N-97.0 | |
| X-5 | $Cr_2O_3$ | 11x | None | Hand Tamped | 15N-97.1 | |
| X-5-P | $Cr_2O_3$ | 11x | 1x | Hand Tamped | 15N-97.0 | |

TABLE XCII

PRESSED ALUMINA SAMPLES SHOWING EFFECT ON HARDNESS
WITH AND WITHOUT FINAL PHOSPHORIC ACID TREATMENT
SAMPLES PRESSED FROM −325 MESH ALCOA TABULAR ALUMINA

| Sample No. | Base Oxide Material | $H_2CrO_4$ Treatment | $H_3PO_4$ Treatment | Forming Pressure | Rockwell Hardness | Remarks |
|---|---|---|---|---|---|---|
| X-11 | $Al_2O_3$ (−325 mesh) T-61 | 3x | None | Hand Tamped | 15N-70.2 | |
| X-11-P | $Al_2O_3$ (−325 mesh) T-61 | 3x | 1x | Hand Tamped | 15N-90.7 | |
| X-12 | $Al_2O_3$ (−325 mesh) T-61 | 5x | None | Hand Tamped | 15N-85.1 | |
| X-12-P | $Al_2O_3$ (−325 mesh) T-61 | 5x | 1x | Hand Tamped | 15N-91.5 | |
| X-13 | $Al_2O_3$ (−325 mesh) T-61 | 7x | None | Hand Tamped | 15N-90.9 | |

TABLE XCII-continued

PRESSED ALUMINA SAMPLES SHOWING EFFECT ON HARDNESS
WITH AND WITHOUT FINAL PHOSPHORIC ACID TREATMENT
SAMPLES PRESSED FROM −325 MESH ALCOA TABULAR ALUMINA

| Sample No. | Base Oxide Material | $H_2CrO_4$ Treatment | $H_3PO_4$ Treatment | Forming Pressure | Rockwell Hardness | Remarks |
|---|---|---|---|---|---|---|
| X-13-P | $Al_2O_3$ (−325 mesh) T-61 | 7x | 1x | Hand Tamped | 15N-94.2 | |
| X-14 | $Al_2O_3$ (−325 mesh) T-61 | 9x | None | Hand Tamped | 15N-91.3 | |
| X-14-P | $Al_2O_3$ (−325 mesh) T-61 | 9x | 1x | Hand Tamped | 15N-95.5 | |
| X-15 | $Al_2O_3$ (−325 mesh) T-61 | 11x | None | Hand Tamped | 15N-92.9 | |
| X-15-P | $Al_2O_3$ (−325 mesh) T-61 | 11x | 1X | Hand Tamped | 15N-93.9 | |

TABLE XCIII

PRESSED ALUMINA SAMPLES SHOWING EFFECT ON HARDNESS
WITH AND WITHOUT FINAL PHOSPHORIC ACID TREATMENT
SAMPLES PRESSED FROM ALCOA TABULAR ALUMINA (−325 MESH)
BALL MILLED WET FOR 96 HOURS TO REDUCE TO MICRON SIZE PARTICLES

| Sample No. | Base Oxide Material | $H_2CrO_4$ Treatment | $H_3PO_4$ Treatment | Forming Pressure | Rockwell Hardness | Remarks |
|---|---|---|---|---|---|---|
| X-6 | $Al_2O_3$ T-61 (−325 mesh) | 3x | None | Hand Tamped | 15N-89.1 | |
| X-6-P | $Al_2O_3$ T-61 (−325 mesh) | 3x | 1x | Hand Tamped | 15N-92.8 | |
| X-7 | $Al_2O_3$ T-61 (−325 mesh) | 5x | None | Hand Tamped | N.M. | |
| X-7-P | $Al_2O_3$ T-61 (−325 mesh) | 5x | 1x | Hand Tamped | 15N-93.2 | |
| X-8 | $Al_2O_3$ T-61 (−325 mesh) | 7x | None | Hand Tamped | 15N-92.9 | |
| X-8-P | $Al_2O_3$ T-61 (−325 mesh) | 7x | 1x | Hand Tamped | 15N-94.5 | |
| X-9 | $Al_2O_3$ T-61 (−325 mesh) | 9x | None | Hand Tamped | 15N-92.8 | |
| X-9-P | $Al_2O_3$ T-61 (−325 mesh) | 9x | 1x | Hand Tamped | 15N-93.9 | |
| X-10 | $Al_2O_3$ T-61 (−325 mesh) | 11x | None | Hand Tamped | 15N-93.8 | |
| X-10-P | $Al_2O_3$ T-61 (−325 mesh) | 11x | 1x | Hand Tamped | 15N-94.2 | |

While pressing has been employed for the samples described up to this point, it has been found that other forming methods, such as extruding, slip casting or molding, can also be used with excellent results. In fact, almost any method can be employed that will cause the refractory oxide powder to remain in a relatively closely packed form until the oxide forming compound treatment can be applied and suitably cured.

One suitable method is to simply pack the dry refractory oxide powder into a partially confined container such as a hole drilled part way through a block of metal. Chromic acid can be applied at the exposed surface and, after soaking into the powder, the form can be suitably heated, causing the powder to be bonded together. After one or two such impregnation-cure cycles, the mold can be removed and the part further treated until the desired degree of hardness, consistent with the oxide and pore structure, is achieved.

Another method is to slip cast an oxide-water slurry using a plaster or similar type porous mold. Thin layers of oxide can also be deposited by simply pouring a slurry into a flat container and allowing the water (or other solvent) to evaporate, leaving a relatively dense, closely packed oxide behind. In many such cases, it has been found desirable to add a small percentage of chromic acid, chromium chloride or other such salt to the slurry so that partial bonding of the oxide powder will occur upon initial drying and heating. If this is not done, the initial chromic acid treatment may loosen the dry oxide powder upon immersion. Another method involves the addition of a small percentage of hydrated kaolin to the wet oxide powder. When the oxide-kaolin-water mixture is initially dried and heated to 1000° to 1200°F. (or higher), the kaolin bonds the oxide powder sufficiently to prevent the first concentrated chromic acid impregnation from loosening the packed oxide.

Extruded parts normally will make use of moist refractory oxide(s) with kaolin added. In this case, the kaolin acts as an effective plasticizer to allow easy extrusion from the die in addition to serving as the initial bonding agent to prevent the part from disintegrating in the initial chromic acid impregnation (as described in the preceeding paragraph). Of course, the chromic acid (or chromium salt solution) may be added to the original refractory oxide-kaolin mixture if desired.

Tables XCIV and XCV show hardness test results of still another forming method. This consisted of mixing aluminum oxide or chromium oxide powder with varying percentages of kaolin or bentonite clay. Water was added until a plastic consistency resembling modeling clay was achieved. Samples of this material were formed into a flat disc shaped piece about ½ inch in diameter × ⅜ inch thick using only finger pressure. The parts were subsequently dried in the oven and heated to 1200° F. to set the kaolin-oxide bond. Multiple chromic acid impregnationcure cycles were given these samples, as noted in Table XCIV. While this forming method is similar to that used for making extruded parts, a much more plastic consistency is employed in the hand forming method, utilizing more water and extremely low forming pressures. These samples undoubtedly have a larger pore structure than those formed of the same materials using higher pressures and less moisture as indicated by their slightly slower hardening rate. Nevertheless, hardness after 15 chromic acid impregnations was found to be about the same as would be expected for 13 cycles using other forming methods with the same oxides. These tables show that there is very little difference in hardness rate with number of cure cycles due to the particle size of two grades of kaolin employed. Too little kaolin results in less than optimum hardness as does the use of bentonite clay in most cases.

Table XCV shows hardness results of the molded samples of Table XCIV after 15 chromic acid cycles followed by a single phosphoric acid impregnation and 1200° F. cure. The non-phosphoric treated data is relisted for comparison purposes.

TABLE XCIV

HARDNESS MEASUREMENTS FOR HAND MOLDED SAMPLES USING MULTIPLE CHROMIC ACID IMPREGNATIONS

| Sample No. | Base Oxide | Plasticizer | % | 15-N Rockwell Hardness vs No. Impregnations | | | | | |
|---|---|---|---|---|---|---|---|---|---|
| | | | | 3x | 5x | 7x | 9x | 11x | 13x |
| P-1 | Al$_2$O$_3$, Alcoa A-5 (−325 mesh) | Kaolin, Ajax P | 20% | — | — | 87.9 | 88.5 | 92.9 | 93.5 |
| P-2 | Al$_2$O$_3$, Alcoa A-5 (−325 mesh) | Kaolin, Ajax P | 15% | — | — | 86.2 | 89.3 | 91.3 | 93.6 |
| P-3 | Al$_2$O$_3$, Alcoa A-5 (−325 mesh) | Kaolin, Ajax P | 10% | — | — | 87.7 | 90.5 | 92.1 | 94.1 |
| P-4 | Al$_2$O$_3$, Alcoa A-5 (−325 mesh) | Kaolin, Ajax P | 5% | — | — | 85.6 | 85.0 | 90.2 | 92.9 |
| P-5 | Al$_2$O$_3$, Alcoa A-5 (−325 mesh) | Kaolin, Ajax 70 | 20% | — | — | 85.3 | 85.1 | 91.9 | 93.0 |
| P-6 | Al$_2$O$_3$, Alcoa A-5 (−325 mesh) | Kaolin, Ajax 70 | 15% | — | — | 84.0 | 89.2 | 91.1 | 93.0 |
| P-7 | Al$_2$O$_3$, Alcoa A-5 (−325 mesh) | Kaolin, Ajax 70 | 10% | — | — | 83.9 | 89.6 | 91.7 | 93.8 |
| P-8 | Al$_2$O$_3$, Alcoa A-5 (−325 mesh) | Kaolin, Ajax 70 | 5% | — | — | 80.7 | 63.9 | 92.9 | 91.7 |
| P-9 | Al$_2$O$_3$, Alcoa A-5 (−325 mesh) | Bentonite | 8% | — | — | 71.1 | 81.1 | 89.3 | 90.9 |
| P-10 | Al$_2$O$_3$, Alcoa A-5 (−325 mesh) | Bentonite | 6% | — | — | 73.6 | 88.0 | 89.7 | 92.1 |
| P-11 | Al$_2$O$_3$, Alcoa A-5 (−325 mesh) | Bentonite | 4% | — | — | 74.0 | 71.2 | 89.7 | 93.8 |
| P-12 | Al$_2$O$_3$, Alcoa A-5 (−325 mesh) | Bentonite | 2% | dissolved in H$_2$CrO$_4$ | — | — | — | — | — |
| P-13 | Al$_2$O$_3$, Alcoa T-61 (−325 mesh) | Kaolin, Ajax P | 15% | — | — | 86.0 | 91.7 | 92.8 | 93.5 |
| P-14 | Al$_2$O$_3$, Alcoa T-61 (−325 mesh) | Kaolin, Ajax 70 | 15% | — | — | 88.1 | 91.7 | 92.5 | 93.5 |
| P-15 | Al$_2$O$_3$, Alcoa T-61 (−325 mesh) | Bentonite | 5% | — | 44.7 | 67.3 | 78.8 | 86.1 | 87.8 |
| P-16 | Al$_2$O$_3$, Alcoa A-3 (−325 mesh) | Kaolin, Ajax P | 15% | — | 80.9 | 89.1 | 90.4 | 92.5 | 95.1 |
| P-17 | Al$_2$O$_3$, Alcoa A-3 (−325 mesh) | Kaolin, Ajax 70 | 15% | — | 74.7 | 86.4 | 90.0 | 89.9 | 94.0 |
| P-18 | Al$_2$O$_3$, Alcoa A-3 (−325 mesh) | Bentonite | 5% | — | — | 80.6 | 84.3 | 91.4 | 93.1 |
| P-19 | Al$_2$O$_3$, Alcoa A-5 (−325 mesh) | Kaolin, Ajax P | 15% | — | 79.8 | 86.0 | 89.5 | 90.3 | 92.9 |
| P-20 | Al$_2$O$_3$, Alcoa A-5 (−325 mesh) | Kaolin, Ajax 70 | 15% | — | — | 77.4 | 78.0 | 87.2 | 92.8 |
| P-21 | Al$_2$O$_3$, Alcoa A-5 (−325 mesh) | Bentonite | 5% | — | 65.1 | 74.1 | 81.7 | 90.5 | 90.0 |
| P-28 | Alcoa T-61 (−325 mesh) Ball Milled 48 hours | Kaolin, Ajax P | 15% | — | 82.6 | 84.6 | 88.4 | 91.0 | 93.3 |
| P-29 | Alcoa T-61 (−325 mesh) Ball Milled 48 hours | Kaolin, Ajax P | 5% | — | 78.5 | 77.2 | 88.9 | 93.9 | 94.7 |
| P-30 | Alcoa T-61 (−325 mesh) Ball Milled 48 hours | Kaolin, Ajax 70 | 15% | — | 82.0 | 90.4 | 90.9 | 92.9 | 92.6 |
| P-31 | Alcoa T-61 (−325 mesh) Ball Milled 48 hours | Kaolin, Ajax 70 | 5% | — | 61.0 | 84.9 | 90.0 | 92.8 | 94.4 |
| P-32 | Alcoa T-61 (−325 mesh) Ball Milled 48 hours | Bentonite | 6% | — | 65.3 | 71.0 | 87.0 | 89.4 | 92.2 |
| P-33 | Alcoa T-61 (−325 mesh) Ball Milled 48 hours | Bentonite | 2% | — | — | 77.9 | 87.2 | 92.3 | 93.8 |
| P-34 | Alcoa T-61 (−325 mesh) Ball Milled 96 hours | Kaolin, Ajax P | 15% | — | 73.4 | 85.3 | 86.7 | 92.1 | 93.4 |
| P-35 | Alcoa T-61 (−325 mesh) Ball Milled 96 hours | Kaolin, Ajax P | 5% | — | — | — | — | — | — |
| P-36 | Alcoa T-61 (−325 mesh) Ball Milled 96 hours | Kaolin, Ajax 70 | 5% | — | 63.7 | 83.5 | 85.6 | 76.7 | 76.0 |
| P-37 | Alcoa T-61 (−325 mesh) Ball Milled 96 hours | Kaolin, Ajax 70 | 5% | — | 77.7 | 79.6 | 85.8 | 93.0 | 93.0 |
| P-38 | Alcoa T-61 (−325 mesh) Ball Milled 96 hours | Bentonite | 6% | — | 56.3 | 77.7 | 80.3 | 91.6 | 92.5 |
| P-39 | Alcoa T-61 (−325 mesh) Ball Milled 96 hours | Bentonite | 2% | dissolved in H$_2$CrO$_4$ | — | — | — | — | — |
| P-40 | Cr$_2$O$_3$ | Kaolin, Ajax P | 15% | dissolved in H$_2$CrO$_4$ | — | — | — | — | — |
| P-41 | Cr$_2$O$_3$ | Kaolin, Ajax P | 5% | dissolved in H$_2$CrO$_4$ | — | — | — | — | — |
| P-42 | Cr$_2$O$_3$ | Kaolin, Ajax 70 | 15% | — | 65.7 | 73.2 | 90.1 | 89.9 | 92.9 |
| P-43 | Cr$_2$O$_3$ | Kaolin, Ajax 70 | 5% | dissolved in H$_2$CrO$_4$ | — | — | — | — | — |
| P-44 | Cr$_2$O$_3$ | Bentonite | 6% | dissolved in H$_2$CrO$_4$ | — | — | — | — | — |
| P-45 | Cr$_2$O$_3$ | Bentonite | 2% | dissolved in H$_2$CrO$_4$ | — | — | — | — | — |

TABLE XCV

HARDNESS MEASUREMENT COMPARISONS FOR SAMPLES LISTED IN TABLE XCIV FOR 15 CHROMIC ACID IMPREGNATIONS FOLLOWED BY PHOSPHORIC ACID TREATMENT

| Sample No. | Base Oxide | Plasticizer | % | 15-N Rockwell Hardness Measurement | |
|---|---|---|---|---|---|
| | | | | 15 × H$_2$CrO$_4$ Only | 15 × H$_2$CrO$_4$ + H$_3$PO$_4$ |
| P-1 | Al$_2$O$_3$, Alcoa A-5 (−325 mesh) | Kaolin, Ajax P | 20% | 93.3 | 94.6 |
| P-2 | Al$_2$O$_3$, Alcoa A-5 (−325 mesh) | Kaolin, Ajax | 15% | 94.5 | 95.4 |
| P-3 | Al$_2$O$_3$, Alcoa A-5 (−325 mesh) | Kaolin, Ajax P | 10% | 94.4 | 94.2 |
| P-4 | Al$_2$O$_3$, Alcoa A-5 (−325 mesh) | Kaolin, Ajax P | 5% | 95.3 | 94.3 |
| P-5 | Al$_2$O$_3$, Alcoa A-5 (−325 mesh) | Kaolin, Ajax 70 | 20% | 94.3 | 94.8 |
| P-6 | Al$_2$O$_3$, Alcoa A-5 (−325 mesh) | Kaolin, Ajax 70 | 15% | 93.5 | 94.6 |
| P-7 | Al$_2$O$_3$, Alcoa A-5 (−325 mesh) | Kaolin, Ajax 70 | 10% | 94.5 | 94.3 |
| P-8 | Al$_2$O$_3$, Alcoa A-5 (−325 mesh) | Kaolin, Ajax 70 | 5% | 95.4 | 95.4 |
| P-9 | Al$_2$O$_3$, Alcoa A-14 (−325 mesh) | Bentonite | 8% | 92.8 | 93.5 |
| P-10 | Al$_2$O$_3$, Alcoa A-14 (−325 mesh) | Bentonite | 6% | 94.7 | 95.3 |
| P-11 | Al$_2$O$_3$, Alcoa A-14 (−325 mesh) | Bentonite | 4% | 92.6 | 95.2 |
| P-13 | Al$_2$O$_3$, Alcoa T-61 (−325 mesh) | Kaolin, Ajax P | 15% | 93.5 | 94.3 |
| P-14 | Al$_2$O$_3$, Alcoa T-61 (−325) | Kaolin, Ajax 70 | 15 | 93.7 | 94.0 |
| P-15 | Al$_2$O$_3$, Alcoa T-61 (−325 mesh) | Bentonite | 5% | 90.4 | 92.5 |
| P-16 | Al$_2$O$_3$, Alcoa A-3 (−325 mesh) | Kaolin, Ajax P | 15% | 95.4 | 95.2 |
| P-17 | Al$_2$O$_3$, Alcoa A-3 (−325 mesh) | Kaolin, Ajax 70 | 15% | 94.9 | 94.9 |

TABLE XCV-continued

HARDNESS MEASUREMENT COMPARISONS FOR SAMPLES LISTED IN TABLE XCIV FOR 15 CHROMIC ACID IMPREGNATIONS FOLLOWED BY PHOSPHORIC ACID TREATMENT

| Sample No. | Base Oxide | Plasticizer | % | 15-N Rockwell Hardness Measurement 15 × $H_2CrO_4$ Only | 15 × $H_2CrO_4$ + $H_3PO_4$ |
|---|---|---|---|---|---|
| P-18 | $Al_2O_3$, Alcoa A-3 (−325 mesh) | Bentonite | 5% | 95.2 | 95.6 |
| P-19 | $Al_2O_3$, Alcoa A-5 (−325 mesh) | Kaolin, Ajax P | 15% | 91.9 | 94.6 |
| P-20 | $Al_2O_3$, Alcoa A-5 (−325 mesh) | Kaolin, Ajax 70 | 15% | 94.5 | 94.7 |
| P-21 | $Al_2O_3$, Alcoa A-5 (−325 mesh) | Bentonite | 5% | 91.9 | 92.3 |
| P-28 | Alcoa T-61 (−325 mesh) Ball Milled 48 hours | Kaolin, Ajax P | 15% | 93.2 | 94.0 |
| P-29 | Alcoa T-61 (−325 mesh) Ball Milled 48 hours | Kaolin, Ajax P | 5% | 94.3 | 95.3 |
| P-30 | Alcoa T-61 (−325 mesh) Ball Milled 48 hours | Kaolin, Ajax 70 | 15% | 95.0 | 94.1 |
| P-31 | Alcoa T-61 (−325 mesh) Ball Milled 48 hours | Kaolin, Ajax 70 | 5% | 95.0 | 94.9 |
| P-32 | Alcoa T-61 (−325 mesh) Ball Milled 48 hours | Bentonite | 6% | 92.8 | 91.8 |
| P-33 | Alcoa T-61 (−325 mesh) Ball Milled 48 hours | Bentonite | 2% | 94.3 | 94.3 |
| P-34 | Alcoa T-61 (−325 mesh) Ball Milled 96 hours | Kaolin, Ajax P | 15% | 94.6 | 95.5 |
| P-35 | Alcoa T-61 (−325 mesh) Ball Milled 96 hours | Kaolin, Ajax P | 5% | N.M. | N.M. |
| P-36 | Alcoa T-61 (−325 mesh) Ball Milled 96 hours | Kaolin, Ajax 70 | 15% | 94.6 | 95.3 |
| P-37 | Alcoa T-61 (−325 mesh) Ball Milled 96 hours | Kaolin, Ajax 70 | 5% | 93.3 | 94.9 |
| P-38 | Alcoa T-61 (−325 mesh) Ball Milled 96 hours | Bentonite | 6% | 93.5 | 94.1 |
| P-42 | $Cr_2O_3$ (−325 mesh) | Kaolin, Ajax 70 | 15% | 95.2 | 95.5 |

The chemical process of this invention has also been found to provide advantages when used as a post-treatment for commercially produced fully sintered or fused abrasive items. It has also proven to be of use for the complete manufacture of such items entirely by the low temperature chemical bonding and hardening method of the invention. The materials that have been treated or produced in this manner have included crushed and extruded abrasive grain, tumbling chips, abrasive wheels, bonded hones and related items.

It has been found that a large number of refractory oxide materials can be effectively bonded and hardened by means of multiple impregnations thereof with a metal compound such as a salt or metal acid solution followed by heating of the treated material to a temperature sufficient to convert the metal compound into its refractory oxide form.

One of the most efficient metal acid solutions that has been found for use in this chemical bonding and hardening process is chromic acid. In this case, the maximum curing temperature used is normally about 1200° F. During the heating process, the chromic acid is converted first to a chromium trioxide ($CrO_3$) form, then through a series of intermediate oxides and finally to the stable, refractory chromic oxide ($Cr_2O_3$) form.

The chemical treating process of this invention has been found to be useful for coating various types of commercially available aluminum oxide and silicon carbide abrasive grains. The purpose of the chemical treatment is two fold. First, to harden the abrasive and, secondly, to provide a more adherent coating for subsequent bonding of the abrasive grains together using a resin, or similar organic type, binder.

The basic coating process consists of wetting the grain with chromic acid, preferably concentrated, and curing in an oven to a temperature of about 1200° F. The process may be repeated for the desired number of impregnation-cure cycles depending on the hardness or type of coating desired.

Whether the hardening effect is due primarily to the chemical penetration and bonding within the fissures and pores of the abrasive grain, or whether there is also a case hardening effect due to the coated surface, is not known. Microscopic examination of coated abrasive grains shows a well coated surface in addition to some noticeable penetration, depending on the type of abrasive used. The coating, at least after two or three impregnation-cure cycles, is seen to be very dense at the abrasive particle interface, while the exposed surface is somewhat porous. This graduation in coating density probably accounts for the apparent improvement in resin bonding, since there is now a somewhat porous exposed surface with which to bond rather than a slick surface as normally presented by the untreated abrasive.

The types of abrasive grains that have been successfully treated include friable and semi-friable types of fused and crushed aluminum oxide grain, such as Norton Type 57, 32 or 38 or equivalent Agsco Types 57, C-37, etc.; sintered aluminum oxide granules, such as Norton or Agsco Type 75 or 44; and extruded or pelletized abrasives, such as Agsco Type 76A. In addition, silicon carbide of both the "green" and "black" abrasive grades have been treated with apparently equal success.

While it has been difficult to design quantitative laboratory measurements to show that increased abrasive hardness and resin bond strengths have been achieved, comparative production tests have been made that show both these effects. On such test consisted of making 10 inch diameter resin bonded wheels using No. 46 and No. 36 semi-friable grade aluminum oxide abrasive. These wheels were ⅛ inch thick and were used to trim high chromium alloy castings on a production job. Wheels made of the chemically treated grain not only showed much less wheel wear, but also removed metal, under the same pressure and surface feet per minute conditions, 10 to 20% faster than the same type wheels using untreated grain of the same type. In this test, the chemically treated grain had been processed using 7 concentrated chromic acid immersion-cure cycles. During the manufacture of the wheels, it was noted that additional liquid was required to be added to the resin formulation when using with the treated abrasive, indicative of increased porosity due to the chromic oxide grain coating.

Some typical abrasive coating procedures are shown in Table XCVI. The method listed as CO-1 is the basic chromic acid treatment in which multiple impregnation-cure cycles, using a concentrated acid solution, is employed. The number of treatments used depends on the hardness or amount of coating desired. The remaining coating formulations listed make use of a finely divided refractory oxide and/or kaolin slurry. When this is applied to the abrasive grain and subsequently heated to drive out the moisture, a finely divided, porous oxide coating is deposited on the abrasive grain. This pre-coating step has been designed to provide an improved chromic oxide bond with fewer chromic acid impregnation-heat conversion cycles than would be the case with chromic acid treatments alone.

It will be noted in Table XCVI that methods CO-2, CO-3 and CO-4 employ hydrated kaolin as a constituent of the pre-coating slurry. It has been found that adding a small precentage of kaolin, as low as 5 to 10% of the calcined oxides, will provide a sufficient bond between the oxide particles, after heating to 1000°F. to 1200°F., to allow subsequent impregnation in the concentrated chromic acid solution without disintegration of the oxide coating. While kaolin has been used, other clays such as Kentucky ball clay, bentonite, and the like, may also be employed for this purpose of providing a heat setable pre-coating. Table LXXXIV lists the types of kaolin materials used. The particular types used in this instance are products of the Georgia Kaolin Company with processing facilities at Peachtree, Georgia.

Crushed abrasives, resembling standard fused grain, can be made from a wide variety of porous oxide bodies. These may take the form of crushing and grading chemically hardened, partially sintered refractory oxide material. They may also be made from chemically hardened, pressed or extruded refractory oxide bodies.

Another method has been to use a relatively wet, plastic oxide mixture and to simply flow such a slurry onto flat drying trays. A very wet consistency can be used with this process method if desired. The evaporation of the excess water tends to provide a more closely packed oxide matrix than would be the case if a drier consistency were used. The dried oxide is then crushed.

For the slurry and pressed ways of forming the refractory oxide porous structure, three methods have been found to be highly satisfactory. The first method is to mix a small amount of chromic acid solution with the refractory oxide powder. The chromic acid may be either concentrated or diluted for this purpose, although a diluted solution would normally be used when preparing a slurry to allow rapid evaporation on the drying trays and as dense as possible oxide packing upon drying. Subsequent heating of the oxide-chromic acid mixture will cause sufficient bonding of the powdered material to allow subsequent immersions in the chromic acid solution without disintegration of the porous structure. The second method is to add a small percentage, usually 5 to 30%, of kaolin, Kentucky ball clay, bentonite, and the like, to the powdered refractory oxide and use water as the wetting liquid. Upon heating to a reasonable temperature, usually 1000° F. to 1200° F., depending on the type of clay used, the mixture as in the first method above will become sufficiently bonded or "set" after drying to allow immersion in the subsequent chromic acid solution treatment without disintegration. The third method is to employ a combination of the first and second methods.

TABLE XCVI

TYPICAL ABRASIVE GRAIN TREATMENTS DESIGNED TO INCREASE GRAIN HARDNESS AND IMPROVE RESIN BOND STRENGTH

| Method No. | Step | Coating Formulation | Maximum Cure Temp. | Impregnation-Cure Cycles |
|---|---|---|---|---|
| CO-1 | 1 | $H_2CrO_4$ (concentrated solution) | 1200°F. | multiple |
| CO-2 | 1 | Kaolin (Ajax P) + $H_2O$ mixed as slurry and used to coat abrasive grains | 1200°F. | 1x |
| CO-2 | 2 | $H_2CrO_4$ (concentrated solution) | 1200°F. | multiple |
| CO-3 | 1 | Calcined Kaolin (Glomax LL) 80%, Hydrated Kaolin (Ajax P) 20% + $H_2O$ mixed as a slurry and applied to abrasive grains | 1200°F. | 1x |
| CO-3 | 2 | $H_2CrO_4$ (concentrated solution, | 1200°F. | multiple |
| CO-4 | 1 | $Fe_3O_4$ (Mapico Black Pigment) 50%, Hydrated Kaolin (Ajax P) 50% + $H_2O$ mixed as a slurry and applied to abrasive grains | 1200°F. | 1x |
| CO-4 | 2 | $H_2CrO_4$ (concentrated solution) | 1200°F. | multiple |
| CO-5 | 1 | Calcined Alumina (Alcoa A-3, −325 mesh) 80%, $Fe_3O_4$ (pigment) 20% + diluted $H_2CrO_4$ solution (~10% concentration) to form a slurry | 1200°F. | 1x |
| CO-5 | 2 | $H_2CrO_4$ (concentrated solution) | 1200°F. | multiple |

Crushed, extruded and pressed abrasive grains have all been produced using the chemical bonding and hardening process of this invention. Because of the high degree of hardness required in such material, the chromium type treatment is normally preferred. This consists of treating a porous refractory oxide body with multiple concentrated chromic acid impregnations. Following each impregnation, the treated material is heated to a temperature of about 1000°F. to 1200°F. During this heating cycle, the chromic acid is converted, within the porous body structure, to the green $Cr_2O_3$ form.

Chemically hardened extruded material suitable for crushing into abrasive grain, is made using method two or three. In this case, the kaolin or clay acts as a plasticizer. With most of the refractory oxides tested, at least 10% kaolin or Kentucky ball clay, or at least 2% bentonite was found to be necessary to achieve adequate plasticity for extrusion purposes. Interestingly enough, the presence of these kaolin-clay additives does not appreciably effect the ultimate hardness of the treated material.

While aluminum oxide refractory materials have been used for the majority of the crushed abrasive samples, chromia, tin oxide, titania and other refractory oxides have also been tested and may have some application as specialized abrasives where cost is not of prime importance. The oxides used to form these abrasives are used in finely powdered form, normally being −325 mesh or finer. Among the aluminum oxide materials employed for abrasive purposes, the 99+% $Al_2O_3$ calcined, tabular and fused forms have all been successfully used. In addition, it has been found that a high degree of purity is not necessarily a requirement for a hard material. One oxide form that has been found to be very satisfactory is a fused bauxite, −325 mesh, known as Type DCF in the industry.

Table XCVII lists some partially sintered porous refractory materials that, when chemically hardened, crushed and graded, have been found to make suitable abrasive grain.

Table XCVIII is a similar listing showing formulations using crushed, chemically hardened extruded material. Table XCIX covers chemically hardened pressed material. Table C shows some oxide formulations for use with the wet slurry method. Typical hardness values listed in these tables were made prior to crushing into grain.

Another commercially used form of abrasive material that has been found to lend itself to manufacture by the chemical hardening method is extruded grain. This material usually takes the form of small diameter extruded "pellets" having a length to diameter ratio of about 1:3. Extruded grain diameters currently in use by the grinding wheel industry range from about 3/16 inch diameter to as small as 1/32 inch.

When using the chemical hardening method, the extrusions are made by forcing under pressure, a relatively plastic oxide mixture of modeling clay consistency, through an appropriate die. Some suitable plasticizer, such as kaolin, must be added to the refractory oxide mix to allow suitable flow of the material through the die. In this case, the plasticizer can usually also provide sufficient bonding of the oxide material following the initial curing cycle to allow for subsequent chromic acid impregnation without disintegration. Of course, chromic acid can also be added to the mix prior to extrusion.

Table CI lists a number of experimental formulations that have been found to provide hard extrusions with a minimum of impregnation-cure cycles. Hardness values for the extruded grain made of these formulations are listed. For hardness comparison purposes, several commercially available sintered extruded grain materials were found to have Rockwell hardness values of about 15N-93.

Another type of abrasive material known as tumbling chips has been made using chemically hardened pressed refractory powders. These tumbling abrasives are usually small discs about ½ inch to ⅜ inch diameter by ¼ inch to ⅛ inch in thickness.

TABLE XCVII

CRUSHED ABRASIVE GRAIN MADE FROM CHEMICALLY HARDENED, PARTIALLY SINTERED MATERIAL

| No. | Partially Sintered Porous Refractory Material | % $Al_2O_3$ | Sintering Temp. | Impregnating Solution | Cure Temp. | Rockwell Hardness vs. Impreg. Cycle 5x | 7x | 9x | 11x | 13x |
|---|---|---|---|---|---|---|---|---|---|---|
| | Coors AP-94-I1, Extruded | 94% | 1700° F. | 100% $H_2CrO_4$ | 1200° F. | A-82.4 | A-84.9 | A-85.4 | A-84.8 | A-86.3 |
| | Coors AP-99-I1, Extruded | 99% | 1700° F. | 100% $H_2CrO_4$ | 1200° F. | A-73.5 | A-83.0 | A-84.9 | A-85.8 | A-86.0 |
| | Coors AP-99-L3, Extruded | 99% | 2570° F. | 100% $H_2CrO_4$ | 1200° F. | A-77.5 | A-84.3 | A-84.6 | A-85.6 | A-86.6 |
| | Coors AP-99C-LI, Cast | 99% | 2642° F. | 100% $H_2CrO_4$ | 1200°F. | A-81.8 | A-84.6 | A-87.3 | A-88.0 | A-87.1 |
| | AlSiMag No. 614, Pressed | 96% | >2000° F. | 100% $H_2CrO_4$ | 1200° F. | A-75.5 | A-83.4 | A-84.7 | A-85.3 | A-84.2 |
| | AlSiMag No. 748, Pressed | 99.8% | >2000° F. | 100% $H_2CrO_4$ | 1200° F. | A-86.9 | A-90.7 | A-90.7 | A-90.8 | — |

Note: Hardness Measurements made prior to crushing.

TABLE XCVIII

CRUSHED ABRASIVE GRAIN MADE FROM CHEMICALLY HARDENED REFRACTORY OXIDE EXTRUDED MATERIAL

| No. | Oxide Formulation | Parts by Weight | Moistening Agent | Impregnating Solution | Cure Temp. | 15-N Rockwell vs. No. Impregnation Cycles 5x | 7x | 9x | 11x | 13x |
|---|---|---|---|---|---|---|---|---|---|---|
| 27B | DCF Abrasive<br>$Fe_3O_4$ (pigment grade)<br>Kaolin (Ajax P) | 75.0<br>19.0<br>14.0 | $H_2O$ | 100% $H_2CrO_4$ | 1200°F. | — | — | 92.5 | 93.3 | — |
| 13B | DCF Abrasive<br>$Fe_3O_4$ (pigment grade)<br>Kaolin (Ajax 70) | 25.00<br>3.75<br>6.33 | $H_2O$ | 100% $H_2CrO_4$ | 1200°F. | — | — | 92.4 | 93.9 | — |
| 16A | DCF Abrasive<br>Kaolin (Ajax P) | 25.00<br>5.50 | 10% $H_2CrO_4$ | 100% $H_2CrO_4$ | 1200°F. | — | — | — | — | — |

Note: Hardness measurements made prior to crushing.

TABLE XCIX

CRUSHED ABRASIVE GRAIN MADE FROM CHEMICALLY HARDENED, PRESSED REFRACTORY OXIDE MATERIAL

| No. | Oxide Formulation | Parts by Weight | Moistening Agent | Impregnating Solution | Cure Temp. | 15-N Rockwell vs No. Impregnation Cycles 5x | 7x | 9x | 11x | 13x |
|---|---|---|---|---|---|---|---|---|---|---|
| 167 | DCF Abrasive | 100 | 100% $H_2CrO_4$ | 100% $H_2CrO_4$ | 1200°F. | 87.2 | 92.6 | 93.4 | — | 93.8 |
| 228 | DCF Abrasive<br>Kaolin (Ajax P) | 122.0<br>7.5 | 100% $H_2CrO_4$ | 100% $H_2CrO_4$ | 1200°F. | — | 90.7 | 92.7 | 93.0 | 94.1 |
| 154 | Alumina, Alcoa A-5 (−325 mesh) | 100 | 100% $H_2CrO_4$ | 100% $H_2CrO_4$ | 1200°F. | 79.2 | 89.1 | 94.1 | 94.8 | 94.6 |
| 221 | Kaolin (Glomax JD) | 100 | 100% $H_2CrO_4$ | 100% $H_2CrO_4$ | 1200°F. | 82.6 | 90.6 | 92.8 | 94.2 | 94.1 |

TABLE XCIX-continued

CRUSHED ABRASIVE GRAIN MADE FROM CHEMICALLY HARDENED, PRESSED REFRACTORY OXIDE MATERIAL

| No. | Oxide Formulation | Parts by Weight | Moistening Agent | Impregnating Solution | Cure Temp. | 15-N Rockwell vs No. Impregnation Cycles | | | | |
|---|---|---|---|---|---|---|---|---|---|---|
| | | | | | | 5x | 7x | 9x | 11x | 13x |
| 213 | Kaolin (Glomax LL) | 100 | 100% $H_2CrO_4$ | 100% $H_2CrO_4$ | 1200°F. | — | 90.4 | 92.3 | 93.5 | 94.3 |
| 219 | $Cr_2O_3$ (−325 mesh) | 52.1 | 100% $H_2CrO_4$ | 100% $H_2CrO_4$ | 1200°F. | 89.1 | 93.0 | 95.5 | 96.4 | 96.2 |
| | Kaolin (Glomax HE) | 8.7 | | | | | | | | |
| 225 | $Cr_2O_3$ (−325 mesh) | 52.1 | 100% $H_2CrO_4$ | 100% $H_2CrO_4$ | 1200°F. | 89.5 | 94.0 | 94.4 | 95.7 | 96.2 |
| | $Fe_3O_4$ (pigment grade) | 12.5 | | | | | | | | |

Note: Hardness measurements made prior to crushing.

TABLE C

CRUSHED ABRASIVE GRAIN MADE BY WET SLURRY METHOD USING REFRACTORY OXIDE POWDERS

| No. | Oxide Formulation | Parts by Weight | Moistening Agent | Impregnating Solution | Cure Temp. | 15-N Rockwell vs No. Impregnation Cycles | | | | |
|---|---|---|---|---|---|---|---|---|---|---|
| | | | | | | 4x | 6x | 8x | 10x | 12x |
| 1-N | $Al_2O_3$ −325 mesh (Alcoa A-3) | 10.0 | $H_2O$ (8.6) | 100% $H_2CrO_4$ | 1200°F. | | | | | |
| | Kaolin (Ajax P) | 2.0 | | | | | | | | |
| 2-N | DCF Abrasive | 40.0 | $H_2O$ (42.0) | 100% $H_2CrO_4$ | 1200°F. | | | | | |
| | Kaolin (Ajax P) | 9.6 | | | | | | | | |
| | $Fe_3O_4$ (pigment grade) | 8.0 | | | | | | | | |
| 3-N | DCF Abrasive | 20.0 | $H_2O$ (22.0) | 100% $H_2CrO_4$ | 1200°F. | | | | | |
| | Kaolin (Glomax LL) | 10.0 | | | | | | | | |
| | Kaolin (Ajax P) | 6.0 | | | | | | | | |
| 4-N | DCF Abrasive | 38.0 | 10% $H_2CrO_4$ 13.3 | 100% $H_2CrO_4$ | 1200°F. | | | | | |
| | $Fe_3O_4$ (pigment grade) | 38.1 | | | | | | | | |
| 5-N | Silicic Acid | | 10% $H_2CrO_4$ | 100% $H_2CrO_4$ | 1200°F. | | | | | |
| | $Fe_3O_4$ | 25.0 | | | | | | | | |
| | Kaolin (Ajax P) | 7.5 | | | | | | | | |

Note: Hardness measurement made prior to crushing.

TABLE CI

EXTRUDED GRAIN MADE FROM CHEMICALLY HARDENED REFRACTORY OXIDE FORMULATIONS
(1/16"dia. × approx. 3/16"length grain)

| No. | Oxide Formulation | Parts by Weight | Moistening Agent | Impregnating Solution | Cure Temp. | 15-N Rockwell vs No. Impregnation Cycles | | | | |
|---|---|---|---|---|---|---|---|---|---|---|
| | | | | | | 4x | 6x | 8x | 10x | 11x |
| 1B | DCF Abrasive + Kaolin (Ajax P) | 25.0 / 5.5 | $H_2O$ | 100% $H_2CrO_4$ | 1200°F. | 89.6 | 89.6 | 91.7 | 92.6 | N.M. |
| 2B | DCF Abrasive + Kaolin (Ajax P) | 25.0 / 7.0 | $H_2O$ | 100% $H_2CrO_4$ | 1200°F. | 82.3 | 87.2 | 91.1 | 91.5 | N.M. |
| 4B | DCF Abrasive + Kaolin (Ajax 70) | 25.0 / 7.0 | $H_2O$ | 100% $H_2CrO_4$ | 1200°F. | 79.0 | 88.1 | 90.4 | 91.0 | N.M. |
| 8B | DCF Abrasive + Bentonite | 25.0 / 2.0 | $H_2O$ | 100% $H_2CrO_4$ | 1200°F. | 71.7 | 82.9 | 87.6 | 87.4 | N.M. |
| 10B | DCF Abrasive + $Fe_3O_4$ (pigment grade) + Kaolin (Ajax P) | 25.00 / 1.25 / 5.78 | $H_2O$ | 100% $H_2CrO_4$ | 1200°F. | 78.9 | 87.8 | 91.8 | 92.7 | N.M. |
| 11B | DCF Abrasive + $Fe_3O_4$ (pigment grade) + Kaolin (Ajax P) | 25.00 / 3.75 | $H_2O$ | 100% $H_2CrO_4$ | 1200°F. | 83.1 | 89.7 | 92.2 | 93.5 | N.M. |
| 12B | DCF Abrasive + $Fe_3O_4$ (pigment garde) + Kaolin (Ajax 70) | 25.00 / 1.25 / 5.78 | $H_2O$ | 100% $H_2CrO_4$ | 1200°F. | 85.9 | 89.6 | 91.9 | 93.2 | N.M. |
| 13B | DCF Abrasive + $Fe_3O_4$ (pigment grade) + Kaolin (Ajax 70) | 25.00 / 3.75 / 6.33 | $H_2O$ | 100% $H_2CrO_4$ | 1200°F. | 81.3 | 88.3 | 93.5 | 92.5 | 93.9 |
| 21B | DCF Abrasive + $Fe_3O_4$ (pigment grade) Kaolin (Ajax P) | 25.00 / 0.75 / 3.86 | $H_2O$ | 100% $H_2CrO_4$ | 1200°F. | 79.0 | 88.7 | 90.5 | 93.2 | 93.5 |
| 23B | DCF Abrasive + $Fe_3O_4$ (pigment grade) Kaolin (Ajax P) | 25.00 / 3.75 / 4.30 | $H_2O$ | 100% $H_2CrO_4$ | 1200°F. | 82.8 | 89.2 | 92.8 | 92.6 | 93.5 |
| 24B | DCF Abrasive + $Fe_3O_4$ (pigment grade) + Kaolin (Ajax P) | 25.00 / 6.25 / 6.88 | $H_2O$ | 100% $H_2CrO_4$ | 1200°F. | 82.1 | 88.6 | 90.3 | 92.6 | 92.7 |
| 25B | DCF Abrasive + $Fe_3O_4$ (pigment grade) + Kaolin (Ajax P) | 25.00 / 2.50 / 4.13 | $H_2O$ | 100% $H_2CrO_4$ | 1200°F. | 82.2 | 87.5 | 91.9 | 93.1 | 92.9 |
| 26B | DCF Abrasive + $Fe_3O_4$ (pigment grade) + Kaolin (Ajax P) | 25.00 / 5.00 / 4.50 | $H_2O$ | 100% $H_2CrO_4$ | 1200°F. | 79.6 | 88.5 | 90.7 | 92.8 | 93.4 |
| 27B | DCF Abrasive + $Fe_3O_4$ (pigment grade) Kaolin (Ajax P) | 25.00 / 6.25 / 4.69 | $H_2O$ | 100% $H_2CrO_4$ | 1200°F. | 81.3 | 88.0 | 91.3 | 94.0 | 93.3 |
| 28B | DCF Abrasive + $Fe_3O_4$ (pigment grade) Kaolin (Ajax 70) | 25.00 / 6.25 / 6.88 | $H_2O$ | 100% $H_2CrO_4$ | 1200°F. | 79.6 | 90.6 | 90.4 | 92.8 | 93.5 |
| 29B | DCF Abrasive + | 25.00 | $H_2O$ | 100% $H_2CrO_4$ | 1200°F. | 80.3 | 89.2 | 91.8 | 91.5 | 92.9 |

TABLE CI-continued

EXTRUDED GRAIN MADE FROM
CHEMICALLY HARDENED REFRACTORY OXIDE FORMULATIONS
(1/16"dia. × approx. 3/16"length grain)

| No. | Oxide Formulation | Parts by Weight | Moistening Agent | Impregnating Solution | Cure Temp. | 15-N Rockwell vs No. Impregnation Cycles | | | | |
|---|---|---|---|---|---|---|---|---|---|---|
| | | | | | | 4x | 6x | 8x | 10x | 11x |
| | $Fe_3O_4$ (pigment grade) + | .75 | | $H_2CrO_4$ | | | | | | |
| | Kaolin (Ajax 70) | 3.86 | | | | | | | | |
| 31B | DCF Abrasive + | 25.00 | $H_2O$ | 100% | 1200°F. | 83.2 | 86.9 | 91.1 | 91.4 | 91.5 |
| | $Fe_3O_4$ (pigment grade) + | 3.75 | | $H_2CrO_4$ | | | | | | |
| | Kaolin (Ajax 70) | 4.30 | | | | | | | | |
| 33B | DCF Abrasive + | 25.00 | $H_2O$ | 100% | 1200°F. | 79.1 | 87.4 | 93.3 | 93.0 | 92.7 |
| | $Fe_3O_4$ (pigment grade) + | 6.25 | | $H_2CrO_4$ | | | | | | |
| | Kaolin (Ajax 70) | 4.69 | | | | | | | | |

The chemical impregnation-curing method of this invention can also be applied to most vitrified type abrasive wheels. When treating in this way, the wheels become harder and show a noticeable decrease in wear rate.

The treatment usually employed consists of multiple chromic acid impregnations. The wheel is cured following each impregnation at a temperature between 1000°F. to 1200°F., although lower curing temperatures may be used with longer cure times. Higher temperatures may also be used but are not necessary to achieve the desired conversion to the chromic oxide ($Cr_2O_3$) form.

Another application of the treatment of the invention involves the hardening of partially sintered wheels. In this case, the wheel is processed with the chemical hardening method after only an initial pre-sintering of the wheel. This involves a more moderate firing temperature just sufficient to provide minimal bonding of the abrasive grit to allow handling during the chemical treatment. The required pre-sintering temperature will, of course, depend upon the type of bonding material used by the manufacturer. At least two types of wheels have been chemically treated without handling difficulty after pre-sintering at 1800°F. to 2000°F. Pre-sintered wheels processed in this manner performed at least comparable to fully sintered wheels in laboratory tests, but it has been found that even the presintering steps is not required as the complete bonding method is equally effective.

The processing of abrasive wheels and related items made by bonding the abrasive grit entirely by means of the chemical hardening method involves: moistening the abrasive grain with chromic acid; pressing into a suitable mold; curing at a temperature of approximately 1200°F.; cooling, and, re-impregnating with chromic acid, and recuring for the number of cycles required to achieve the desired bond strength between abrasive particles.

The chromic acid treatment not only coats the abrasive grains with chromic oxide ($Cr_2O_3$) formed during the thermal conversion process, but also forms a very strong bond or bridge between the abrasive grains wherever they are touching or nearly touching each other. This property of forming very strong bonds in small gaps and spaces between refractory oxide materials forms the basis for the chemical bonding and hardening process of this invention.

Figure 11:
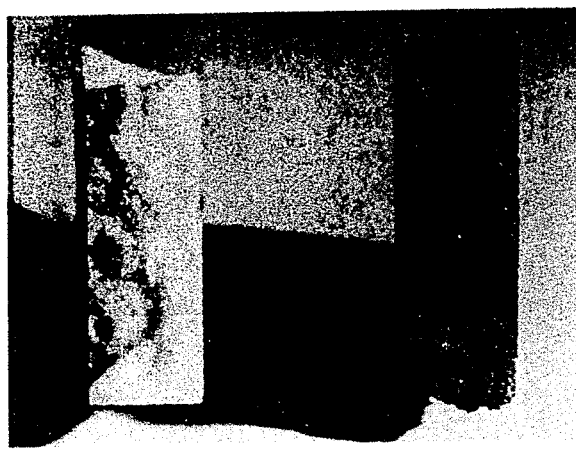
FIG. 11 is a photograph of a commercial sintered grinding wheel side by side with a grinding wheel made by the process of this invention.

Abrasive wheels made by the low temperature chemical bonding process appears to provide superior cutting properties to those made by the more conventional high temperature sintering method. The absence of a glassy matrix and associated fused edges of the abrasive grains may be chiefly responsible for the improved cutting action of the chemically bonded wheels. This is readily seen in FIG. 11 of the drawings, which shows a view of the broken section of two grinding wheels. The wheel on the left is a grinding wheel formed and hardened by the process of this invention, while the light wheel on the right is a commercial sintered wheel. Both wheels are made of No. 46 friable grade aluminum oxide abrasive grain and are ⅜ inch in side-to-side thickness. The abrasive grains in the darker wheel were coated and hardened, then bound using chromic oxide as the treating solution as set forth for sample No. 45 of Table CIII. The glassy matrix and fused edges of the grains are very much in evidence in the commercial sintered wheel. Also, it is believed that increased abrasive grain hardness is achieved, probably due to the chromic oxide coating and/or bonding of grain fractures, pores, and the like, as is found to be the case with the treated abrasive grains in resin bonded wheels.

While abrasive wheels can be made using multiple chromic acid treatments only, as described above, a more practical method has been evolved. This involves mixing a small percentage of kaolin, ball clay, finely divided aluminum oxide or other such powdered refractory oxide material with the abrasive grain. The grain and finely powdered oxide is then moistened with water or a chromic acid solution until a damp plastic mixture is obtained suitable for pressing into a mold. If water is used as the moistening agent, then a hydrated material such as kaolin or ball clay should be used as the binder to provide sufficient plasticity to the mix to not only allow easy removal of the wheel from the mold while still in the damp state, but also to provide sufficient bonding following the first 1000°F. to 1200°F. cure cycle to keep the grains together during subsequent chromic acid impregnations. Another more efficient method in most cases is to use the chromic acid as the moistening agent in place of water alone. The chromic acid will provide a very adequate bond during the initial cure even when a minimum of powdered binder is used. A hydrated clay material is, of course, also not required when the chromic acid is employed as the moistening agent, thereby allowing the use of a wide variety of other types of finely powdered refractory oxide binders.

While the wheel is normally removed from the mold immediately after pressing, it may also be left in the mold and removed at some later point during the cure cycle. For example, it has been found very convenient in some cases to remove the wheel after curing to a temperature of about 350°F. At this temperature, the wheel has become quite dry and stiff, expecially where chromic acid is used as the moistening agent, and removal can be made with little danger of either distortion or breakage. After removing from the mold, the cure is completed by heating to the requisite temperature, i.e. 1000° F. to 1200°F., to assure adequate setting of the binder before proceeding with subsequent chemical impregnation-cure cycles. Pressing of the grain or grain mixture in the mold may be done by such methods as hand or motorized tamping or by using conventional high pressure hydraulic or mechanical pressing techniques. Curing may be accomplished in conventional electric or gas fired ovens. Other types of heating methods, such as dielectric and inductive, may, of course, also be employed after working out suitable time/input power cycles and frequencies.

A large number of abrasive wheels have been made and tested using the chemical bonding and hardening method. These have been made in the form of mounted and unmounted wheels as small as ½ inch in diameter to as large as 7 inches in diameter, the largest size that could be conveniently cured in the available ovens. Abrasive grain used has varied from No. 600 to No. 8 grit size. Both aluminum oxide, friable and semi-friable grades, and silicon carbide, black and green grades, grain has been used in wheels manufactured with this process. The typical impregnation-cure cycle has been found satisfactory for wheels up to at least 7 inches in diameter × ½ inch thick. Smaller wheels can be processed in less time and it is anticipated that very massive wheels will take somewhat longer times.

Table CII lists a number of chemically bonded abrasive wheel formulations that have given excellent results. Wheels made from these formulations have ranged from ½ inch diameter to 7 inches in diameter and ⅛ inch to ½ inch in thickness, respectively. The impregnation-cure cycles were performed as in Table LXXVI.

As will be obvious to those skilled in the abrasive wheel art, a wide range of variation in the wheel formulation may be dictated, depending on the exact type of material to be cut and the quality of the wheel desired. For example, the wheel hardness can be controlled by the chromic acid concentration, number of acid impregantion-cure cycles, type and amount of binder employed, forming pressure, type and size of abrasive grain used, etc. Other considerations may include curing temperature, use of reinforcing materials, and even whether or not "burn-out" type fillers should be added for greater "chip" clearance.

Tables CIII, CIV, CV, CVI, CVII and CVIII show a series of abrasive wheel tests using 3 inches diameter × ⅜ inch thick wheels with a ⅜ inch diameter center hole. These tests were made to determine cutting speed and wear rates for various wheel formulations when cutting hardened steel. The wheel was mounted on a DuMore grinder and run at a constant 6000 rpm for all tests in the series. The sample to be cut (ground) consisted of a 5/16 inch diameter hardened drill rod blank about ¾ inch in length. The hardness of the steel was measured at Rockwell C-65. The drill rod blank was held securely in a special pivoted test fixture so that the blank would be held against the wheel with a constant force during the test. The test rod to wheel loading was adjusted to 2 lbs by means of a movable weight on the pivoted lever arm of the test fixture. In these test runs, the entire cutting edge of the wheel was in contact with the length of the drill rod blank and produced a plunge-cut.

Table CIII shows 2 minute test run comparisons for wheels made with No. 46 grit, friable grade aluminum oxide abrasive using the plunge-cut and hardened drill rod blanks as described above. Table CIV shows 2 minute cutting and wheel wear comparisons run in the same manner except with wheels fabricated with No. 46, semi-friable aluminum oxide grain. Tables CV and CVI show similar plunge-out test runs, except using No. 60 friable and semi-friable alumina grain, respectively.

Tables CVII and CVIII also list cutting and wear tests for 2 minute plunge-cuts with hardened drill rod. Table CVII uses No. 46 grit, black grade silicon carbide abrasive, while the green grade is used in Table CVIII.

Table CIX shows, for comparison purposes, cutting and wear characteristics for three hardness grades of commercially produced sintered abrasive wheels. These were manufactured using the normal high temperature sintering process and are of a high quality type. They are of a friable alumina type, using No. 46 grit. This test was also conducted using the same plunge-cut technique with hardened drill rod blanks as in the preceding tests with chemically bonded wheels. The hardness values listed in the tables correspond to the industry standard where A is very soft, M is medium and Z is extremely hard. While cutting and wear comparisons are hard to make, it appears that wheels made by the chemically bonded method compare favorably to those fabricated using the standard high temperature sintering method.

Additional tests of chemically bonded wheels cured at various temperatures have been made. In general, little difference in cutting properties is noted between wheels cured at 1000°F., 1200°F. and 1400°F. Curing at 1000°F. will require a slightly longer time than at 1400°F. to achieve the same hardness.

Some of the wheels tested above were also used to cut tungsten carbide alloy having a Rockwell hardness of 15N-95.9. Cutting and wear characteristics with this material are given in Table CX for plunge-cut testing using the same method as described earlier for the hardened drill rod tests. Since it was found that this type test tends to overheat the tungsten carbide rod, the method of testing was changed to a cross feed type of cut where one corner of the wheel is doing the major share of the work. In this case, a constant load was not used. Instead, the tungsten carbide was held stationary while the wheel was fed across it, taking a .001 inch cut with each pass of the wheel. The data obtained is shown in Table CXI and shows much less wheel wear than when using the plunge-cut method of Table CX.

All of the previously described grinding tests were conducted dry. Additional testing has been done using a soluble oil and water as the cutting fluid. Little difference could be seen in the cutting and wear characteristics during short duration tests. However, the coolant does, of course, prevent the work from overheating during long duration cutting.

The use of burn-out fillers was mentioned in an earlier paragraph. An example of this is shown in Tables CII and CVI as wheel No. A-34 and wheel No. 63, respectively. Here, the burn-out material was Lytron 810, a material manufactured by Monsanto Chemical Co. This has characteristics similar to those of polystyrene and related products in that it sublimes at a temperature somewhere between 600°F. to 800° F., leaving virtually no residue. The use of such a material may be considered in cases where additional chip clearance is desired for special cutting jobs.

Another consideration of prime importance in abrasive wheel design is the bond strength. This property is usually measured in terms of modulus of rupture. Since there appear to be no well recognized standards in the industry, comparison type tests have been made using ¾ inch × ⅜ inch × 6 inch test bars. Table CXII shows modulus of rupture values obtained for a number of chemically bonded test bar samples, while Table CXIII shows values for commercially produced, high temperature sintered bars of the same dimensions and grain type. The hardness values of these bars have been determined using the A to Z industry scale previously described. While it is very difficult to make comparisons on an absolute basis, it appears from the test data that chemically bonded wheels will show at least comparable strengths to those of standard sintered wheels, providing comparable hardness values, grain type and forming pressures are considered.

It will be appreciated that the low temperatures involved in the bonding process of this invention permit the inclusion of additives to grinding wheels which normally will not withstand the high temperatures necessary in the manufacture of sintered grinding. These additives include glass fibers, diamonds and the like. Glass fibers may be added to the grinding wheel composition before molding. Finely divided diamonds, on the order of 100 mesh, may be mixed with finely divided silicon carbide particles and a binder to form a paste. The paste can be applied as a coating to the cutting surface of a silicon carbide or alumina grinding wheel. The diamond-silicon carbide layer then is hardened and bonded to the grinding wheel by the process of this invention. Repeated impregnations with chromic acid for example and curing at about 1000°F. will produce a highly bonded hardened layer of diamonds embedded in silicon carbide particles. A final treatment with phosphoric acid and cure again at about 1000°F. will provide an increase in the modulus of rupture of the wheel. Care should be exercised to use a curing temperature below that which would destroy the original identity of the additives.

TABLE CII

SOME TYPICAL GRINDING WHEEL FORMULATIONS USING THE CHEMICALLY BONDED METHOD

| No. | Wheel Size | Abrasive Grain | Binder | % | Moistening Agent | Impregnating Solution | Cure Cycles | Cure Temp. | Wheel Hardness |
|---|---|---|---|---|---|---|---|---|---|
| A-2 | ½"×⅜"×⅛" | 220 grit silicon carbide (black) | Alcoa T-61 Alumina Ball Milled 96 Hours | 47.5% | 100% $H_2CrO_4$ | 100% $H_2CrO_4$ | 2x | 1300°F. | Med. |
| A-3 | ½"×⅜"×⅛" | 220 grit silicon carbide (black) | Alcoa T-61 Alumina Ball Milled 96 Hours | 31% | 100% $H_2CrO_4$ | 100% $H_2CrO_4$ | 3x | 1300°F. | Med. |
| A-4 | ½"×⅜"×⅛" | 220 grit silicon carbide (black) | Alcoa T-61 Alumina Ball Milled 96 Hours | 23% | 100% $H_2CrO_4$ | 100% $H_2CrO_4$ | 4x | 1300°F. | Med. |
| A-34 | ½"×⅜"×⅛" | 220 grit silicon carbide (black) plus Lytron 810 as burn-out filler | Alcoa T-61 Alumina Ball Milled 96 Hours | 12.6% | 100% $H_2CrO_4$ | 100% $H_2CrO_4$ | 4x | 1300°F. | Med. |
| EE | ½"×⅜"×⅛" | 220 grit silicon carbide (black) | Kaolin (Ajax P) | 22.4% | 100% $H_2CrO_4$ | 100% $H_2CrO_4$ | 2x | 1300°F. | Med. |
| FF | ½"×⅜"×⅛" | 220 grit silicon carbide (black) | Kaolin (Ajax P) | 12.6% | 100% $H_2CrO_4$ | 100% $H_2CrO_4$ | 3x | 1300°F. | Med.Soft |
| K | ½"×3/16"×⅛" | 80 grit silicon carbide (black) | Alcoa T-61 Alumina Ball Milled 96 Hours | 48.5% | 100% $H_2CrO_4$ | 100% $H_2CrO_4$ | 1x | 1300°F. | Med.Hard |
| J | ½"×3/16"×⅛" | 80 grit silicon carbide (black) | Alcoa T-61 Alumina Ball Milled 96 Hours | 32% | 100% $H_2CrO_4$ | 100% $H_2CrO_4$ | 2x | 1300°F. | Med. |
| I | ½"×3/16"×⅛" | 80 grit silicon carbide (black) | Alcoa T-61 Alumina Ball Milled 96 Hours | 24% | 100% $H_2CrO_4$ | 100% $H_2CrO_4$ | 2x | 1300°F. | Med. |
| U | ½"×3/16"×⅛" | 80 grit Silicon carbide (black) | Amaco Grey Clay No. X-11 | 43% | 100% $H_2CrO_4$ | 100% $H_2CrO_4$ | 3x | 1300°F. | Med. |
| O | ½"×3/16"×⅛" | 36 grit alumina, semi-friable grade | Alcoa T-61 Alumina Ball Milled 96 Hours | 26.3 | 100% $H_2CrO_4$ | 100% $H_2CrO_4$ | 1x | 1300°F. | Med. |
| W | ½"×3/16"×⅛" | 36 grit alumina, semi-friable grade | Alcoa T-61 Alumina Ball Milled 96 Hours | 19.2% | 100% $H_2CrO_4$ | 100% $H_2CrO_4$ | 2x | 1300°F. | Med. |
| A-6 | ½"×3/16"×⅛" | 36 grit alumina, semi-friable grade | Alcoa T-61 Alumina Ball Milled | 15.1% | 100% $H_2CrO_4$ | 100% $H_2CrO_4$ | 3x | 1300°F. | Med. |

TABLE CII-continued

SOME TYPICAL GRINDING WHEEL FORMULATIONS USING THE CHEMICALLY BONDED METHOD

| No. | Wheel Size | Abrasive Grain | Binder | % | Moistening Agent | Impregnating Solution | Cure Cycles | Cure Temp. | Wheel Hardness |
|---|---|---|---|---|---|---|---|---|---|
| N | ½"×3/16"×⅛" | 36 grit alumina, semi-friable grade | 96 Hours None | — | 100% $H_2CrO_4$ | 100% $H_2CrO_4$ | | 1300°F. | Med.Soft |
| A-32 | ½"×3/16"×⅛" | 36 grit alumina, semi-friable grade | Alcoa T-61 | 25.8% | 100% $H_2CrO_4$ | 100% $H_2CrO_4$ | 2x | 1300°F. | Med. |
| A-33 | ½"×3/16"×⅛" | 36 grit alumina, semi-friable grade | Alumina Ball Milled 24 Hours Alcoa T-61 | 26.7% | 100% $H_2CrO_4$ | 100% $H_2CrO_4$ | 3x | 1300°F. | Med. |
| A-15 | ½"×3/16"×⅛" | 36 grit alumina | Alumina (−325 mesh) Kaolin | 10.2% | 100% $H_2CrO_4$ | 100% $H_2CrO_4$ | 3x | 1300°F. | Med. |
| A-13 | ½"×3/16"×⅛" | 36 grit alumina, semi-friable grade | Amaco Grey | 36.3% | 100% $H_2CrO_4$ | 100% $H_2CrO_4$ | 3x | 1300°F. | Med. |
| A-14 | ½"×3/16"×⅛" | 36 grit alumina, semi-friable grade | Clay No. X-11 Amaco Grey | 27.5% | 100% $H_2CrO_4$ | 100% $H_2CrO_4$ | 3x | 1300°F. | Med.Soft |
| A-8 | ½"×3/16"×⅛" | 36 grit alumina, semi-friable grade | Clay No. X-11 36 grit S.F. | 33.3% | 100% $H_2CrO_4$ | 100% $H_2CrO_4$ | 2x | 1300°F. | Med. |
| A-7 | ½"×3/16"×⅛" | 36 grit alumina, Semi-friable grade | Alumina, Ball Milled 24 Hours 36 grit S.F. | 25% | 100% $H_2CrO_4$ | 100% $H_2CrO_4$ | 3x | 1300°F. | Med. |
| A-26 | ½"×3/16"×⅛" | 46 grit alumina, semi-friable grade | Alumina, Ball Milled 24 Hours Kentucky Ball Clay | 11.6% | 100% $H_2CrO_4$ | 100% $H_2CrO_4$ | 4x | 1300°F. | Med. |
| A-22 | ½"×3/16"×⅛" | 46 grit alumina, semi-friable grade | None | — | 100% $H_2CrO_4$ | 100% $H_2CrO_4$ | 4x | 1300°F. | Med. |
| E-1 | ½"×¼"×¼" | 36 grit alumina, semi-friable grade | Alcoa T-61 | 26.3% | 100% $H_2CrO_4$ | 100% $H_2CrO_4$ | 2x | 1200°F. | Med. |
| E-3 | ½"×¼"×¼" | 36 grit alumina, semi-friable grade | Alumina Ball Milled 96 Hours Kaolin | 10.2% | 100% $H_2CrO_4$ | 100% $H_2CrO_4$ | 3x | 1200°F. | Med. |
| E-2 | ½"×¼"×¼" | 36 grit alumina, semi-friable grade | (Ajax P) Alcoa T-61 | 26.3% | 100% $H_2CrO_4$ | 100% $H_2CrO_4$ | 3X | 1200°F. | Med. |
| E-4 | ½"×¼"×¼" | 46 grit alumina, semi-friable grade | Alumina Ball Milled 96 Hours Alcoa T-61 | 27.5% | 100% $H_2CrO_4$ | 100% $H_2CrO_4$ | 2x | 1200°F. | Med. |
| E-5 | ½"×¼"×¼" | 46 grit alumina, semi-friable grade | Alumina Ball Milled 96 Hours Alcoa T-61 | 27.5% | 100% $H_2CrO_4$ | 100% $H_2CrO_4$ | 3x | 1200°F. | Med. |
| E-6 | ½"×¼"×¼" | 46 grit alumina, semi-friable grade | Alumina Ball Milled 96 Hours Kaolin | 10.8% | 100% $H_2CrO_4$ | 100% $H_2CrO_4$ | 3x | 1200°F. | Med. |
| E-7 | ½"×¼"×¼" | 60 grit alumina, semi-friable grade | (Ajax P) Alcoa T-61 | 29.1% | 100% $H_2CrO_4$ | 100% $H_2CrO_4$ | 3x | 1200°F. | Med. |
| E-8 | ½"×¼"×¼" | 60 grit alumina, semi-friable grade | Alumina Ball Milled 96 Hours Kaolin | 11.6% | 100% $H_2CrO_4$ | 100% $H_2CrO_4$ | 3x | 1200°F. | Med. |
| E-9 | ½"×¼"×¼" | 60 grit silicon carbide (black) Semi-friable grade | (Ajax P) Alcoa T-61 | 12.7% | 100% $H_2CrO_4$ | 100% $H_2CrO_4$ | 3x | 1200°F. | Med. |
| E-10 | ½"×¼"×¼" | 60 grit silicon Carbide (black) | Alumina Milled 96 hrs Kaolin | 12.7% | 100% $H_2CrO_4$ | 100% $H_2CrO_4$ | 3x | 12000°F. | Med. |
| 84 | 7"×½"×¼" | 46 grit alumina, friable grade | Kaolin | 9% | 100% $H_2CrO_4$ | 100% $H_2CrO_4$ | 2x | 1200°F. | Med.Soft |
| 85 | 7"×½"×¼" | 46 grit alumina, friable grade | (Ajax P) Kaolin | 9% | 100% $H_2CrO_4$ | 100% $H_2CrO_4$ | 3x | 1200°F. | Med. |
| 86 | 7"×½"×¼" | 46 grit alumina, | (Ajax P) Kaolin | 9% | 10% | 100% $H_2CrO_4$ | 3x | 1200°F. | Med.Hard |

TABLE CII-continued

SOME TYPICAL GRINDING WHEEL FORMULATIONS USING THE CHEMICALLY BONDED METHOD

| No. | Wheel Size | Abrasive Grain | Binder | % | Moistening Agent | Impregnating Solution | Cure Cycles | Cure Temp. | Wheel Hardness |
|-----|-----------|----------------|--------|---|------------------|----------------------|-------------|-----------|----------------|
| 87 | 7"×½"×¼" | friable grade 46 grit alumina, | (Ajax P) Kaolin | 9% | $H_2CrO_4$ 50% $H_2CrO_4$ | 50% $H_2CrO_4$ | 4x | 1200°F. | Med. |
| 88 | 7"×½"×¼" | friable grade 46 grit alumina, | (Ajax P) Kaolin | 6% | 50% $H_2CrO_4$ | 50% $H_2CrO_4$ | 3x | 1200°F. | Med.Soft |
| 89 | 7"×½"×¼" | friable grade 46 grit alumina, | (Ajax P) Kaolin | 10% | 25% $H_2CrO_4$ | 25% $H_2CrO_4$ | 4x | 1200°F. | Med. |

TABLE CIII

CHEMICALLY BONDED ABRASIVE WHEEL TESTS USING TWO MINUTE PLUNGE-CUT METHOD
WHEELS FABRICATED FROM No. 46 GRIT FRIABLE GRADE ALUMINUM OXIDE

TEST CONDITIONS: Wheel Diameter ~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut |
|-----------|--------|---|------------------|----------------------|-------------|-----------|----------------|---------------------|------------|--------------|
| 17 | Alcoa T-61 Alumina Milled 96 hrs. | 27.2% | 100% $H_2CrO_4$ | 100% $H_2CrO_4$ | 1x | 1200°F. | Med.Hard | 2.411" | .000" | .091" |
| 18 | Alcoa T-61 Alumina Milled 96 hrs. | 23% | 100% $H_2CrO_4$ | 100% $H_2CrO_4$ | 1x | 1200°F. | Med. | 2.437" | .000" | .063" |
| 19 | Alcoa T-61 Alumina Milled 96 hrs. | 19.9% | 100% $H_2CrO_4$ | 100% $H_2CrO_4$ | 1x | 1200°F. | Med. | 2.431" | .000" | .067" |
| 82 | Alcoa T-61 Alumina Milled 96 hrs. | 15.7% | 10% $H_2CrO_4$ | 100% $H_2CrO_4$ | 3x | 1200°F. | Med. | 2.475" | .000" | .111" |
| 32 | Alcoa T-61 Alumina Milled 96 hrs. | 13% | 100% $H_2CrO_4$ | 100% $H_2CrO_4$ | 3x | 1200°F. | Med. | 2.375" | .000" | .093" |
| 33 | Alcoa T-61 Alumina Milled 48 hrs. | 19.9% | 100% $H_2CrO_4$ | 100% $H_2CrO_4$ | 1x | 1200°F. | Med.Soft | 2.416" | .000" | .085" |
| 34 | Alcoa T-61 Alumina Milled 24 hrs. | 19.6% | 100% $H_2CrO_4$ | 100% $H_2CrO_4$ | 1x | 1200°F. | Soft | 2.435" | .000" | .082" |
| 64 | Alcoa C-331 hydrated alumina (−325 mesh) | 12.1% | 100% $H_2CrO_4$ | 100% $H_2CrO_4$ | 2x | 1200°F. | Med. | 2.417" | .000" | .069" |
| 38 | $Fe_3O_4$ pigment grade | 11.7% | 100% $H_2CrO_4$ | 100% $H_2CrO_4$ | 4x | 1200°F. | Med. | 2.367" | .000" | .118" |
| 39 | $Fe_3O_4$ + Kentucky Ball Clay | | 100% $H_2CrO_4$ | 100% $H_2CrO_4$ | 3x | 1200°F. | Med. | 2.380" | .000" | .101" |
| 40 | Kentucky Ball Clay | 7.2% | 100% $H_2CrO_4$ | 100% $H_2CrO_4$ | 3x | 1200°F. | Med.Soft | 2.425" | .000" | .083" |
| 42 | Kentucky Ball Clay | 8.8% | 100% $H_2CrO_4$ | 100% $H_2CrO_4$ | 3x | 1200°F. | Med. | 2.426" | .000" | .131" |
| 52 | Kaolin (PAF) | 6.8% | 100% $H_2CrO_4$ | 100% $H_2CrO_4$ | 3x | 1200°F. | Med. | 2.487" | .000" | .071" |
| 50 | Kaolin (PAF) | 6.8% | 100% $H_2CrO_4$ | 100% $H_2CrO_4$ | 4x | 1200°F. | Med.Hard | 2.487" | .000" | .043" |
| 66 | Kaolin (PAF) | 6.8% | 100% $H_2CrO_4$ | 100% $H_2CrO_4$ | 3x | 1000°F. | Med. | 2.448" | .000" | .113" |
| 45 | Kaolin (Ajax P) | 5.6% | 100% $H_2CrO_4$ | 100% $H_2CrO_4$ | 3x | 1200°F. | Med. | 2.438" | .000" | .117" |
| 47 | Kaolin (Ajax P) | 5.6% | 100% $H_2CrO_4$ | 100% $H_2CrO_4$ | 4x | 1200°F. | Med.Hard | 2.481" | .000" | .016" |
| 65 | Kaolin (Ajax P) | 5.6% | 100% $H_2CrO_4$ | 100% $H_2CrO_4$ | 4x | 1000°F. | Med. | 2.416" | .000" | .069" |
| 46 | Kaolin (Ajax 70) | 7% | 100% $H_2CrO_4$ | 100% $H_2CrO_4$ | 3x | 1200°F. | Med. | 2.506" | .000" | .103" |
| 48 | Kaolin (Glomax JD) | 6.3% | 100% $H_2CrO_4$ | 100% $H_2CrO_4$ | 3x | 1200°F. | Med. | 2.467" | .000" | .040" |
| 49 | Kaolin (Glomax HE) | 6.5% | 100% $H_2CrO_4$ | 100% $H_2CrO_4$ | 3x | 1200°F. | Med. | 2.470" | .000" | .051" |

TABLE CIV

CHEMICALLY BONDED ABRASIVE WHEEL TESTS USING TWO MINUTE PLUNGE-CUT METHOD
WHEELS FABRICATED USING NO. 46 GRIT SEMI-FRIABLE ALUMINUM OXIDE GRAIN

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut | Remarks |
|-----------|--------|---|------------------|----------------------|-------------|-----------|----------------|---------------------|------------|--------------|---------|
| 21 | Alcoa T-61 Alumina Milled 96 hrs. | 23.3% | 100% $H_2CrO_4$ | 100% $H_2CrO_4$ | 1x | 1200°F. | Med. Hard | 2.359" | .000" | .076" | |
| 22 | Alcoa T-61 Alumina Milled 96 hrs. | 20.2% | 100% $H_2CrO_4$ | 100% $H_2CrO_4$ | 1x | 1200°F. | Med. | 2.394" | .000" | .071" | |
| 54 | Kaolin (Ajax P) | 5.7% | 100% $H_2CrO_4$ | 100% $H_2CrO_4$ | 3x | 1200°F. | Med. | 2.454" | .000" | .074" | |
| 67 | Kaolin (Ajax P) | 8.8% | 10% $H_2CrO_4$ | 100% $H_2CrO_4$ | 2x | 1200°F. | Med. | 2.416" | .000" | .094" | |

TABLE CIV-continued

CHEMICALLY BONDED ABRASIVE WHEEL TESTS
USING TWO MINUTE PLUNGE-CUT METHOD
WHEELS FABRICATED USING NO. 46 GRIT SEMI-FRIABLE ALUMINUM OXIDE GRAIN

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut | Remarks |
|---|---|---|---|---|---|---|---|---|---|---|---|
| 68 | Kaolin (Ajax P) | 8.1% | 10% $H_2CrO_4$ | 100% $H_2CrO_4$ | 2x | 1200°F. | Med. Hard | 2.442" | .000" | .070" | |
| 69 | Kaolin (Ajax P) | 7.5% | 10% $H_2CrO_4$ | 100% $H_2CrO_4$ | 2x | 1200°F. | Med. | 2.347" | .000" | .123" | Med. |
| 70 | Kaolin (Ajax P) | 6.9% | 10% $H_2CrO_4$ | 100% $H_2CrO_4$ | 2x | 1200°F. | Med. | 2.450" | .000" | .093" | |
| 71 | Kaolin (Ajax P) | 6.5% | 10% $H_2CrO_4$ | 100% $H_2CrO_4$ | 2x | 1200°F. | Med. | 2.467" | .000" | .087" | |
| 72 | Kaolin (Ajax P) | 6.5% | 10% $H_2CrO_4$ | 100% $H_2CrO_4$ | 3x | 1200°F. | Med. Hard | 2.475" | .000" | .089" | |
| 73 | Kaolin (Ajax P) | 6.1% | 10% $H_2CrO_4$ | 100% $H_2CrO_4$ | 3x | 1200°F. | Med. | 2.465" | .000" | .152" | |
| 74 | Kaolin (Ajax P) | 5.7% | 10% $H_2CrO_4$ | 100% $H_2CrO_4$ | 3x | 1200°F. | Med. | 2.485" | .000" | .085" | |
| 75 | Kaolin (Ajax P) | 5.4% | 10% $H_2CrO_4$ | 100% $H_2CrO_4$ | 3x | 1200°F. | Med. Soft | 2.508" | .000" | .135" | |
| 76 | Kaolin (Ajax P) | 5.1% | 10% $H_2CrO_4$ | 100% $H_2CrO_4$ | 3x | 1200°F. | Med. Soft | 2.494" | .000" | .085" | |
| 69A | Kaolin (Ajax P) | 7.5% | 10% $H_2CrO_4$ | 25% $H_2CrO_4$ | 3x | 1200°F. | Med. Soft | 2.391" | .000" | .216" .097" | Two Tests Run |
| 69B | Kaolin (Ajax P) | 7.5% | 10% $H_2CrO_4$ | 50% $H_2CrO_4$ | 3x | 1200°F. | Med. Soft | 2.433" | .000" | .095" | |

TABLE CV

CHEMICALLY BONDED ABRASIVE WHEEL TESTS
USING TWO MINUTE PLUNGE-CUT METHOD
WHEELS FABRICATED USING NO. 60 FRIABLE ALUMINA GRAIN

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut | Remarks |
|---|---|---|---|---|---|---|---|---|---|---|---|
| 77 | Kaolin (Ajax P) | 6.5% | 10% $H_2CrO_4$ | 100% $H_2CrO_4$ | 3x | 1200°F. | Med. Hard | 2.500" | .000" | .198" | |
| 78 | Kaolin (Ajax P) | 6.1% | 10% $H_2CrO_4$ | 100% $H_2CrO_4$ | 3x | 1200°F. | Med. | 2.515" | .000" | .080" .211" | Two Tests Run |
| 79 | Kaolin (Ajax P) | 5.7% | 10% $H_2CrO_4$ | 100% $H_2CrO_4$ | 3x | 1200°F. | Med. | 2.486" | .000" | .071" | |
| 80 | Kaolin (Ajax P) | 5.4% | 10% $H_2CrO_4$ | 100% $H_2CrO_4$ | 3x | 1200°F. | Med. | 2.500" | .000" | .066" | |
| 81 | Kaolin (Ajax P) | 5.1% | 10% $H_2CrO_4$ | 100% $H_2CrO_4$ | 3x | 1200°F. | Med. Soft | 2.498" | .000" | .133" .193" | Two Tests Run |

TABLE CVI

CHEMICALLY BONDED ABRASIVE WHEEL TESTS
USING TWO MINUTE PLUNGE-CUT METHOD
WHEELS FABRICATED USING NO. 60 SEMI-FRIABLE GRADE ALUMINUM OXIDE GRAIN

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut | Remarks |
|---|---|---|---|---|---|---|---|---|---|---|---|
| 60 | Alcoa T-61 Alumina Milled 96 hrs. | 21/4% | 100% $H_2CrO_4$ | 100% $H_2CrO_4$ | 1x | 1200°F. | Med. | 2.453" | .000" | .081" | |
| 58 | Kaolin (Ajax P) | 8% | 100% $H_2CrO_4$ | 100% $H_2CrO_4$ | 2x | 1200°F. | Med. | 2.384" | .000" | .090" | |
| 59 | Kaolin (Ajax P) | 6.1% | 100% $H_2CrO_4$ | 100% $H_2CrO_4$ | 3x | 1200°F. | Med. | 2.420" | .000" | .089" | |
| 63 | Ajax P + Lytron SIO as burn-out filler | 8.7% | 100% $H_2CrO_4$ | 100% $H_2CrO_4$ | 3x | 1200°F. | Med. | 2.331" | .000" | .105" | |
| 83 | Kaolin (Ajax P) | 6.1% | 10% $H_2CrO_4$ | 100% $H_2CrO_4$ | 3x | 1200°F. | Med. | 2.487" | .000" | .188" .125" | Two Tests Run |

TABLE CVII

CHEMICALLY BONDED ABRASIVE WHEEL TESTS
USING TWO MINUTE PLUNGE-CUT METHOD
WITH HARDENED DRILL ROD AND NO. 46 GRIT SILICON CARBIDE (BLACK GRADE) WHEELS

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut |
|---|---|---|---|---|---|---|---|---|---|---|
| 26 | Alcoa T-61 Alumina Milled 96 hrs. | 31.1% | 100% $H_2CrO_4$ | 100% $H_2CrO_4$ | 2x | 1200°F. | Med. | 2.297" | .000" | .045" |
| 27 | Alcoa T-61 Alumina Milled 96 hrs. | 26.6% | 100% $H_2CrO_4$ | 100% $H_2CrO_4$ | 2x | 1200°F. | Med. | 2.358" | .000" | .053" |
| 28 | Alcoa T-61 Alumina Milled 96 hrs. | 23.2% | 100% $H_2CrO_4$ | 100% $H_2CrO_4$ | 2x | 1200°F. | Med. | 2.428" | .000" | .037" |
| 57 | Kaolin (Ajax P) | 6.7% | 100% $H_2CrO_4$ | 100% $H_2CrO_4$ | 3x | 1200°F. | Med. | 2.425" | .000" | .020" |

TABLE CVIII

CHEMICALLY BONDED ABRASIVE WHEEL TESTS
USING TWO MINUTE PLUNGE-CUT METHOD
WITH HARDENED DRILL ROD AND NO. 46 GRIT SILICON CARBIDE (GREEN GRADE) WHEELS

TEST CONDITIONS: Wheel Diameter~2.5", Wheel Width ⅜", Wheel RPM 6000, Blank Hardness Rockwell C-65, Blank Diameter 0.313, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut |
|---|---|---|---|---|---|---|---|---|---|---|
| 56 | Alcoa T-61 Alumina Milled 96 hrs. | 24.5% | 100% $H_2CrO_4$ | 100% $H_2CrO_4$ | 2x | 1200°F. | Med. Hard | 2.416" | .000" | .021" |
| 55 | Kaolin (Ajax P) | 7.2% | 100% $H_2CrO_4$ | 100% $H_2CrO_4$ | 3x | 1200°F. | Med. | 2.422" | .000" | .063" |

TABLE CIX

COMMERCIAL GRINDING WHEEL CUTTING AND WEAR DATA
FOR TWO MINUTE PLUNGE-CUT METHOD
USING 2 LB. WHEEL-TO-WORK FORCE WITH HARDENED DRILL ROD TEST BLANKS

TEST CONDITIONS: Blank hardness Rockwell C-65, Blank Diameter 0.313

| Wheel No. | Type of Wheel | Wheel Hardness | Wheel Speed | Wheel Width | Wheel Diameter | Wheel Wear | Depth of Cut |
|---|---|---|---|---|---|---|---|
| J-1 | No. 46 Friable Aluminum Oxide | J | 6000 rpm | ⅜" | 2.498" | .000" | .104" |
| L-1 | No. 46 Friable Aluminum Oxide | L | 6000 rpm | ⅜" | 2.497" | .000" | .097" |
| R-1 | No. 46 Friable Aluminum Oxide | R | 6000 rpm | ⅜" | 2.497" | .000" | .080" |

TABLE CX

CHEMICALLY BONDED ABRASIVE WHEEL TESTS
USING TWO MINUTE PLUNGE-CUT METHOD AGAINST TUNGSTEN CARBIDE ALLOY BLANKS
WHEELS FABRICATED FROM NO. 46 FRIABLE GRADE ALUMINUM OXIDE GRAIN

TEST CONDITIONS: Wheel Diameter~2.5", Wheel Width ⅜", Wheel RPM 6000, Blank Hardness Rockwell 15N-95.9, Blank Diameter .189, Blank-To-Wheel Pressure 2 lbs.

| Wheel No. | Binder | % | Moistening Agent | Impregnation Solution | Cure Cycles | Cure Temp. | Wheel Hardness | Original Wheel Dia. | Wheel Wear | Depth of Cut |
|---|---|---|---|---|---|---|---|---|---|---|
| 29 | Alcoa T-61 Alumina Milled 96 hrs. | 19.9% | 100% $H_2CrO_4$ | 100% $H_2CrO_4$ | 1x | 1000°F. | Med. | 2.408" | .009" | .006" |
| 31 | Alcoa T-61 Alumina Milled 96 hrs. | 19.9% | 100% $H_2CrO_4$ | 100% $H_2CrO_4$ | 1x | 1200°F. | Med. | 2.411" | .009" | .006" |
| 42 | Kentucky Ball Clay | 8.8% | 100% $H_2CrO_4$ | 100% $H_2CrO_4$ | 3x | 1200°F. | Med. | 2.411" | .006" | .008" |
| 45 | Kaolin (Ajax P) | 5.6% | 100% $H_2CrO_4$ | 100% $H_2CrO_4$ | 3x | 1200°F. | Med. | 2.432" | .010" | .007" |
| 66 | Kaolin (PAF) | 6.8% | 100% $H_2CrO_4$ | 100% $H_2CrO_4$ | 3x | 1000°F. | Med. | 2.425" | .002" | .003" |

TABLE CXI

CHEMICALLY BONDED ABRASIVE WHEEL TESTS USING CROSS FEED METHOD FOR CUTTING TUNGSTEN CARBIDE ALLOY MATERIAL
0.030" OF MATERIAL REMOVED FROM END OF BLANK USING 0.001" FEED ON EACH PASS

Blank Hardness Rockwell 15N-95.9, Blank Diameter 0.188".

| Wheel No. | Abrasive Grain | Binder | % | Moistening Agent | Impregnating Agent | Cure Cycles | Cure Temp. | Original Wheel Dia. | Wheel Wear | T.C. Material Removed |
|---|---|---|---|---|---|---|---|---|---|---|
| 67 | 46 Grit alumina, semi-friable grade | Ajax P | 8.8% | 10% $H_2CrO_4$ | 100% $H_2CrO_4$ | 2x | 1200°F. | 2.326" | .006" | .030" |
| 69 | 46 grit alumina, semi-friable grade | Ajax P | 7.5% | 10% $H_2CrO_4$ | 100% $H_2CrO_4$ | 2x | 1200°F. | 2.278" | .014" | .030" |
| 71 | 46 grit alumina, semi-friable grade | Ajax P | 6.5% | 10% $H_2CrO_4$ | 100% $H_2CrO_4$ | 2x | 1200°F. | 2.340" | .030" | .030" |
| 77 | 60 grit alumina, friable grade | Ajax P | 6.5% | 10% $H_2CrO_4$ | 100% $H_2CrO_4$ | 3x | 1200°F. | 2.475" | .001" | .030" |
| 79 | 60 grit alumina, friable grade | Ajax P | 5.7% | 10% $H_2CrO_4$ | 100% $H_2CrO_4$ | 3x | 1200°F. | 2.472" | .002" | .030" |
| 81 | 60 grit alumina, friable grade | Ajax P | 5.1% | 10% $H_2CrO_4$ | 100% $H_2CrO_4$ | 3x | 1200°F. | 2.485" | .003" | .030" |
| 82 | 46 grit alumina, friable grade | Ajax P | 5.6% | 10% $H_2CrO_4$ | 100% $H_2CrO_4$ | 3x | 1200°F. | 2.450" | .001" | .030" |
| 74 | 46 grit alumina, friable grade | Ajax P | 5.6% | 10% $H_2CrO_4$ | 100% $H_2CrO_4$ | 3x | 1200°F. | 2.466" | .002" | .030" |
| 72 | 46 grit alumina, friable grade | Ajax P | 6.5% | 10% $H_2CrO_4$ | 100% $H_2CrO_4$ | 3x | 1200°F. | 2.463" | .003" | .030" |
| 76 | 46 grit alumina, semi-friable grade | Ajax P | 5.1% | 10% $H_2CrO_4$ | 100% $H_2CrO_4$ | 3x | 1200°F. | 2.481" | .001" | .030" |
| 83 | 46 grit alumina, semi-friable grade | Ajax P | 6.1% | 10% $H_2CrO_4$ | 100% $H_2CrO_4$ | 3x | 1200°F. | 2.475" | .008" | .030" |
| 79 | 60 grit alumina, semi-friable grade | Ajax P | 5.7% | 10% $H_2CrO_4$ | 100% $H_2CrO_4$ | 3x | 1200°F. | 2.472" | .002" | .030" |
| 69A | 60 grit alumina, friable grade | Ajax P | 7.5% | 10% $H_2CrO_4$ | 25% $H_2CrO_4$ | 3x | 1200°F. | 2.308" | .004" | .030" |
| 69B | 46 grit alumina, semi-friable grade | Ajax P | 7.5% | 10% $H_2CrO_4$ | 50% $H_2CrO_4$ | 3x | 1200°F. | 2.425" | .005" | .030" |

TABLE CXII

MODULUS OF RUPTURE VALUES FOR SEVERAL TYPES OF CHEMICALLY BONDED ABRASIVE TEST BARS

| No. | Abrasive | Binder | % | Moistening Agent | Impregnating Solution | Cure Cycles | Cure Temp. | Modulus of Rupture | Remarks |
|---|---|---|---|---|---|---|---|---|---|
| 1-1 | No. 46 grit alumina, friable grade | Alcoa T-61 Alumina Milled 96 hrs. | 19.9% | 100% $H_2CrO_4$ | 100% $H_2CrO_4$ | 2x | 1200°F. | 2390 psi | <"G" Hardness |
| 1-2 | No. 46 grit alumina, friable grade | Alcoa T-61 Alumina Milled 96 hrs. | 19.9% | 100% $H_2CrO_4$ | 100% $H_2CrO_4$ | 2x | 1200°F. | 2240 psi | <"G" Hardness |
| 1-3 | No. 46 grit alumina, friable grade | Alcoa T-61 Alumina Milled 96 hrs. | 19.9% | 100% $H_2CrO_4$ | 100% $H_2CrO_4$ | 2x | 1200°F. | 2410 psi | <"G" Hardness |
| | | | | | Average Value | | | 2347 psi | |
| 41-1 | No. 46 grit alumina, friable grade | Kaolin (Ajax P) | 6% | 100% $H_2CrO_4$ | 100% $H_2CrO_4$ | 2x | 1200°F. | 932 psi | <"G" Hardness |
| 41-2 | No. 46 grit alumina, friable grade | Kaolin (Ajax P) | 6% | 100% $H_2CrO_4$ | 100% $H_2CrO_4$ | 2x | 1200°F. | 1198 psi | <"G" Hardness |
| 41-3 | No. 46 grit alumina, friable grade | Kaolin (Ajax P) | 6% | 100% $H_2CrO_4$ | 100% $H_2CrO_4$ | 2x | 1200°F. | 1145 psi | <"G" Hardness |
| | | | | | Average Value | | | 1092 psi | |
| 42-1 | No. 46 grit alumina, friable grade | Kaolin (Ajax P) | 9% | 100% $H_2CrO_4$ | 100% $H_2CrO_4$ | 2x | 1200°F. | 1598 psi | <"G" Hardness |
| 42-2 | No. 46 grit alumina, friable grade | Kaolin (Ajax P) | 9% | 100% $H_2CrO_4$ | 100% $H_2CrO_4$ | 2x | 1200°F. | 1998 psi | <"G" Hardness |
| 42-3 | No. 46 grit alumina, friable grade | Kaolin (Ajax P) | 9% | 100% $H_2CrO_4$ | 100% $H_2CrO_4$ | 2x | 1200°F. | 1865 psi | <"G" Hardness |
| | | | | | Average Value | | | 1820 psi | |
| 43-1 | No. 46 grit alumina, friable grade | Kaolin (Ajax P) | 12% | 100% $H_2CrO_4$ | 100% $H_2CrO_4$ | 2x | 1200°F. | 3463 psi | ~J Hardness |
| 43-2 | No. 46 grit alumina, friable grade | Kaolin (Ajax P) | 12% | 100% $H_2CrO_4$ | 100% $H_2CrO_4$ | 2x | 1200°F. | 2930 psi | ~J Hardness |
| 43-3 | No. 46 grit alumina, friable grade | Kaolin (Ajax P) | 12% | 100% $H_2CrO_4$ | 100% $H_2CrO_4$ | 2x | 1200°F. | 3063 psi | ~J Hardness |
| | | | | | Average Value | | | 3152 psi | |
| 44-1 | No. grit alumina, friable grade | Kaolin (Ajax P) | 6% | 100% $H_2CrO_4$ | 100% $H_2CrO_4$ | 3x | 1200°F. | 2716 psi | ~"H" Hardness |
| 44-2 | No. 46 grit alumina, friable grade | Kaolin (Ajax P) | 6% | 100% $H_2CrO_4$ | 100% $H_2CrO_4$ | 3x | 1200°F. | 2876 psi | ~"H" Hardness |
| 44-3 | No. 46 grit alumina, friable grade | Kaolin (Ajax P) | 6% | 100% $H_2CrO_4$ | 100% $H_2CrO_4$ | 3x | 1200°F. | 3196 psi | ~"H" Hardness |
| | | | | | Average Value | | | 2929 psi | |
| 45-1 | No. 46 grit alumina, friable grade | Kaolin (Ajax P) | 9% | 100% $H_2CrO_4$ | 100% $H_2CrO_4$ | 3x | 1200°F. | 2397 psi | <"G" Hardness |
| 45-2 | No. 46 grit alumina, friable grade | Kaolin (Ajax P) | 9% | 100% $H_2CrO_4$ | 100% $H_2CrO_4$ | 3x | 1200°F. | 2530 psi | <"G" Hardness |
| 45-3 | No. 46 grit alumina, friable grade | Kaolin (Ajax P) | 9% | 100% $H_2CrO_4$ | 100% $H_2CrO_4$ | 3x | 1200°F. | 2344 psi | <"G" Hardness |

TABLE CXII-continued

MODULUS OF RUPTURE VALUES FOR SEVERAL TYPES OF CHEMICALLY BONDED ABRASIVE TEST BARS

| No. | Abrasive | Binder | % | Moistening Agent | Impregnating Solution | Cure Cycles | Cure Temp. | Modulus of Rupture | Remarks |
|---|---|---|---|---|---|---|---|---|---|
| | | | | | Average Value | | | 2424 psi | |
| 50-1 | No. 46 grit alumina, friable grade | Kaolin (Ajax P) | 9% | 100% $H_2CrO_4$ | 100% $H_2CrO_4$ | 4x | 1200°F. | 3063 psi | —"H" Hardness |
| 50-2 | No. 46 grit alumina, friable grade | Kaolin (Ajax P) | 9% | 100% $H_2CrO_4$ | 100% $H_2CrO_4$ | 4x | 1200°F. | 3063 psi | —"H" Hardness |
| 50-3 | No. 46 grit alumina, friable grade | Kaolin (Ajax P) | 9% | 100% $H_2CrO_4$ | 100% $H_2CrO_4$ | 4x | 1200°F. | 3063 psi | —"H" Hardness |
| | | | | | Average Value | | | 3063 psi | |

TABLE CXIII

MODULUS OF RUPTURE VALUES OBTAINED FROM TWO HARDNESS GRADES OF COMMERCIAL, SINTERED TEST BARS OF APPROXIMATELY THE SAME DIMENSIONS OF THOSE USED IN TABLE CXII

| No. | Abrasive Grain | Binder | % | Moistening Agent | Impregnating Solution | Cure Cycles | Cure Temp. | Modulus of Rupture | Remarks |
|---|---|---|---|---|---|---|---|---|---|
| J-1 | No. 46 grit alumina, friable grade wheel | — | — | — | — | — | — | 3102 psi | J Hardness |
| J-2 | No. 46 grit alumina, friable grade wheel | — | — | — | — | — | — | 3785 psi | J Hardness |
| J-3 | No. 46 grit alumina, friable grade wheel | — | — | — | — | — | — | 3133 psi | J Hardness |
| | | | | | Average Value | | | 3340 psi | |
| L-1 | No. 46 grit alumina, friable grade wheel | — | — | — | — | — | — | 3764 psi | L Hardness |
| L-2 | No. 46 grit alumina, friable grade wheel | — | — | — | — | — | — | 3655 psi | L Hardness |
| L-3 | No. 46 grit alumina, friable grade wheels | — | — | — | — | — | — | 3900 psi | L Hardness |
| | | | | | Average Value | | | 3773 psi | |

It has been found that many of the techniques for chemically hardening and bonding abrasive wheels can also be applied to bonded honing materials. Both the chemical treatment applied to sintered or partially sintered hones and the complete chemically bonded methods, described in the preceding tables, are applicable.

Table CXIV shows test results using various chemical hardening treatments applied to commercially produced hones. These were manufactured for the Sunnen Products Company, St. Louis, Missouri, and the abrasive numbers shown in the table are their standard stock numbers. Testing was done using a Standard Sunnen Honing Machine (Model MB-1600) so that constant hone pressure, mandrel speed and lubrication of the hone and part could be maintained for all samples being compared. The tests of Table CXIV were conducted using non-hardened Carpenter "RDS" tool steel with test pieces honed internally. The steel part has an ID of approximately 0.380 inch and a length of 0.75 inch. The Sunner Type K-12 hones used in this test measured ⅛ inch in width × 1-¾ inch in length and are made of an aluminum oxide grain. Impregnation and curing cycles for the treated hones follow those used in the treating of the powdered base materials previously set forth.

Table CXV shows the same type test as shown in Table CXIV, except that silicon carbide hones and hardened steel test pieces were used instead of the aluminum oxide hones and non-hardened steel.

The test data of Tables CXIV and CXV show that the chemical hardening treatment of the invention has a decided effect towards increasing hone life. Conversely, it can be seen that more steel can be removed for a given amount of hone wear. This, of course, should result in greater honing efficiency, especially where greater hone pressure can be used.

Some hones made entirely by the chemical bonding method are listed in Table CXVI. A wide variation in formulation will also be obvious to those skilled in the art, and will be based on type of material to be honed, hone hardness, desired cutting speed and related properties. The hones listed in Table CXVI show only two of these possible variations.

TABLE CXIV

COMPARATIVE HONING TESTS

Material Hones Carpenter RDS (Not Hardened). ID—0.380", Length 0.75", Hone Size and Type K-12A Sunnen Hones (Aluminum Oxide Grit), Length of Test 3 Minutes, Honee Pressure

| No. | Abrasive | Parts | Binder | Parts | Solution | Cure Cycles | Maximum Temp. | Hone Wear | Material Removed | Remarks |
|---|---|---|---|---|---|---|---|---|---|---|
| B | K-12-61 | — | — | — | — | — | — | .0483" | .0059" | Not Treated—as received from manufacturer |
| C | K-12A-63 | — | — | — | — | — | — | .0368" | .0080" | Not Treated—as received from manufacturer |
| D | K-12A-65 | — | — | — | — | — | — | .0069" | .0071" | Not Treated—as received from manufacturer |
| A | K-12A-59 | — | — | — | — | — | — | .0011" | .0086" | Not Treated—as received from manufacturer |
| F | K-12A-61 | — | — | — | 100% $H_2CrO_4$ | 2x | 1200°F. | .0062" | .0072" | |

TABLE CXIV-continued

COMPARATIVE HONING TESTS

Material Hones Carpenter RDS (Not Hardened), ID~0.380", Length 0.75", Hone Size and Type K-12A Sunnen Hones (Aluminum Oxide Grit), Length of Test 3 Minutes, Honee Pressure

| No. | Abrasive | Parts | Binder | Parts | Solution | Cure Cycles | Maximum Temp. | Hone Wear | Material Removed | Remarks |
|---|---|---|---|---|---|---|---|---|---|---|
| G | K-12A-63 | — | — | — | 100% $H_2CrO_4$ | 2x | 1200°F. | .0052" | .0063" | |
| H | K-12A-65 | — | — | — | 100% $H_2CrO_4$ | 2x | 1200°F. | .0029" | .0063" | |
| E | K-12A-59 | — | — | — | 100% $H_2CrO_4$ | 2x | 1200°F. | .0003" | .0078" | |
| B | K-12A-61 | — | — | — | — | — | — | .0483" | .0059" | Not Treated—as received from manufacturer |
| A-1 | K-12A-61 | — | — | — | 100% $H_2CrO_4$ | 1x | 1200°F. | .0474" | .0105" | Questionable Data |
| B-1 | K-12A-61 | — | — | — | 100% $H_2CrO_4$ | 2x | 1200°F. | .0005" | .0044" | |
| C-1 | K-12A-61 | — | — | — | 100% $H_2CrO_4$ | 3x | 1200°F. | .0002" | .0028" | |
| D-1 | K-12A-61 | — | — | — | 100% $H_2CrO_4$ | 4x | 1200°F. | .0001" | .0038" | |

TABLE CXV

COMPARATIVE HONING TESTS

Material Honed Carpenter RDS (hardened), ID~0.380", Length 0.75", Hone Size and Type K-12J Sunnen Hones (Silicon Carbide Grit), Length of Test 3 Minutes, Hone Pressure

| No. | Abrasive | Parts | Binder | Parts | Solution | Cure Cycles | Maximum Temp. | Hone Wear | Material Removed | Remarks |
|---|---|---|---|---|---|---|---|---|---|---|
| 9 | K-12J-63 | — | — | — | — | — | — | .0674" | .0031" | Not Treated—as received from manufacturer |
| 10 | K-12J-55 | — | — | — | — | — | — | .0609" | .0183" | Not Treated—as received from manufacturer |
| 11 | K-12J-57 | — | — | — | — | — | — | .0176" | .0169" | Not Treated—as received from manufacturer |
| 12 | K-12J-59 | — | — | — | — | — | — | .0005" | .0073" | Not Treated—as received from manufacturer |
| 1 | K-12J-63 | — | — | — | 100% $H_2CrO_4$ | 2x | 1200°F. | .0171" | .0101" | |
| 2 | K-12J-55 | — | — | — | 100% $H_2CrO_4$ | 2x | 1200°F. | .0002" | .006" | |
| 3 | K-12J-57 | — | — | — | 100% $H_2CrO_4$ | 2x | 1200°F. | .0002" | .0045" | |
| 4 | K-12J-59 | — | — | — | 100% $H_2CrO_4$ | 2x | 1200°F. | .0002" | .005" | |
| 9 | K-12J-63 | — | — | — | — | — | — | .0674" | .0031" | Not Treated—as received from manufacturer |
| 5 | K-12J-63 | — | — | — | 100% $H_2CrO_4$ | 1x | 1200°F. | — | — | |
| 1 | K-12J-63 | — | — | — | 100% $H_2CrO_4$ | 2x | 1200°F. | .0171" | .0101" | |
| 6 | K-12J-63 | — | — | — | 100% $H_2CrO_4$ | 3x | 1200°F. | .0093" | .0099" | |
| 7 | K-12J-63 | — | — | — | 100% $H_2CrO_4$ | 5x | 1200°F. | .0001" | .0105" | |
| 8 | K-12J-63 | — | — | — | 100% $H_2CrO_4$ | 7x | 1200°F. | .0000" | .0054" | |

TABLE CXVI

SOME TYPICAL HONES MADE ENTIRELY BY THE CHEMICAL BONDING METHOD

| No. | Hone Size | Abrasive | Binder | % | Moistening Agent | Impregnating Solution | Cure Cycles | Temp. |
|---|---|---|---|---|---|---|---|---|
| H-1 | 0.1"×0.095"×1.75" | 100 grit alumina, friable grade | Kentucky Ball Clay | 10% | 100% $H_2CrO_4$ | 100% $H_2CrO_4$ | 2x | 1200°F. |
| H-7 | 3/3"×⅜"×6" | 100 grit alumina, friable grade | Kentucky Ball Clay | 10% | 100% $H_2CrO_4$ | 100% $H_2CrO_4$ | 2x | 1200°F. |
| H-4 | 0.1"×0.095"×1.75" | 100 grit alumina, friable grade | Alumina, Alcoa T-61 Milled 96 hrs. | 20% | 100% $H_2CrO_4$ | 100% $H_2CrO_4$ | 2x | 1200°F. |
| H-8 | 0.1"×0.095"×1.75" | 100 grit alumina, friable grade | Alumina, Alcoa T-61 Milled 96 hrs. | 20% | 100% $H_2CrO_4$ | 100% $H_2CrO_4$ | 2x | 1200°F. |

The chemical bonding and hardening method of this invention has also been found to provide a means of producing ceramic based coatings for a wide variety of metal and non-metal substrates.

One embodiment in which the chemical hardening and bonding method may be used is as a post treatment for commercially applied flame sprayed, plasma sprayed or detonation type ceramic coatings. Not only can the inherently porous structure of such coatings be filled sufficiently to achieve oxidation protection for the substrate, but also the bond strength and hardness have been found to be considerably increased. Hardness values for plasma sprayed chromia coatings have been increased from 100 gram Knoop readings of less than 1600 prior to treatment to as high as 2900 after the chemical processing.

A second method of using the chemical bonding and hardening method of the invention involves the application of the coating directly to the substrate using a wet application method. In this case, the coating normally consists of a water based slurry composed of one or more refractory oxides in finely divided form. When the water is evaporated, a closely packed, but still porous, oxide coating remains on the substrate surface. This porous coating may then be bonded and hardened using the method of the invention.

The chemical bonding treatment that has been found to be the most suitable for either of the embodiments discussed above involves the use of multiple, chromic acid impregnation-cure cycles. As earlier mentioned, at least two cycles of impregnation and curing are required to provide usuable hardening and bonding. The chromic acid, used as the impregnating solution, is converted to a refractory chromic oxide form during each cure cycle. The conversion to the chromic oxide ($Cr_2O_3$) form can be accomplished at temperatures as low as 850°F., although temperatures of 1000°F. to 1200°F. are more normally used because of the much faster conversion rate at the high temperatures.

In order to prevent the freshly applied but dried coating from disintegrating when immersed in the chromic acid solution, two basic methods have been evolved: (1) A small amount of chromic acid can be added to the wet oxide coating formulation prior to application to the substrate. During the initial drying and curing cycle, the conversion of the acid to the chromic oxide ($Cr_2O_3$) form will provide the necessary initial band for the powdered refractory coating. (2) A suitable initial bond can be achieved by adding a small percentage of hydrated kaolin or similar clay binder material to the wet coating mixture. Again, upon suitable curing, the kaolin will provide a water resistant bond between the oxide particles sufficient to allow subsequent impregnation in the chromic oxide solution. Of course, both of these initial bonding methods may be combined if desired.

A wide number of tests have been made with these coating formulations on a variety of metal substrates. It is indicated that a true chemical bond exists, not only within the refractory oxide coating material itself, but also between the coating and the metal substrate. In the latter case, it is believed that the chemical bond to the metal is, in effect, due to a bond to the metal oxide that forms on the substrate. In most cases, a good oxide layer on the metal will be formed due to the release of oxygen during the initial chromic acid-chromic oxide conversion cycle. For metals, such as titanium, which are difficult to oxidize except at high temperatures, it may be desirable to pre-oxidize the substrate prior to applying the coating, if maximum coating-to-substrate bond strength is desired.

While the above statements have all assumed using a refractory oxide coating on a metal substrate, other useful variations exist. For example, it has been found that powdered metal coatings can be applied with equal success to a variety of substrates using the same chemical bonding techniques as described earlier for purely oxide coatings. Also, coatings of either ceramic or metal have been successfully applied and bonded to ceramic substrates. These examples can be seen to be merely variations of the same basic chemical bonding process.

A coating consisting mainly of a powdered metal will, of course, actually be a metal-ceramic composite because of the chromic oxide bonding material in addition to the oxide(s) formed on the metal powder that make the chromic oxide to metal bond possible. The solely refractory oxide coatings will also usually be ceramic-ceramic mixtures, unless chromic oxide powder is used as the only powder in the coating formulation. It can be seen, therefore, that a tremendously wide range of coating variations exist.

Among the basic coating materials used to date in various combinations have been: aluminum oxide, zirconium oxide, chromium oxide, titanium oxide, beryllium oxide, iron oxides, tin oxide, silicon dioxide, and nickel oxide; powdered metals have included stainless steel, titanium, iron, chromium and copper. Miscellaneous materials have included boron and silicon carbide and a variety of ceramic fibers used as reinforcing for the coatings. Substrates that have been successfully used and to which well adhering coatings have been applied include 400 series stainless steel, 300 series stainless steel, titanium, cold rolled steel, beryllium copper, inconel, beryllium and nickel. Nonmetallic substrates that have been coated to date include glass, aluminum oxide and beryllium oxide.

Still another variation in the process involves the use of multiple chromic acid, conversion-cycles applied directly to a metal surface. Here, the treatment makes a chromic oxide bond with the oxidized metal surface. After several "dipping"-cure cycles, a very thin but extremely hard, dense and tough coating is achieved. The coating is dark green in color, and may range in thickness from a few millionths of an inch to perhaps .001 inch or more, depending on the extent to which the metal surface has been oxidized and/or the number of chromic acid treatments used. Several types of metals have been given protective coatings using this method. Among those that have proven quite successful to date are titanium, 400 series stainless steel, inconel and aluminum.

Commercially available coatings applied by means of the flame spray, plasma spray and so-called detonation methods may be hardened by the method of the invention. As pointed out above, coatings applied by these methods are inherently porous. Not only does the chemical treatment method provide a means of closing up the porous body, it also can be used to significantly increase the coating hardness. In addition, pull tests have invariably shown a definite improvement in coating-to-substrate adhesion.

Figure 12:
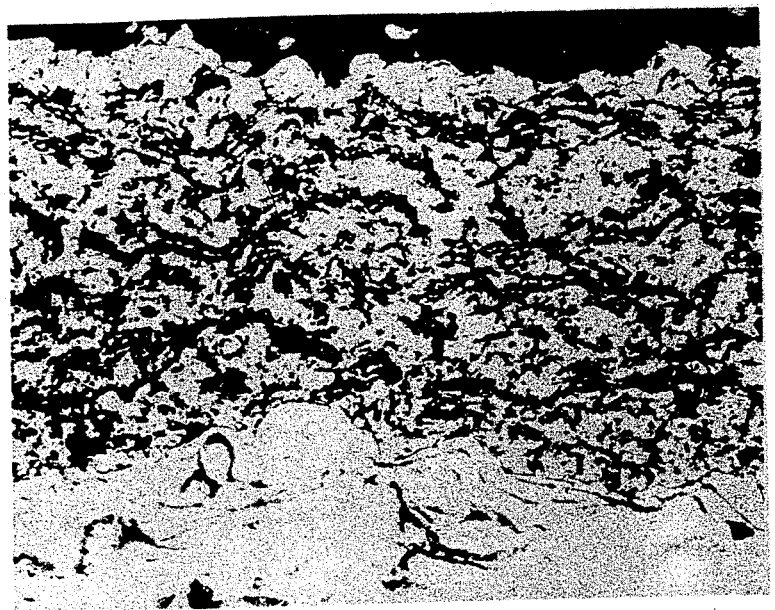
FIG. 12 is a 300X metallographic photograph of a cross section through a commercial plasma sprayed chromia coating prior to treatment according to this invention; and, FIG. 13 is a 300X photograph of the cross section of FIG. 12 after treatment.
Figure 13:
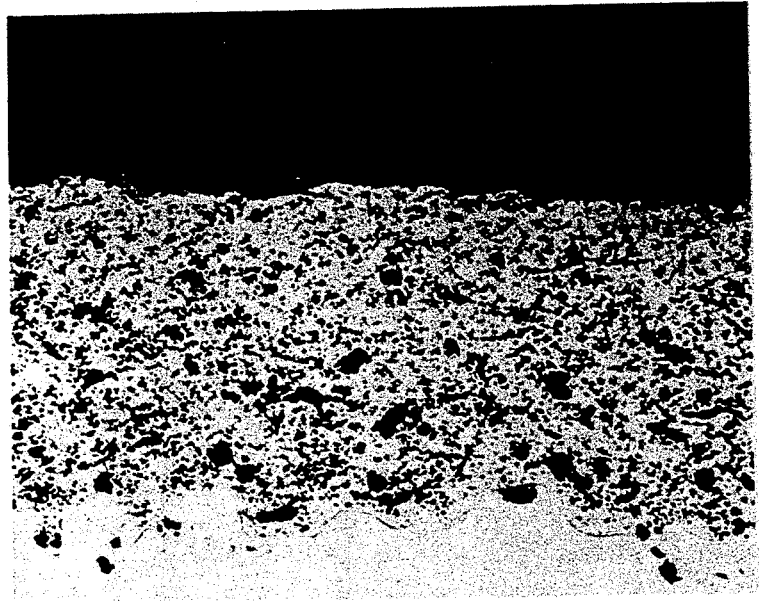

FIGS. 12 and 13 show 300X magnification photographs of both a non-treated and a treated coating, respectively. The photographs were taken as cross sections through the coated sample and show the coating, metal substrate and epoxy used to embed the section in the metallographic sample holder. FIG. 12 shows a plasma sprayed chromic oxide coating on a titanium substrate as received from a reliable vendor with no post-chemical treatment. This photograph is typical of other samples of the same type coating and clearly shows the sizeable extent of the interconnected porous structure. FIG. 13 shows the same type coating after nine impregnation-cure cycles using the chromic acid type treatment with 1200°F. maximum cure temperature. This is a view of sample 4–74 shown in Table CXVII. Note that the interconnected porosity is now virtually eliminated, although a few trapped pores still remain. The hardness of the non-treated sample, shown in the photograph of FIG. 12, averaged 1594 on the 100 gram Knoop scale and 1682 on the 300 gram Vickers scale. After nine chemical treatments, FIG. 13, the hardness had increased to an average reading of 2940 on the 100 gram Knoop scale and 2704 on the 300 gram Vickers scale.

Hardness measurements and the chemical treatment procedure for the example above, along with several others, is shown in Table CXVII. These tests were all made using plasma sprayed chromic oxide coatings on titanium balls. Chromic acid and/or phosphoric acid treatments were employed as indicated. The chromic acid treatment consists in impregnating the coated area with chromic acid and then slowly elevating the temperature until the acid has been converted to the chromic oxide form. Multiple treatments are usually employed to achieve a high degree of hardness. The phosphoric acid treatment, when used, is applied and cured in a similar manner to that used for the chromic acid treatment. X-ray diffraction analysis has shown that the phosphoric acid treatment results in the formation of a phosphate of one or more of the oxides present in the porous coating upon heating to the appropriate curing temperature. The phosphoric acid treatment, unlike the chromic acid method, has been found to be effective only as a final process. Multiple phosphoric treatments not only result in virtually no significant increase in hardness, they also often result in the fracturing of the ceramic structure. Both treatments are normally cured to 1000°F. to 1200°F. Curing temperatures as low as 850°F. can often be used, but will normally require somewhat longer exposure times.

The chromic acid treatment has been found to be most effective when used to harden a structure having relatively small pores. This is probably related to the extremely small ultimate crystal size of the chromic oxide (5.35 A). When used to fill large size pores, many successive treatments may be required before adequate "filling" and associated hardness is achieved. On the other hand, the phosphoric acid impregnation method works most effectively when relatively larger size pores are present. In fact, this treatment will have little or no effect toward increasing the hardness of a ceramic structure if the pores are too small. Since most commercially applied ceramic coatings will be found to contain an interstitial porosity of widely mixed dimension, the use of multiple chromic acid treatments followed by a final phosphoric acid treatment has usually been found to provide optimum coating hardness with the fewest number of total impregnation-cure cycles.

Table CXVIII lists hardness results obtained by providing seven chromic acid impregnation-cure cycles followed by a final phosphoric acid treatment for an 80% chromia, 20% alumina coating applied by the Linde detonation process of Union Carbide Co. Again, hardness was noticeably increased following the chemical treatment process.

Tables CXIX through CXXV, inclusive, show 15N-Rockwell hardness values obtained by applying chemical treatments to both flame and plasma sprayed coatings on steel substrates. The coatings shown in these Tables include chromic oxide, aluminum oxide, zirconium oxide and titanium oxide. In every case, the chemical treatments are seen to substantially increase the coating hardness. Curing temperatures for this particular series was limited to 900°F. for the chromic acid treatment and 1200°F. for curing the phosphoric acid. The coatings were applied using either the Rokide flame spray method of The Norton Company or the Metco plasma spray method of Metallizing Specialties Company as appropriate for the oxide material indicated in the Tables. A standard nickel-aluminide undercoat was applied prior to coating with the ceramic oxide. Coating thickness for these samples was held between 0.010 inch to 0.012 inch by lapping the surface after coating. Samples tested were flat discs ¾ inch in diameter. The same four types of treated ceramic coatings have also been applied to titanium and aluminum substrates. Hardness results were substantially identical to those of Tables CXIX through CXXV.

The marked increase in coating-to-substrate bond strength as a result of the chemical processing is shown in Table CXXVI. Shown are a variety of chromic acid and/or phosphoric acid treatments applied to plasma sprayed chromic oxide coatings on titanium balls. The item listed as 4-X in the Table CXXVI shows average bond strength values for coated balls not chemically treated. Bond strength measurements for the chemically treated samples listed were taken from the same lot. The measurements were made by determining the pull (in pounds force) required to separate a properly contoured metal rod that had been cemented to the coating with an epoxy cement. The contact area between the pull rod and the coated ball was 0.11 square inches. Referring again to Table CXXVI, it is seen that the adhesive-to-coating bond fails in some cases instead of the coating-to-substrate bond. In other cases, some failure is seen to occur in both bonds. When part (or all) of the failure is adhesive, the coating-to-substrate bond strength is impossible to determine except that it will, of course, be equal to or greater than the value at which the adhesive failure occurred.

TABLE CXVII

INCREASE IN HARDNESS VALUES FOR COMMERCIAL PLASMA SPRAYED CHROMIC OXIDE COATINGS DUE TO PROCESSING WITH CHEMICAL HARDENING PROCESS

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 4-X | $Cr_2O_3$ | Titanium | None | — | None | — | 1594* | 1682* | N.M. |
| 4-65 | $Cr_2O_3$ | Titanium | None | — | 1x | 1200°F. | 2050 | 2053 | N.M. |
| 4-66 | $Cr_2O_3$ | Titanium | 3x | 900°F. | 1x | 1200°F. | 2108 | 2142 | N.M. |
| 4-67 | $Cr_2O_3$ | Titanium | 5x | 900°F. | 1x | 1200°F. | 2115 | 2385 | N.M. |
| 4-70 | $Cr_2O_3$ | Titanium | 9x | 900°F. | 1x | 1200°F. | 2280 | 2127 | N.M. |
| 4-72 | $Cr_2O_3$ | Titanium | 9x | 900°F. | None | — | 2200 | 2210 | N.M. |
| 4-74 | $Cr_2O_3$ | Titanium | 9x | 1200°F. | None | — | 2940 | 2704 | N.M. |

*Average values for lot of 100 samples as received from vendor (no chemical treatment). Treated samples list hardness values for average of six readings and were samples taken from same lot as 4-x.

TABLE CXVIII

INCREASE IN HARDNESS VALUE FOR CHROMIA-ALUMINA COATING APPLIED TO TITANIUM SUBSTRATE BY LINDE DETONATION PROCESS FOLLOWED BY CHEMICAL HARDENING AND BONDING TREATMENT

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 3-X | 80% $Cr_2O_3$ 20% $Al_2O_3$ | Titanium | None | — | None | — | 960* | 1090* | N.M. |
| 3-100 | 80% $Cr_2O_3$ | Titanium | 7x | 900°F. | 1x | 1200°F. | 1761 | 1720 | N.M. |

TABLE CXVIII-continued

INCREASE IN HARDNESS VALUE FOR CHROMIA-ALUMINA COATING APPLIED TO TITANIUM SUBSTRATE BY LINDE DETONATION PROCESS FOLLOWED BY CHEMICAL HARDENING AND BONDING TREATMENT

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| | 20% $Al_2O_3$ | | | | | | | | |

*Average readings for coated samples taken from same lot as No. 3-100 prior to chemical treatment.

TABLE CXIX

INCREASE IN HARDNESS FOR COMMERCIAL FLAME SPRAYED CHROMIA COATINGS USING ROKIDE C MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 65-X | $Cr_2O_3$ | Steel | None | — | None | — | N.M. | N.M. | 15N-90.9 |
| 65 | $Cr_2O_3$ | Steel | 3x | 900°F. | None | — | N.M. | N.M. | 15N-94.5 |
| 65-A | $Cr_2O_3$ | Steel | 3x | 900°F. | 1x | 1200°F. | N.M. | N.M. | 15N-94.7 |
| 67 | $Cr_2O_3$ | Steel | 5x | 900°F. | None | — | N.M. | N.M. | N.M. |
| 66 | $Cr_2O_3$ | Steel | 5x | 900°F. | 1x | 1200°F. | N.M. | N.M. | 15N-94.3 |

TABLE CXX

INCREASE IN HARDNESS FOR COMMERCIAL PLASMA SPRAYED CHROMIA COATINGS USING METCO 106NS MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 73-X | $Cr_2O_3$ | Steel | None | — | None | — | N.M. | N.M. | 15N-91.9 |
| 73 | $Cr_2O_3$ | Steel | 3x | 900°F. | None | — | N.M. | N.M. | 15N-95.5 |
| 75 | $Cr_2O_3$ | Steel | 5x | 900°F. | None | — | N.M. | N.M. | 15N-95.1 |
| 73-A | $Cr_2O_3$ | Steel | 5x | 900°F. | 1x | 1200°F. | N.M. | N.M. | 15N-95.9 |

TABLE CXXI

INCREASE IN HARDNESS FOR COMMERCIAL FLAME SPRAYED ALUMINA COATINGS USING ROKIDE A MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 72-X | $Al_2O_3$ | Steel | None | — | None | — | N.M. | N.M. | 15N-86.9 |
| 72 | $Al_2O_3$ | Steel | 3x | 900°F. | None | — | N.M. | N.M. | 15N-92.7 |
| 72-A | $Al_2O_3$ | Steel | 3x | 900°F. | 1x | 1200°F. | N.M. | N.M. | 15N-93.6 |
| 77 | $Al_2O_3$ | Steel | 5x | 900°F. | None | — | N.M. | N.M. | 15N-92.3 |
| 76 | $Al_2O_3$ | Steel | 5x | 900°F. | 1x | 1200°F. | N.M. | N.M. | 15N-92.4 |

TABLE CXXII

INCREASE IN HARDNESS FOR COMMERCIAL PLASMA SPRAYED ALUMINA COATINGS USING METCO 105 MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 61-X | $Al_2O_3$ | Steel | None | — | None | — | N.M. | N.M. | 15N-85.3 |
| 61 | $Al_2O_3$ | Steel | 3x | 900°F. | None | — | N.M. | N.M. | 15N-91.1 |
| 68 | $Al_2O_3$ | Steel | 5x | 900°F. | None | — | N.M. | N.M. | 15N-92.5 |
| 61-A | $Al_2O_3$ | Steel | 5x | 900°F. | 1x | 120°F. | N.M. | N.M. | 15N-95.9 |

TABLE CXXIII

INCREASE IN HARDNESS FOR COMMERCIAL FLAME SPRAYED ZIRCONIA COATINGS USING ROKIDE Z MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 64-X | $ZrO_2$ | Steel | None | — | None | — | N.M. | N.M. | 15N-77.0 |
| 64 | $ZrO_2$ | Steel | 3x | 900°F. | None | — | N.M. | N.M. | 15N-87.8 |
| 64-A | $ZrO_2$ | Steel | 3x | 900°F. | 1x | 1200°F. | N.M. | N.M. | 15N-92.2 |
| 79 | $ZrO_2$ | Steel | 5x | 900°F. | None | — | N.M. | N.M. | 15N-88.3 |
| 69 | $ZrO_2$ | Steel | 5x | 900°F. | 1x | 1200°F. | N.M. | N.M. | 15N-88.3 |

TABLE CXXIV

INCREASE IN HARDNESS FOR COMMERCIAL PLASMA SPRAYED ZIRCONIA COATINGS USING METCO 201B MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 74-X | $ZrO_2$ | Steel | None | — | None | — | N.M. | N.M. | 15N-79.2 |
| 74 | $ZrO_2$ | Steel | 3x | 900°F. | None | — | N.M. | N.M. | 15N-88.5 |
| 80 | $ZrO_2$ | Steel | 5x | 900°F. | None | — | N.M. | N.M. | 15N-88.5 |
| 74-A | $ZrO_2$ | Steel | 5x | 900°F. | 1x | 1200°F. | N.M. | N.M. | 15N-91.9 |

TABLE CXXV

INCREASE IN HARDNESS FOR COMMERCIAL PLASMA SPRAYED TITANIA COATINGS USING METCO 102 MATERIAL

| Sample No. | Ceramic Coating | Metal Substrate | Chromic Acid Impregnations | Cure Temp. | Phos. Acid Impregnations | Cure Temp. | 100 Gram Knoop | 300 Gram Vickers | Rockwell Hardness |
|---|---|---|---|---|---|---|---|---|---|
| 62-X | $TiO_2$ | Steel | None | — | None | — | N.M. | N.M. | 15N-84.4 |
| 62 | $TiO_2$ | Steel | 3x | 900°F. | None | — | N.M. | N.M. | 15N-90.5 |
| 78 | $TiO_2$ | Steel | 5x | 900°F. | None | — | N.M | N.M. | 15N-91.0 |
| 62-A | $TiO_2$ | Steel | 5x | 900°F. | 1x | 1200°F. | N.M. | N.M. | 15N-91.0 |

TABLE CXXVI

BOND STRENGTH MEASUREMENTS FOR PLASMA SPRAYED CHROMIA COATINGS WITH AND WITHOUT CHEMICAL TREATMENTS

| Sample No. | Ceramic Coating | Metal Substrate | Chromic Acid Impregnations | Cure Temp. | Phos. Acid Impregnations | Cure Temp. | Pull Test .11 in² Area | Bond Strength | Type Failure |
|---|---|---|---|---|---|---|---|---|---|
| 4X* | $Cr_2O_3$ | Titanium | None | — | None | — | 240 lbf* | 2182 psi* | 100% coating |
| 4-65 | $Cr_2O_3$ | Titanium | None | — | 1x | 1200°F. | 847 lbf | 7700 psi | 75% adhesive |
| 4-66 | $Cr_2O_3$ | Titanium | 3x | 900°F. | 1x | 1200°F. | 508 lbf | 4618 psi | 75% adhesive |
| 4-67 | $Cr_2O_3$ | Titanium | 5x | 900°F. | 1x | 1200°F. | 830 lbf | 7545 psi | 80% adhesive |
| 4-70 | $Cr_2O_3$ | Titanium | 9x | 900°F. | 1x | 1200°F. | 470 lbf | 4273 psi | 100% adhesive |
| 4-72 | $Cr_2O_3$ | Titanium | 9x | 900°F. | None | — | 984 lbf | 8945 psi | 75% coating |
| 4-74 | $Cr_2O_3$ | Titanium | 9x | 900°F. | None | — | 930 lbf | 8455 psi | 85% adhesive |

*Average coating-to-substrate bond strengths measured from large number of coated samples as received from vendor. Treated samples are from same lot.

The application of ceramic coatings using the wet slurry method is now described. In this method, the coating is initially applied to the substrate in the form of a liquid based mixture of one or more finely divided refractory oxides. When the liquid, normally water, has left the slurry, a closely packed but still porous oxide coating will remain on the surface of the substrate. This porous coating is then bonded and hardened using the same general multiple chromic acid-chromic oxide conversion cycles described earlier. A final phosphoric acid treatment may also be used.

To prevent the freshly applied coating from disintegrating when subsequently impregnated with the initial chromic acid hardening and bonding treatment, two basic techniques have been developed as previously mentioned.

A small amount of chromic acid or chromium trioxide may be added to the slurry prior to application and, on drying the coating, the oxides will be sufficiently bonded to permit subsequent acid immersion or a binder, such as kaolin, may be added to the slurry to provide the necessary bonding action or both may be used.

A wide variety of refractory oxides, in finely divided form, have been found to be suitable for use in these coating formulations. These have included chromic oxide, aluminum oxide, beryllium oxide, silicon dioxide, titanium dioxide, stannic oxide, calcined and hydrated kaolin, zirconium oxide and iron oxides. Several variables must be considered, however, when compounding these formulations. These include oxide particle sizes and shapes, thermal expansion and conductivity characteristics of the oxide coating as compared to those of the substrate, upper temperature range that the coating is to be subjected to, desired coating flexibility characteristics, etc. Also, as pointed out previously, the use of ceramic reinforcement fibers and the like can be considered.

Both the chromic acid multiple treatment method and the final phosphoric acid treatment as described previously have been found useful for hardening and bonding coatings applied by the wet slurry method. The phosphoric acid final hardening treatment is particularly useful for coatings in which larger particles sizes are employed and where some larger pores may be present that might otherwise be difficult to "fill" using the chromic acid method alone.

Table CXXVII shows a series of tests using a variety of aluminum oxide based coating formulations applied to titanium substrates. These samples were titanium discs measuring ½ inch in diameter by 3/16 inch in thickness. The coating was applied to one side only. The Table lists the Mohs scale hardness values obtained as compared to the number of chromic acid impregnation-cure cycles. No phosphoric acid final treatment was used in this particular test series. The Alcoa materials listed in the coating formulation column of Table CXXVII are either calcined or tabular alumina of a −325 mesh grade unless additional ball milling is indicated. When additional ball milling is indicated, it refers to milling in a wet condition. The kaolin listed as "Ajax P" in Table CXXVII is a hydrated form manufactured by the Georgia Kaolin Company.

Table CXXVII also lists coating-to-substrate bond strengths measured for these particular formulation and treatment methods. The bond strengths were measured after 13 chromic acid impregnation-cure cycles using the same pull test previously described in which a metal rod with a contacting surface area of 0.11 square inches is attached to the ceramic coating by means of an epoxy cement. Again, the type of bond failure, coating or adhesive, is listed in terms of approximate percentage failure area. It can be seen that exceedingly high coating bond strengths have been achieved with the majority of these coatings. It should also be pointed out that these samples have been applied to a smooth titanium surface with no special cleaning preparation to remove finger prints or other contamination. The typical coarse sandblasted surface pre-treatment, as used in plasma sprayed and similar type commercial coatings, is not required when using the method of this invention. Here, a true chemical bond is made to the metal surface assuring a high bond strength without relying on mechanical bonding means. This may often be an important practical consideration when physically disturbing the metal substrate may seriously affect its mechanical strength or fatigue properties. A case in point would be a protective coating applied to turbine blades.

Table CXXVII shows a similar type titanium sample with a ceramic slurry applied coating, but lists the increase in Rockwell hardness readings with a number of chromic acid impregnation-cure cycles. The 15N scale was used to prevent breaking through the thin coating.

A variety of coating formulations applied to different metal substrates are listed in Table CXXIX. These coatings have been hardened using the multiple chromic acid treatment method both with and without a final phosphoric acid impregnation-cure cycle. Hardness value, bond strength and micro-crack determinations have been made for the majority of the samples listed in this Table. Micro-crack inspection was accomplished using an ultra-sensitive Zyglo (phosphorescent) method. Table CXXIX also lists a pigment grade $Fe_3O_4$. This is manufactured by Columbia Carbon Company and sold as "Mapico Black". This is a synthetic magnetite having an average composition of 22% FeO and 77% of $Fe_2O_3$. This converts to the red $Fe_2O_3$ form during the first cure cycle. Samples No. 21 and No. 35 of Table CXXIX show the use of reduced ion. This is a very finely divided iron powder and is also converted during the oven curing cycles to the red $Fe_2O_3$ form. The item listed in some of the formulations as $H_2SiO_3$ is a technical grade silicic acid available from Central Scientific Co. of Chicago, Illinois. The maximum curing temperature used for all samples listed in Table CXXIX was 1200°F.

Thermal shock tests have been made to determine the compatibility of various coating formulations to particular substrates. Table CXXX lists a number of the formulation-substrate combinations that have been tested and showed satisfactory results following the severe thermal shock tests to which they were subjected. The test consisted of heating the ceramic coated metal substrate until stabilized at 1200°F. and then quenching in either water at room temperature or liquid nitrogen. While the water quench method certainly provides the most severe thermal shock conditions, the liquid nitrogen subjects the coated part to a much wider temperature excursion. When using the liquid nitrogen treatment, the part under test was allowed to remain in the bath for some time after all bubbling had stopped and the temperature had undoubtedly dropped well below −300°F. After removing from the water or liquid nitrogen, the coated parts were then dried out and checked for micro-cracks, flaking, softening or failure of any other kind.

As a result of many thermal shock tests, it has been found that if a coating will survive the water quench test, it will also invariably pass the liquid nitrogen test. The reverse has not been found to be true and, in fact, the vast majority of coated samples tested easily survived the liquid nitrogen quench test from 1200°F. In addition, it has been found that these chemically bonded coatings have a remarkable degree of flexibility without cracking or otherwise failing. For these reasons, it is felt that coating-substrate combinations that fail during the thermal shock tests do so more because of differences in thermal conductivity properties than because of minor thermal expansion mismatches.

A number of ceramic coated, thin inconel strips have been tested for flexural properties. Coating formulations such as those shown for Samples No. A-1, A-4, A-6, A-8, A-12, A-38, A-40, A-42, A-50 and 6 of Table CXXVII have been tested in this manner without failure. While this type test is extremely simple in nature, it does show that a high degree of flexibility is exhibited by the coating. Even when the strip is bent until cracking and spalling of the coating occurs, there usually is still a layer of ceramic still adhering to the metal surface, attesting to the strong chemical bond to the metal oxide layer.

Although not specifically listed in the coating formulations included in these tests, most of the coating slurries were compounded with the addition of a small amount of an organic wetting agent. The wetting agent or surfacant helps in causing the wet coating mixture to flow more easily and uniformly over the substrate surface. The organic agent will, of course, decompose during the normal curing cycle.

While most all of the examples listed in the Tables following this paragraph show coatings applied to metal substrates, various ceramics, glass and other non-metals have been successfully used with properly matched coating formulations. Here, it is assumed that a bond is made directly to the oxide material of the substrate in the same manner as it is believed the bond is made to the metal oxide layer formed on the metal substrates. Some examples are listed in Table CXXXI.

TABLE CXXVII

INCREASE IN HARDNESS READINGS WITH NUMBER OF CHROMIC ACID IMPREGNATION CURE CYCLES
COATING BOND STRENGTH TO TITANIUM SUBSTRATE IS ALSO GIVEN

| Sample NO. | Coating Formulation | parts (By Wt.) | Impregnating Solution | Cure Temp. | Mohs. Hardness vs No. Cure Cycles | | | | | Bond Strength | Type Failure |
|---|---|---|---|---|---|---|---|---|---|---|---|
| | | | | | 5x | 7x | 9x | 11x | 13x | | |
| A-1 | Alcoa A-14 (−325 mesh) | 5.0 | 100% $H_2CrO_4$ | 1200°F. | 5−6 | 8−9 | 9−10 | 9−10 | 9−10 | 4400 psi | 100% coating |
| | Kaolin - Ajax P | 0.5 | | | | | | | | | |
| | $H_2O$ | 5.5 | | | | | | | | | |

TABLE CXXVII-continued

INCREASE IN HARDNESS READINGS WITH NUMBER OF CHROMIC ACID IMPREGNATION CURE CYCLES COATING BOND STRENGTH TO TITANIUM SUBSTRATE IS ALSO GIVEN

| Sample NO. | Coating Formulation | parts (By Wt.) | Impregnating Solution | Cure Temp. | 5x | Mohs. Hardness vs No. Cure Cycles 7x | 9x | 11x | 13x | Bond Strength | Type Failure |
|---|---|---|---|---|---|---|---|---|---|---|---|
| A-4 | Alcoa A-14 (−325 mesh) Kaolin - Ajax P $H_2O$ | 5.0 0.5 8.25 | 100% $H_2CrO_4$ | 1200°F. | 4–5 | 8–9 | 9–10 | 9–10 | 9–10 | 10400 psi | 100% adhesive |
| A-6 | Alcoa A-14 (−325 mesh) Kaolin - Ajax P $H_2O$ | 5.0 1.0 6.0 | 100% $H_2CrO_4$ | 1200°F. | 5–6 | 8–9 | 9–10 | 9–10 | 9–10 | 10350 psi | 100% adhesive |
| A-8 | Alcoa A-14 (−325 mesh) Kaolin - Ajax P $H_2O$ | 5.0 1.0 9.0 | 100% $H_2CrO_4$ | 1200°F. | 4–5 | 8–9 | 9–10 | 9–10 | 9–10 | 7280 psi | 100% adhesive |
| A-12 | Alcoa A-14 (−325 mesh) Koalin - Ajax P $H_2O$ | 5.0 1.5 9.75 | 100% $H_2CrO_4$ | 1200°F. | 4–5 | 8–9 | 9–10 | 9–10 | 9–10 | N.M. | — |
| A-38 | Alcoa T-61 (−325 mesh) Kaolin - Ajax P $H_2O$ | 5.00 0.50 5.50 | 100% $H_2CrO_4$ | 1200°F. | 4–5 | 8–9 | 9–10 | 9–10 | 9–10 | 7870 psi | 100% adhesive |
| A-40 | Alcoa T-61 (−325 mesh) Koalin - Ajax P $H_2O$ | 5.00 0.50 8.25 | 100% $H_2CrO_4$ | 1200°F. | 4–5 | 8–9 | 9–10 | 9–10 | 9–10 | ≥ 7280 psi | 100% adhesive |
| A-42 | Alcoa T-61 (−325 mesh) Kaolin - Ajax P $H_2O$ | 5.00 1.00 6.00 | 100% $H_2CrO_4$ | 1200°F. | 4–5 | 8–9 | 9–10 | 9–10 | 9–10 | 4670 psi | 100% coating |
| A-44 | Alcoa T-61 (−325 mesh) Kaolin - Ajax P $H_2O$ | 5.00 1.00 9.00 | 100% $H_2CrO_4$ | 1200°F. | 4–5 | 8–9 | 9–10 | 9–10 | 9–10 | 4350 psi | 100% coating |
| A-46 | Alcoa T-61 (−325 mesh) Kaolin - Ajax P $H_2O$ | 5.00 1.50 6.50 | 100% $H_2CrO_4$ | 1200°F. | 4–5 | 8–9 | 9–10 | 9–10 | 9–10 | ≥9420 psi | 100% adhesive |
| A-48 | Alcoa T-61 (−325 mesh) Kaolin - Ajax P $H_2O$ | 5.00 1.50 9.75 | 100% $H_2CrO_4$ | 1200°F. | 4–5 | 8–9 | 9–10 | 9–10 | 9–10 | 9100 psi | 100% adhesive |
| A-50 | Alcoa T-61 (Milled 48 Hours) Kaolin - Ajax P $H_2O$ | 5.00 0.50 5.50 | 100% $H_2CrO_4$ | 1200°F. | 4–5 | 8–9 | 9–10 | 9–10 | 9–10 | 8830 psi | 100% adhesive |
| A-52 | Alcoa T-61 (Milled 48 Hours) Kaolin - Ajax P $H_2O$ | 5.00 0.50 8.25 | 100% $H_2CrO_4$ | 1200°F. | 4–5 | 8–9 | 9–10 | 9–10 | 9–10 | 6180 psi | 100% adhesive |
| A-55 | Alcoa T-61 (Milled 48 Hours) Kaolin - Ajax P $H_2O$ | 5.00 1.00 6.00 | 100% $H_2CrO_4$ | 1200°F. | 4–5 | 8–9 | 9–10 | 9–10 | 9–10 | 8180 psi | 100% adhesive |
| 6 | Meller $Al_2O_3$ (1–30 μ) Kaolin - Ajax P $H_2O$ | 5.00 0.50 5.50 | 100% $H_2CrO_4$ | 1200°F. | 5–6 | 8–9 | 9–10 | 9–10 | 9–10 | 8820 psi | 100% adhesive |

TABLE CXXVIII

INCREASE IN ROCKWELL HARDNESS VALUES WITH INCREASING NUMBER OF CHROMIC ACID IMPREGNATION-1200°F. CURE CYCLES FOR ALUMINA TYPE COATING

Sample No. 5
½ inch diameter titanium substrate (3/16 inch thick disc)
Coating Thickness: ~.020 inch
Coating Formulation:
  (a) Alcoa T-61 (−325 mesh) Ball Milled 48 hours — 10.0 (parts by weight)
  (b) 100% Chromic Acid — 0.1
  (c) $H_2O$ — 7.5
Impregnation Solution: 100% $H_2CrO_4$
Maximum Cure Temperature: 1200°F.
Rockwell Hardness vs No. Impregnation-Cure Cycles:
  5x = 15N-83.9
  7x = 15N-91.4
  9x = 15N-92.9
  11x = 15N-94.4
  13x = 15N-94.8

TABLE CXXIX

HARDNESS, BOND STRENGTH AND MICRO-CRACK TESTING FOR DIFFERENT CHEMICALLY TREATED CERAMIC COATINGS APPLIED TO A VARIETY OF METAL SUBSTRATES

| Sample No. | Metal Substrate | Coating Formulation | Parts (By Wt.) | $H_2CrO_4$ Impreg. | Final $H_3PO_4$ Impreg. | Hardness | Cracks (zyglo) | Coating Thickness | Bond Strength | Type Failure |
|---|---|---|---|---|---|---|---|---|---|---|
| A-40 | Titanium (½″ dia.) | Alcoa T-61 (−325 mesh) Kaolin - Ajax P $H_2O$ | 5.0 0.5 5.5 | 13x | None | 9–10 Mohs 1870–300g Vickers | None | ~.010″ | 7380 psi | 100% adhesive |

TABLE CXXIX-continued

HARDNESS, BOND STRENGTH AND MICRO-CRACK TESTING FOR DIFFERENT CHEMICALLY TREATED CERAMIC COATINGS APPLIED TO A VARIETY OF METAL SUBSTRATES

| Sample No. | Metal Substrate | Coating Formulation | Parts (By Wt.) | $H_2CrO_4$ Impreg. | Final $H_3PO_4$ Impreg. | Hardness | Cracks (zyglo) | Coating Thickness | Bond Strength | Type Failure |
|---|---|---|---|---|---|---|---|---|---|---|
| 5 | Titanium (½″ dia.) | Alcoa T-61 (Ball Milled 48 hrs.) 100% $H_2CrO_4$ $H_2O$ | 10.0 0.1 7.5 | 13x | None | 9–10 Mohs 2150–300g Vickers - 2023–100g Knoop | None | .0085″ | 2411 psi | 100% coating |
| 12 | Titanium (½″ dia.) | Alcoa T-61 (Ball Milled 96 hrs.) Koalin - Ajax P 100% $H_2CrO_4$ $H_2O$ | 9.7 0.3 0.1 5.0 | 13x | None | 9–10 Mohs 1670–100g Knoop | None | .0025″ | 2726 psi | 100% coating |
| 13 | Titanium (½″ dia.) | Alcoa T-61 (Ball Milled 96 hrs.) Kaolin - Ajax P 100% $H_2CrO_4$ $H_2O$ | 9.7 0.3 0.1 7.5 | 13x | None | 9–10 Mohs | None | .002″ | 7136 psi | 100% adhesive |
| 440C-1 | 440C Stainless Steel (2″ dia.) | $H_2SiO_3$ $Fe_3O_4$ (pigment grade) Kaolin - Ajax P $H_2O$ | 5.0 1.0 1.5 8.0 | 5x | 1x | 9–10 Mohs 1196–100g Knoop- 1219–300g Vickers | None | .006″ | 5100 psi | 100% coating |
| 416-1 | 416 Stainless (1″ dia.) | $Cr_2O_3$ $Fe_3O_4$ $H_2SiO_3$ Kaolin - Ajax P $H_2O$ | 1.6 1.7 1.7 1.0 10.2 | 5x | 1x | 9–10 Mohs 927–100g Knoop- 890–100g Knoop | None | .004″ | 4900 psi | 60% coating 40% adhesive |
| 416-2 | 416 Stainless (1″ dia.) | $H_2SiO_3$ Kaolin - Ajax P $H_2O$ | 5.0 1.2 | 5x | 1x | 9–10 Mohs 769–100g Knoop- 777–300g Vickers | None | .013″ | 5560 psi | 10% coating 90% adhesive |
| 416-3 | 416 Stainless (1″ dia.) | Alcoa A-5 (−325 mesh) $H_2SiO_3$ Kaolin - Ajax P $H_2O$ | 5.0 1.0 0.6 | 7x | 1x | 9–10 Mohs 1163–100g Knoop- 1177–300g Vickers | None | .016″ | 5460 psi | 100% adhesive |
| P-1 | An-355 Stainless (½″×3″) | $H_2SiO_3$ Kaolin - Ajax P $H_2O$ | 5.0 1.0 7.5 | 7x | 1x | 907–100g Knoop | None | .012″ | 6680 psi | 75% coating 25% adhesive |
| P-2 | An-355 Stainless (½″×3″) | $H_2SiO_3$ $Fe_3O_4$ Kaolin - Ajax P $H_2O$ | 5.0 1.0 1.0 8.2 | 7x | 1x | 879–100g Knoop | None | .006″ | 6730 psi | 25% coating 25% adhesive |
| P-8 | An-355 Stainless (½″×3″) | $H_2SiO_3$ $Fe_3O_4$ Kaolin - Ajax P $H_2O$ | 3.0 2.0 1.0 9.2 | 7x | 1x | 9–10 Mohs 1355–100g Knoop- 1148–300g Vickers | None | .008″ | 8030 psi | 15% coating 85% adhesive |
| A | Titanium (½″×2″) | $H_2SiO_3$ $Fe_3O_4$ $Cr_2O_3$ Kaolin - Ajax P $H_2O$ | 1.7 1.6 1.6 1.0 10.2 | 5x | 1x | 9–10 Mohs | None | ~.018″ | 8100 psi | 10% coating 85% adhesive |
| 21 | 440 C Stainless | $H_2SiO_3$ Fe (−325 mesh) Kaolin - Ajax P $H_2O$ | 2.5 2.5 1.5 9.0 | 5x | 1x | 8–9 Mohs | None | ~.015″ | N.M. | — |
| 35 | Inconel | Fe (−325 mesh) Koalin - Ajax P $H_2O$ | 5.0 1.0 6.5 | 3x | 1x | 7–8 Mohs | None | ~.012″ | N.M. | — |

TABLE CXXX

THERMAL SHOCK TESTS FOR CHEMICALLY BONDED COATINGS APPLIED TO A VARIETY OF METAL SUBSTRATES USING WATER AND LIQUID NITROGEN QUENCHING TECHNIQUE

| Sample No. | Metal Substrate | Coating Formulation | Parts (By Wt.) | $H_2CrO_4$ Impreg. | Final $H_3PO_4$ Impreg. | $H_2O$ Quench from 1200°F. | L.N. Quench from 1200°F. |
|---|---|---|---|---|---|---|---|
| A-3 | Titanium Type A (½″ dia.) | Alcoa A-14 (−325 mesh) Kaolin - Ajax P $H_2O$ | 5.0 0.5 8.25 | 13x | None | no cracks or other failure | no cracks or other failure |
| A-5 | Titanium Type A (½″ dia.) | Alcoa A-14 (−325 mesh) Kaolin - Ajax P $H_2O$ | 5.0 1.0 6.0 | 13x | None | no cracks or other failure | no cracks or other failure |
| A-7 | Titanium Type A (½″ dia.) | Alcoa A-14 (−325 mesh) Kaolin - Ajax P $H_2O$ | 5.0 1.0 9.0 | 13x | None | no cracks or other failure | no cracks or other failure |
| A-51 | Titanium Type A (½″ dia.) | Alcoa T-61 (−325 mesh) milled 48 hours Kaolin - Ajax P $H_2O$ | 5.0 0.5 5.5 | 13x | None | no cracks or other failure | no cracks or other failure |

TABLE CXXX-continued

THERMAL SHOCK TESTS FOR CHEMICALLY BONDED COATINGS APPLIED TO A VARIETY OF METAL SUBSTRATES USING WATER AND LIQUID NITROGEN QUENCHING TECHNIQUE

| Sample No. | Metal Substrate | Coating Formulation | Parts (By Wt.) | $H_2CrO_4$ Impreg. | Final $H_3PO_4$ Impreg. | $H_2O$ Quench from 1200°F. | L.N. Quench from 1200°F. |
|---|---|---|---|---|---|---|---|
| A-39 | Titanium Type A (½" dia.) | Alcoa T-61 (−325 mesh)<br>Kaolin - Ajax P<br>$H_2O$ | 5.0<br>0.5 | 13x | None | no cracks or other failure | no cracks or other failure |
| A-36 | Titanium Type A (½" dia.) | Alcoa A-14 (−325 mesh)<br>Kaolin - Ajax P.<br>$H_2O$ | 5.0<br>0.5<br>8.25 | 13x | None | no cracks or other failure | no cracks or other failure |
| A-61 | Titanium Type A (½" dia.) | Meller 99.98% $Al_2O_3$ (1−30μ)<br>Kaolin - Ajax P<br>$H_2O$ | 5.0<br>0.5<br>5.5 | 13x | None | no cracks or other failure | no cracks or other failure |
| C-1 | 416 Stainless (¾" dia.) | Alcoa A-5 (−325 mesh)<br>$Fe_3O_4$ (pigment grade)<br>$H_2SiO_3$<br>Kaolin - Ajax P.<br>$H_2O$ | 1.6<br>1.7<br>1.7<br>1.0<br>9.2 | 13x | None | no cracks or other failure | no cracks or other failure |
| C-2 | Inconel (¾" dia.) | Alcoa A-5 (−325 mesh)<br>$Fe_3O_4$<br>Kaolin - Ajax P<br>$H_2O$ | 2.5<br>2.5<br>1.0<br>8.5 | 10x | 1x | no cracks or other failure | no cracks or other failure |
| C-3 | 416 Stainless (¾" dia.) | Alcoa A-5 (−325 mesh)<br>$Fe_3O_4$<br>Kaolin - Ajax P<br>$H_2O$ | 3.0<br>2.0<br>1.0<br>8.1 | 10x | 1x | no cracks or other failure | no cracks or other failure |
| C-4 | Inconel (¾" dia.) | $Cr_2O_3$<br>$H_2SiO_3$<br>Kaolin - Ajax P<br>$H_2O$ | 2.5<br>2.5<br>1.0<br>8.5 | 10x | 1x | no cracks or other failure | no cracks or other failure |
| C-5 | 440C - Stainless (1½" dia.) | $Cr_2O_3$<br>$Fe_3O_4$<br>$H_2SiO_3$<br>Kaolin - Ajax P<br>$H_2O$ | 1.6<br>1.7<br>1.7<br>1.0<br>10.2 | 9x | 1x | no cracks or other failure | no cracks or other failure |
| C-8 | Inconel (¾" dia.) | $H_2SiO_3$<br>$Fe_3O_4$<br>Kaolin - Ajax P<br>$H_2O$ | 3.0<br>2.0<br>1.0<br>10.2 | 7x | 1x | no cracks or other failure | no cracks or other failure |
| C-12 | Inconel (¾" dia.) | $H_2SiO_3$<br>Kaolin - Ajax P<br>$H_2O$ | 5.0<br>1.5<br>9.0 | 5x | 1x | no cracks or other failure | no cracks or other failure |
| C-18 | Titanium (½"×2") | $H_2SiO_3$<br>$Fe_3O_4$<br>Kaolin - Ajax P<br>$H_2O$ | 5.0<br>1.0<br>1.5<br>9.4 | 8x | 1x | no cracks or other failure | no cracks or other failure |
| C-48 | Titanium (½"×2") | Alcoa A-3 (−325 mesh)<br>100% $H_2CrO_4$<br>$H_2O$ | 5.0<br>2.8<br>1.0 | 3x | None | no cracks or other failure | no cracks or other failure |
| C-26 | Titanium (½"×2") | Alcoa A-5 (−325 mesh)<br>SnO<br>$Fe_3O_4$<br>Kaolin - Ajax P<br>$H_2O$ | 1.6<br>1.7<br>1.7<br>1.5<br>9.0 | 7x | None | no cracks or other failure | no cracks or other failure |

TABLE CXXXI

EXAMPLES OF CERAMIC COATING FORMULATIONS THAT HAVE EXHIBITED GOOD BONDING CHARACTERISTICS TO SOME NON-METAL SUBSTRATES

| Sample No. | Metal Substrate | Coating Formulation | Parts (By Wt.) | $H_2CrO_4$ Impreg. | Final $H_3PO_4$ Impreg. | Hardness | Cracks (zyglo) | Coating Thickness | Bond Strength | Type Failure |
|---|---|---|---|---|---|---|---|---|---|---|
| C-58 | Alumina ($Al_2O_3$) | $H_2SiO_3$<br>Alcoa A-3 (−325 mesh)<br>100% $H_2CrO_4$<br>$H_2O$ | 1.0<br>4.0<br>2.1<br>1.0 | 3x | 1x | 6–7 Mohs | — | — | — | — |
| C-55 | Beryllia (BeO) | $Cr_2O_3$<br>Kaolin - Ajax P<br>$H_2O$ | 5.0<br>1.0<br>7.0 | 2x | 1x | 6–7 Mohs | — | — | — | — |

It has also been found that formulations composed chiefly of metal powders can be used to make well adhering, dense and hard coatings when applied to a variety of metal and non-metal substrates. In this case, it appears that a strong chemical type bond is made between the oxide layer on the metal particles and the chromic oxide formed during the chromic acid impregnation-cure cycle.

A number of these powdered metal coating formulations are listed in Table CXXXII. Those listed have been found to have excellent adherence and in many cases have been tested using the liquid nitrogen and water quench thermal shock method previously described fro ceramic coatings. These high percentage metal coatings have also been found to possess noticeable ductility. For example, a center punch will generally simply produce a dent by displacing some of the coating material rather than chipping or fracturing the coating under the center punch as in the case of most of the predominantly ceramic coatings described earlier.

Table CXXXIII lists a few miscellaneous type coatings applied to metal and non-metal substrates. These include coatings composed mainly of finely powdered silicon carbide, boron carbide, and titania glass. In the case of the carbide materials, there may not be a chemical bond to the chromic oxide. However, the chromic oxide will undoubtedly surround the carbide particles or otherwise form an interlocking bond to itself as well as to the coating substrate. In the case of the powdered glass coating formulation, a chemical bond between the chromic oxide and the glass does probably occur because of the high percentage of silica and other oxides present.

It can be seen that many other metal and non-metal coatings can be applied using this wet slurry method with subsequent hardening by the chemical treatment method of this invention. A wide variety of reinforcing materials can, of course, also be incorporated into the coating mixtures.

It has also been observed that a thin but very hard, tough and extremely well adhering coating was built up on the exposed surfaces of many of the metal substrates after several chromic acid cure cycles.

Subsequent experimentation has shown that these very thin, dark green protective coatings can be readily formed on such metals as 400 series stainless steel, titanium, inconel and aluminum. The coating has also been applied to beryllium copper, steel and 300 series stainless steel, although with somewhat less adherence.

It is expected that most any metal that will form a well adhering oxide coating can be successfully protected in this manner. As mentioned earlier in connection with ceramic and metal coatings, it is felt that the chromic oxide formed during the chromic acid heat conversion cycles produces a strong chemical bond to the porous oxide layer formed on the metal. When using hard to oxidize metals such as titanium, it has been found that a heavier, more tenacious coating will result if the metal is preoxidized prior to the multiple chromic acid impregnation-cure cycles. While the hardness of very thin coatings prepared in this way is

TABLE CXXXII

SELECTED COATING FORMULATIONS USING METAL POWDERS APPLIED TO VARIOUS SUBSTRATES

| Sample No. | Metal Substrate | Coating Formulation | Parts (By Wt.) | $H_2CrO_4$ Impreg. | Final $H_3PO_4$ Impreg. | $H_2O$ Quench from 1200°F. | L.N. Quench from 1200°F. |
|---|---|---|---|---|---|---|---|
| C-32 | Titanium (½"×2") | Chromium (−325 mesh) Kaolin - Ajax P $H_2O$ | 5.0 1.5 5.0 | 2x | None | no cracks or other failure | no cracks or other failure |
| C-34 | 440C Stainless (1½" dia.) | Titanium (−325 mesh) Kaolin - Ajax P $H_2O$ | 5.0 1.0 5.3 | 2x | None | no cracks or other failure | no cracks or other failure |
| C-36 | Inconel (¾" dia.) | Titanium 100% $H_2CrO_4$ $H_2O$ | 5.0 2.1 4.0 | 3x | 1x | no cracks or other failure | no cracks or other failure |
| C-37 | 416 Stainless (¾" dia.) | Titanium 100% $H_2CrO_4$ $H_2O$ | 5.0 4.2 2.5 | 3x | None | no cracks or other failure | no cracks or other failure |
| C-38 | 440C Stainless (1½" dia.) | Titanium (−325 mesh) Kaolin - Ajax P $H_2O$ | 5.0 .5 5.2 | 2x | None | no cracks or other failure | no cracks or other failure |
| X-6 | Beryllium | Boron (amorphous) $H_2SiO_3$ 10% $H_2CrO_4$ | 2.5 2.5 6.0 | 4x | None | No cracking or failure | not tested |
| C-50 | Titanium - also Aluminum Oxide | Nickel (−325 mesh) Kaolin - Ajax P $H_2O$ | 5.0 1.0 3.0 | 3x | 1x | no cracking or failure | |
| C-53 | 440C Stainless | Tungsten (−325 mesh) $Cl_2O_3$ $H_2O$ | 5.0 2.1 2.0 | 3x | 1x | no cracking or failure | |
| C-54 | 416 Stainless - also Beryllium Oxide | 316 Stainless Steel (−325 mesh) Kaolin - Ajax P $H_2O$ | 5.0 1.0 4.0 | 3x | 1x | no cracking or failure | | difficult to measure, scratch tests will usually give Moh

TABLE CXXXIII

SOME SELECTED MISCELLANEOUS COATING MATERIALS APPLIED TO METAL AND NON-METAL SUBSTRATES

| Sample No. | Metal Substrate | Coating Formulation | Parts (By Wt.) | $H_2CrO_4$ Impreg. | Final $H_3PO_4$ Impreg. | Hardness | Cracks (zyglo) | Coating Thickness | Bond Strength | Type Failure |
|---|---|---|---|---|---|---|---|---|---|---|
| C-52 | 440C Stainless - Also Titanium | Silicon Carbide 100% $H_2CrO_4$ $H_2O$ | 5.0 2.1 1.0 | 3x | 1x | 6–7 Mohs | N.M. | ~.010" | N.M. | — |
| C-56 | Titanium + Inconel | Boron Carbide 100% $H_2CrO_4$ $H_2O$ | 5.0 2.1 2.5 | 3x | 1x | 6–7 Mohs | N.M. | ~.010" | N.M. | — |
| N-20 | 440C Stainless (1½" dia.) | Titania-Lead Glass (−325 mesh) 10% $H_2CrO_4$ | 5.0 2.0 | 3x | 1x | N.M. | N.M. | ~.010" | N.M. | — | scale values of at least 8 to 9 after a few chromic acid application-cure cycles.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A method of producing a chemically hardened refractory body which comprises:
   forming an unsintered porous body from a mass of finely divided particles, at least the surface of said particles consisting of a refractory oxide of at least one metallic element having a vitrification temperature in excess of 600°F;
   impregnating said porous body with a solution of a soluble compound of a metal selected from the group consisting of aluminum, beryllium, silicon, tin and zirconium which compound is capable of being converted to an oxide on heating to a temperature below the vitrification temperature of said particles;
   drying and curing said impregnated body by heating same to a temperature of at least 600°F. but below the vitrification temperature of the particles to convert the metal compound in situ to the oxide; and,
   repeating the impregnation and heat curing steps at least once to harden and densify the body.

2. The method of claim 1 wherein the solution is aluminum nitrate.

3. The method of claim 1 wherein the solution is selected from the group consisting of beryllium chloride and nitrate.

4. The method of claim 1 wherein the solution is silica tungstic acid.

5. The method of claim 1 wherein the solution is tin chloride.

6. The method of claim 1 wherein the solution is selected from the group consisting of zirconyl chloride and zirconium chloride.

7. The method of claim 1 wherein at least the surface of the particles is selected from the group of refractory oxides consisting of oxides of aluminum, barium, beryllium, calcium, cerium, chromium, cobalt, copper, gallium, hafnium, iron, lanthanum, magnesium, manganese, molybdenum, nickel, niobium, silicon, tantalum, thorium, tin, titanium, tungsten, uranium, vanadium, yttrium, zinc, zirconium and mixtures thereof.

8. The method of claim 1 wherein at least the surface of the particles is selected from the group consisting of oxides of beryllium, chromium, silicon, tin, zirconium and mixtures thereof.

9. The method of claim 1 wherein at least the surface of the particles is of beryllium oxide.

10. The method of claim 1 wherein at least the surface of the particles is of silicon oxide.

11. The method of claim 1 wherein at least the surface of the particles is tin oxide.

12. The method of claim 1 wherein at least the surface of the particles is zirconium oxide.

13. A method of producing a chemically hardened refractory body which comprises:
    forming an unsintered porous body from a mass of finely divided refractory particles;
    impregnating said porous body with a solution of a soluble compound of a metal selected from the group consisting of aluminum, beryllium, silicon, tin and zirconium which compound is capable of being converted to an oxide on being heated to a temperature below the vitrification temperature of said particles;
    drying and curing said impregnated body by heating same to a temperature of at least 600°F. but below the vitrification temperature of the particles sufficient to convert the metal compound in situ to the oxide; and,
    repeating the impregnation and curing steps at least once to harden and densify the body.

14. The method of claim 13 wherein the solution is aluminum nitride.

15. The method of claim 13 wherein the solution is selected from the group consisting of beryllium chloride and nitrate.

16. The method of claim 13 wherein the solution is silica tungstic acid.

17. The method of claim 13 wherein the solution is tin chloride.

18. The method of claim 13 wherein the solution is selected from the group consisting of zirconyl chloride and zirconium chloride.

19. The method of claim 13 wherein the particles are packed into a mold of predetermined shape at least during the initial impregnation and curing steps.

20. The method of claim 13 wherein the particles are selected from the group consisting of oxides of aluminum, barium, beryllium, calcium, cerium, chromium, cobalt, copper, gallium, hafnium, iron, lanthanum, magnesium, manganese, molybdenum, nickel, niobium, silicon, tantalum, thorium, tin, titanium, tungsten, uranium, vanadium, yttrium, zinc, zirconium and mixtures thereof.

21. The method of claim 13 wherein the refractory particles are selected from the group consisting of the oxides of beryllium, chromium, silicon, tin, zirconium and mixtures thereof.

22. The method of claim 13 wherein the refractory particles are beryllium oxide.

23. The method of claim 13 wherein the refractory particles are silicon oxide.

24. The method of claim 13 wherein the refractory is tin oxide.

25. The method of claim 13 wherein the refractory is zirconium oxide.

26. The method of claim 13 wherein the refractory is silicon carbide.

27. The method of claim 13 wherein the refractory is chromium oxide.

28. A method of producing a chemically hardened refractory body which comprises:
    providing an unsintered porous skeletal core of refractory material;
    impregnating said core with a solution of a metal compound which is selected from the group of compounds consisting of aluminum, beryllium, silicon, tin and zirconium compound which are capable of being converted to an oxide on being heated;
    drying and curing said impregnated core by heating the core to a temperature of at least 600°F. but below the vitrification temperature of the refractory material to convert the metal compound to the oxide; and, repeating the impregnation and curing steps to harden and densify the core.

29. The method of claim 28 wherein the solution is aluminum nitrate.

30. The method of claim 28 wherein the solution is selected from the group consisting of beryllium nitrate and chloride.

31. The method of claim 28 wherein the solution is tin chloride.

32. The method of claim 28 wherein the solution is silica tungstic acid.

33. The method of claim 28 wherein the solution is selected from the group consisting of zirconyl chloride and zirconium chloride.

34. The method of claim 28 wherein the skeletal core is of a material selected from the group consisting of oxides of aluminum, barium, beryllium, calcium, cerium, chromium, cobalt, copper, gallium, hafnium, iron, lanthanum, magnesium, manganese, molybdenum, nickel, niobium, silicon, tantalum, thorium, tin, titanium, tungsten, uranium, vanadium, yttrium, zinc, zirconium and mixtures thereof.

35. The method of claim 28 wherein the skeletal core is of a material selected from the group consisting of the oxides of beryllium chromium, silicon, tin, zirconium and mixtures thereof.

36. The method of claim 28 wherein the skeletal core is of beryllium oxide.

37. The method of claim 28 wherein the skeletal core is silicon oxide.

38. The method of claim 28 wherein the skeletal core is zirconium oxide.

39. The method of claim 28 wherein the skeletal core is chromium oxide.

40. The method of claim 28 wherein the skeletal core is silicon carbide.

41. A method of chemically hardening a refractory coating on a substrate having an unsintered porous coating thereon of a refractory oxide having a vitrification temperature in excess of 600°F. which comprises:
   impregnating the porous oxide coating with a solution of a metal compound selected from the group consisting of aluminum, beryllium, silicon, tin, and zirconium which compound is capable of being converted to an oxide on heating to a temperature below the vitrification temperature of said refractory oxide;
   drying and curing said impregnated coating by heating same to a temperature of at least 600°F but below the vitrification temperature of the oxide but sufficient to convert the metal compound in situ to an oxide; and,
   repeating the impregnation and curing steps at least once to harden and densify the coating.

42. The method of claim 41 wherein the solution is aluminum nitrate.

43. The method of claim 41 wherein the solution is selected from the group consisting of beryllium nitrate and chloride.

44. The method of claim 41 wherein the solution is silica tungstic acid.

45. The method of claim 41 wherein the solution is tin chloride.

46. The method of claim 41 wherein the solution is selected from the group consisting of zirconyl chloride and zirconium chloride.

47. The method of claim 41 wherein the refractory oxide is selected from the group consisting of oxides of aluminum, barium, beryllium, calcium, cerium, chromium, cobalt, copper gallium, hafnium, iron, lanthanum, magnesium, manganese, molybdenum, nickel, niobium, silicon, tantalum, thorium, tin, titanium, tungsten, uranium, vanadium, yttrium, zinc, zirconium and mixtures thereof.

48. The method of claim 41 wherein the refractory oxide is selected from the group consisting of oxides of beryllium, chromium, silicon, tin, zirconium and mixtures thereof.

49. The method of claim 41 wherein the refractory oxide is beryllium oxide.

50. The method of claim 41 wherein the refractory oxide is chromium oxide.

51. The method of claim 41 wherein the refractory oxide is silicon oxide.

52. The method of claim 41 wherein the refractory oxide is tin oxide.

53. The method of claim 41 wherein the refractory oxide is zirconium oxide.

54. The method of claim 41 wherein the substrate is a metal and the oxide coating is formed thereon in situ.

55. The method of claim 54 wherein the substrate is selected from the group of metals consisting of stainless steel, molybdenum, titanium, aluminum, iron, nickel-base alloy, chromium, tungsten and copper.

* * * * *